US012587965B2

(12) United States Patent
Mueck et al.

(10) Patent No.: US 12,587,965 B2
(45) Date of Patent: Mar. 24, 2026

(54) LOW-POWER MODES FOR VULNERABLE ROAD USER EQUIPMENT

(71) Applicant: Intel Corporation, Santa Clara, CA (US)

(72) Inventors: Markus Dominik Mueck, Unterhaching (DE); Honglei Miao, Munich (DE); Michael Faerber, Wolfratshausen (DE)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 18/199,036

(22) Filed: May 18, 2023

(65) Prior Publication Data

US 2023/0292243 A1 Sep. 14, 2023

Related U.S. Application Data

(60) Provisional application No. 63/344,398, filed on May 20, 2022.

(51) Int. Cl.
*H04W 52/02* (2009.01)
*H04L 5/00* (2006.01)
(Continued)

(52) U.S. Cl.
CPC ....... *H04W 52/0232* (2013.01); *H04L 5/0005* (2013.01); *H04L 5/0073* (2013.01);
(Continued)

(58) Field of Classification Search
CPC ......... H04W 52/0232; H04W 52/0238; H04W 72/0446; H04W 76/28; H04W 76/27;
(Continued)

(56) References Cited

U.S. PATENT DOCUMENTS

| | | | |
|---|---|---|---|
| 2013/0238700 A1* | 9/2013 | Papakipos | H04W 4/021 |
| | | | 709/204 |
| 2021/0051587 A1* | 2/2021 | Wu | H04W 68/02 |

(Continued)

OTHER PUBLICATIONS

Thomas Linget, "Vulnerable Road Use Protection", 5GAA, White Paper, version 1.0, 27 pages (Aug. 24, 2020),https://5gaa.org/content/uploads/2020/08/5GAA_XW3200034_White_Paper_Vulnerable-Road-Use (Year: 2020).*

(Continued)

*Primary Examiner* — Chae S Lee
(74) *Attorney, Agent, or Firm* — Banner & Witcoff, Ltd.

(57) ABSTRACT

The present disclosure provides technologies and techniques for power optimization of vulnerable road user (VRU) devices in Intelligent Transportation Systems (ITS)/Vehicle-to-Everything (V2X) systems/networks, Internet of Things (IoT) devices, and/or other small form-factor devices. The power optimizations involve disabling or placing the communications functionality of a device in a sleep or inactive mode in situations where such functionality is not needed. The power optimization techniques include medium access control (MAC) optimized discontinuous reception (DRX) configurations, location-based communication, wake-up signaling communication, contextual activation and parameterization of device communication, slot reservation communication. Additional aspects of devices and communication configurations and arrangements may be described.

19 Claims, 12 Drawing Sheets

(51) Int. Cl.
H04W 72/0446 (2023.01)
H04W 76/28 (2018.01)

(52) U.S. Cl.
CPC ... H04W 52/0238 (2013.01); H04W 72/0446
(2013.01); H04W 76/28 (2018.02)

(58) Field of Classification Search
CPC ......... H04W 52/0216; H04W 52/0229; H04W
52/0235; H04W 52/0245; H04W 52/028;
H04L 5/0005; H04L 5/0073; Y02D 30/70
See application file for complete search history.

(56) References Cited

U.S. PATENT DOCUMENTS

| | | | | |
|---|---|---|---|---|
| 2021/0345244 | A1* | 11/2021 | Raghavan | H04W 76/28 |
| 2022/0060983 | A1* | 2/2022 | Venkateswaran | H04W 52/0229 |
| 2024/0080927 | A1* | 3/2024 | Christoffersson | H04W 76/27 |
| 2024/0244550 | A1* | 7/2024 | Jaegal | H04W 4/44 |

OTHER PUBLICATIONS

Thomas Linget, "Vulnerable Road Use Protection", 5GAA, White Paper, version 1.0, 27 pages (Aug. 24, 2020), https://5gaa.org/content/uploads/2020/08/5GAA_XW3200034_White_Paper_Vulnerable-Road-Use.

"Intelligent Transport Systems (ITS); Vulnerable Road Users (VRU) awareness; Part 1: Use Cases definition; Release 2", ETSI TR 103 300-1 V2.3.1 (Nov. 2022), 80 pages.

"Intelligent Transport System (ITS); Vulnerable Road Users (VRU) awareness; Part 2: Functional Architecture and Requirements definition; Release 2", ETSI TS 103 300-2 V2.1.1 (May 2020), 71 pages.

"Intelligent Transport Systems (ITS); Vulnerable Road Users (VRU) awareness; Part 3: Specification of VRU awareness basic service; Release 2", ETSI TS 103 300-3 V2.1.1 (Nov. 2020), 108 pages.

* cited by examiner

LOW-POWER MODES FOR VULNERABLE ROAD USER EQUIPMENT

RELATED APPLICATIONS

The present application claims priority to U.S. Provisional App. No. 63/344,398 filed on May 20, 2022 ("['398]"), the contents of which is hereby incorporated by reference in its entirety.

TECHNICAL FIELD

The present disclosure is generally related to edge computing, cloud computing, network communication, data centers, network topologies, and communication system implementations, and in particular, to low-power modes of operation for vulnerable road user (VRU) equipment.

BACKGROUND

Intelligent Transport Systems (ITS) comprise advanced applications and services related to different modes of transportation and traffic to enable an increase in traffic safety and efficiency, and to reduce emissions and fuel consumption. Various forms of wireless communications and/or Radio Access Technologies (RATs) may be used for ITS. Cooperative ITS (C-ITS) have been developed to enable an increase in traffic safety and efficiency, and to reduce emissions and fuel consumption. The initial focus of C-ITS was on road traffic safety and especially on vehicle safety. C-ITS includes, inter alia, Collective Perception Service (CPS). CPS supports ITS applications in the road and traffic safety domain by facilitating information sharing among ITS stations. CPS reduces the ambient uncertainty of an ITS-S about its current environment, as other ITS-Ss contribute to context information. By reducing ambient uncertainty, it improves efficiency and safety of the ITS.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
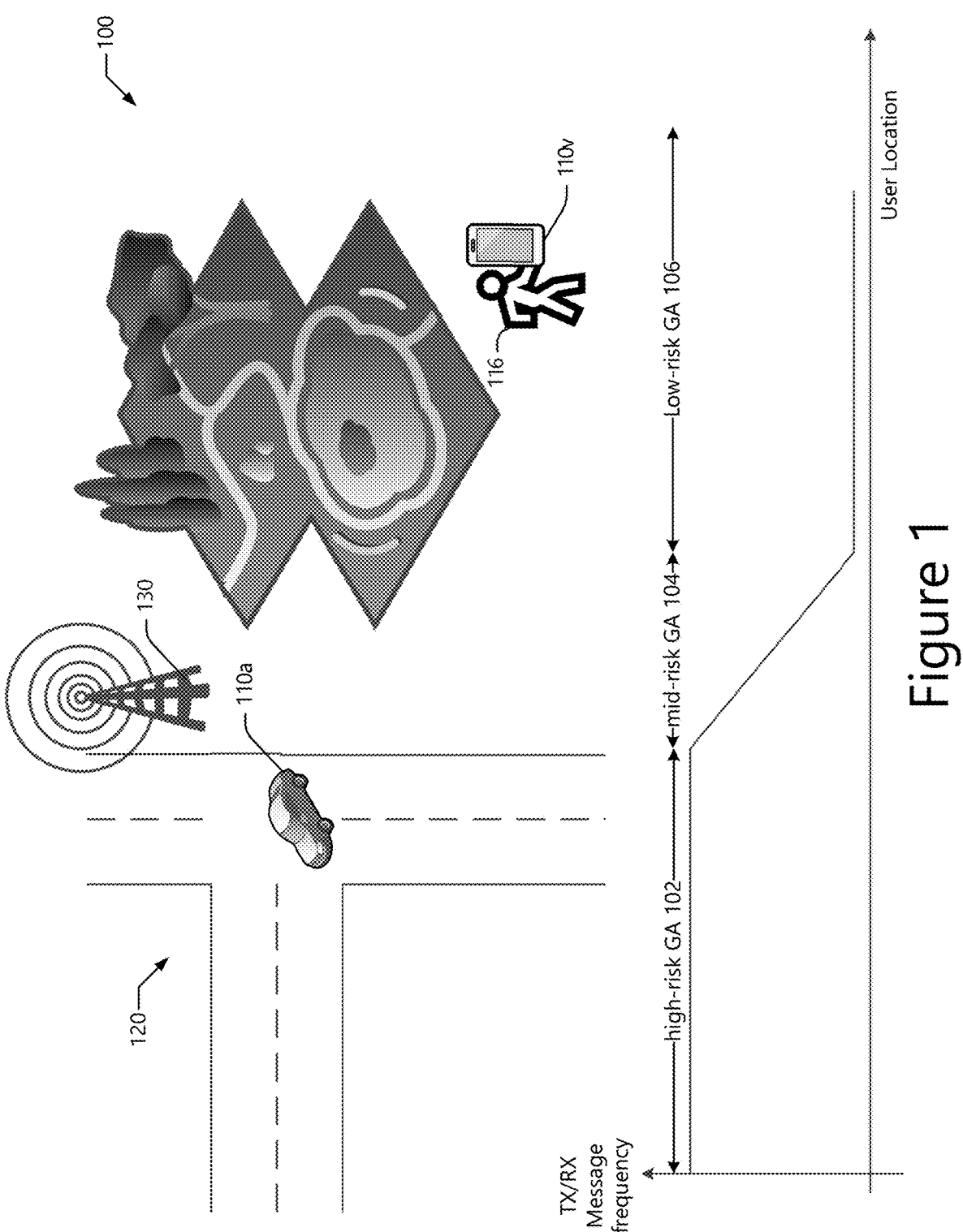
FIG. 1 depict example scenarios of VRUs with respect to vehicular traffic.

1. Power Optimization for Vulnerable Road User (VRU) Equipment

C-ITS has a specific focus on vulnerable road users (VRUs), which utilize various types of communications including vehicle to pedestrian (V2P), pedestrian to vehicle (P2V), infrastructure to pedestrian (I2P), pedestrian to infrastructure (P2I), pedestrian to network (P2N), network to pedestrian (N2P), and other forms of V2X communication that encompasses pedestrians, persons, and/or any other vulnerable subjects. Examples of VRUs are discussed infra with respect to (w.r.t) FIGS. 6-11.

[IEEE80211p] based systems such as DSRC and ETSI ITS-G5 are WiFi based, and have been designed primarily for V2V communication. A pedestrian, a bicycle rider, or any form of VRU would require a compatible air interface in a handheld terminal. This will increase the terminals complexity and its power consumption, as this air interface has to be operated in parallel to, for example, 3GPP LTE. The use of a cellular C-V2X interface (e.g., LTE-V2X as defined in 3GPP Release 14 or NR-V2X as under design in Release 16 and the following releases) simplifies the integration in a conventional handheld, as the vast majority of the baseband, power management and/or the like can be used, and only for the 5.9 GHz RF circuitry has to be added. However, also taking the advantages of a C-V2X integrated handheld solution into account, the communication protocol for V2X communication is based on periodic transmitted messages (e.g., Cooperative Awareness Messages (CAM) as defined in ETSI TS 102 637-2 V1.2.1 (2011 March) ("[TS102637-2]"), see e.g., table 1 in [TS102637-2]).

The industry currently focuses on vehicle mounted equipment where the power consumption is less an issue as a starter battery and a powerful engine provides a solid supply of electrical energy. However, small form factor devices such as IoT devices, user equipment (UEs), and/or devices used by VRUs (e.g., VRU 616, 610v of FIG. 6, discussed infra) have a strictly limited power budget. The present disclosure provides mechanisms to optimize the power consumption of VRU communications using constraints of IoT device, small form factors devices, and/or other battery powered devices.

VRU services are available, but these services are based on a system designed for vehicles that have a much higher power budget than VRU devices, which means that VRUs are limited to the capacity of the VRU device battery when consuming available VRU/ITS services. Existing intersection and/or collision warnings are typically sent/broadcasted 10 times a second, as specified [TS102637-2]. Further development of standards may also result in other repetition frequencies, but from the fundamental concept, a high repetition is required stemming from the needs of automotive solutions. However, VRU devices, handheld devices, and/or other V2X enabled devices have to listen (monitor for) and transmit messages (e.g., ITS messages, such as cooperative awareness message (CAM), collective perception message (CPM), decentralized environmental notification message (DENM), VAM, map extended message (MAPEM), signal phase and timing extended message (SPATEM), in-vehicle information message (IVIM), signal request extended message (SREM), signal status extended message (SSEM), RTCM corrections extended message (RTCEM), maneuver coordination message (MCM), and/or the like) with a high periodicity, when the implementation strictly follow the automotive requirements. This will lead to a power drain of the battery of a VRU device. Experienced users, which are power saving sensitive, may disable the function to save battery, but by doing so put their own safety at risk.

The implementations discussed herein optimize the power consumption of VRU devices (e.g., reducing the power consumption of such devices) and can significantly improve the user experience. According to various implementations, the VRU receiving and the transmit functions of a VRU device are disabled during situations such functions are not needed. Existing VRU protocols can be enhanced to utilize activation and deactivation of VRU Tx/Rx functionality by different means and different for specific situations (e.g., for different use cases/scenarios). In particular, the following mechanisms can be used to enable/disable the VRU Tx/Rx functionality, which will lead to significant power savings in VRU devices (at least in comparison to existing devices that do not incorporate the various implementations discussed herein). In various implementations, VRU safety function-ality is disabled and/or enabled after one or more of the following conditions/implementations are fulfilled.

A first implementation is MAC-based optimized discontinuous reception (DRX), wherein a DRX configuration is used to adapt a VRU Tx/Rx to the actual message traffic, channel conditions, signal strength/quality measurements, and/or other like conditions and/or parameters. A second implementation is location-based VRU communication, wherein location and/or zone (e.g., geofence) based VRU radio resource configuration is used so that DRX parameters can be configured according to zone-based message traffic estimation, channel conditions, signal strength/quality measurements, and/or other like conditions and/or parameters. A third implementation is wake-up signal (WUS)-based VRU communication, wherein a WUS-based VRU can be designed and/or configured so that a low power WUS detector can be used during a VRU sleep period. A fourth implementation involves contextual activation and parameterization of VRU communication, wherein VRU-related communication is automatically switched off in remote areas that are sufficiently spaced from streets, highways, and areas. When a VRU/user is getting closer and/or moving towards areas that are populated by vehicles, the frequency of transmission and/or reception of corresponding messages is gradually increased in order to prepare for the arrival of the VRU/user in a potentially critical situation. A fifth implementation involves reserved slots for VRU communication wherein VRU information is transmitted within given time intervals (e.g., if a repetition rate below the usual 100 ms is sufficient) such that the VRU device can selectively scan for relevant frames only.

1.1. Medium Access Control (MAC) Optimized Discontinuous Reception (DRX)

3GPP-based systems (e.g., LTE and/or 5G/NR) allow UEs to be governed by DRX to provide UE power savings. In particular, when DRX is configured, a UE does not have to continuously monitor the physical downlink control channel (PDCCH) for PDCCH transmissions. In the parlance of 3GPP, the term "PDCCH" may refer to the channel, transmissions over that channel, or both. DRX is characterized by an on-duration, an inactivity timer, a retransmission timer, a DRX cycle, and an active time. The on-duration is a duration that the UE waits for, after waking up, to receive PDCCHs.

If the UE successfully decodes a PDCCH, the UE stays awake and starts the inactivity timer. The inactivity-timer is (or includes) a duration that the UE waits to successfully decode a PDCCH from the last successful decoding of a PDCCH, failing which it can go back to sleep. The UE restarts the inactivity timer following a single successful decoding of a PDCCH for a first transmission only (i.e. not for retransmissions). The retransmission-timer is (or includes) a duration until a retransmission can be expected. The DRX cycle (or simply "cycle") is or specifies the periodic repetition of the on-duration followed by a possible period of inactivity. The active-time is (or includes) a total duration that the UE monitors the PDCCH. This includes the on-duration of the DRX cycle, the time the UE performs continuous reception while the inactivity timer has not expired, and the time when the UE performs continuous reception while waiting for a retransmission opportunity.

Figure 6:
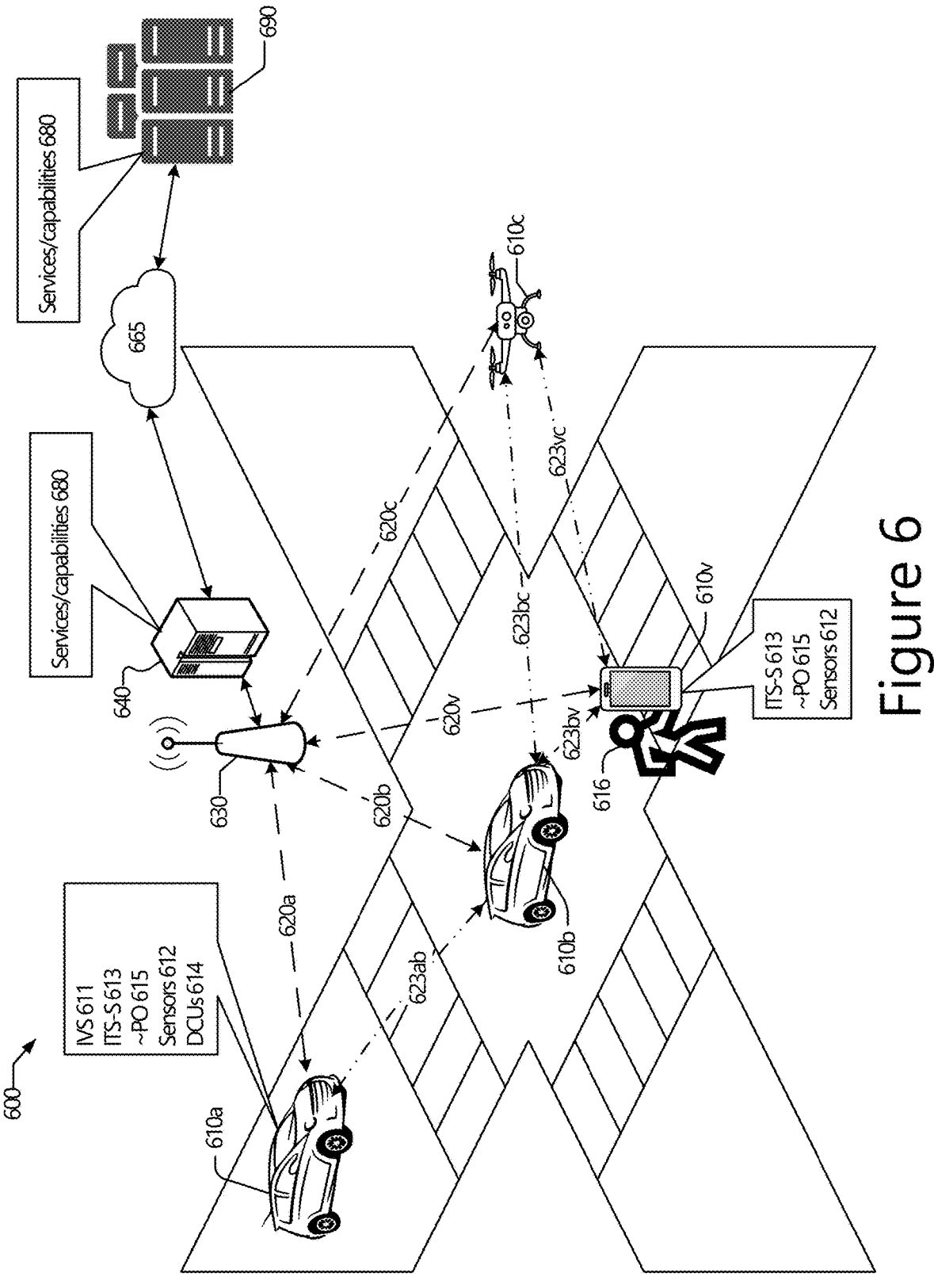
FIG. 6 illustrates an operative Intelligent Transport System (ITS) environment and/or arrangement.

DRX allows a UE (e.g., a V2X/ITS receiver (Rx), such as the VRU device 110$v$ of FIG. 1, VRU device 610$v$ and V-ITS-Ss 610 of FIG. 6, and/or the like) to periodically enter a sleep state (e.g., a DRX OFF duration/period) during which the PDCCH is not monitored, and periodically enters an active (awake) state for a predetermined or configured amount of time (e.g., a DRX on-duration/period) in order to monitor PDCCH for downlink (DL) and/or uplink (UL) data. In some examples, during DRX operation, the MAC entity of the UE monitors the PDCCH as discussed in [TS38321], [TS38331], and/or [TS38300]. When in RRC_CONNECTED mode, if DRX is configured, for all the activated serving cells, the MAC entity of the UE may monitor the PDCCH discontinuously using the DRX operation specified in [TS38321]; otherwise the MAC entity monitors the PDCCH as specified in 3GPP TS 38.213 v17.5.0 (2023 Mar. 30) ("[TS38213]").

In some examples, the MAC entity in the UE is configured by the radio resource control (RRC) layer/entity with DRX functionality that controls the UE's PDCCH monitoring activity for the MAC entity's radio network temporary identifier (RNTI) (e.g., C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, AI-RNTI, SL-RNTI, SLCS-RNTI, and/or SL Semi-Persistent Scheduling V-RNTI). When using DRX operation, the MAC entity also monitors PDCCH according to requirements found in other clauses of [TS38321]. When the UE is in RRC_CONNECTED mode/state, and when DRX is configured, for all the activated serving cells, the MAC entity may monitor the PDCCH discontinuously using the DRX operation specified in [TS38321], [TS38331], and/or [TS38300]; otherwise the MAC entity monitors the PDCCH as specified in [TS38213]. In these examples, the RRC layer/entity controls DRX operation by configuring some or all of the parameters in Table 1.1-1. Additionally or alternatively, the MAC entity may be configured by RRC with sidelink (SL) DRX functionality that controls the UE's sidelink control information (SCI) (e.g., 1$^{st}$ stage SCI and 2$^{nd}$ stage SCI) monitoring activity for unicast, groupcast and broadcast. When using SL DRX operation, the MAC entity shall also monitor SCI (i.e., 1$^{st}$ stage SCI and 2$^{nd}$ stage SCI) according to requirements found in other clauses of this specification. In these examples, the RRC layer/entity controls SL DRX operation by configuring the SL-related parameters in Table 1.1-1. Additional aspects of DRX operation are discussed in [TS38321], [TS38331], and/or [TS38300].

TABLE 1.1-1

| example DRX parameters | |
|---|---|
| DRX parameter | Description |
| DRX-onDuration; or drx-onDurationTimer | the duration of a DRX cycle and/or the duration at the beginning of a DRX cycle; value in multiples of 1/32 ms (subMilliSeconds) or in ms (milliSecond). For the latter, value ms1 corresponds to 1 ms, value ms2 corresponds to 2 ms, and so on. |
| DRX-ShortCycle | the short DRX cycle and/or includes the duration of an individual short DRX cycle; value in ms, where ms1 corresponds to 1 ms, ms2 corresponds to 2 ms, and so on. |
| preferredDRX-ShortCycle | Indicates the UE's preferred short DRX cycle length for power saving with a value in ms, where ms2 corresponds to 2 ms, ms3 corresponds to 3 ms, ms4 corresponds to 4 ms, and so on. If the field is absent from the DRX-Preference IE, it is interpreted as the UE having no preference for the short DRX cycle. |
| DRX-ShortCycleTimer | the duration the UE follows the short DRX cycle and/or the number of short cycles the UE is to follow after the start of a short cycle; value in multiples of drx-ShortCycle, where a value of 1 corresponds to drx-ShortCycle, a value of 2 corresponds to 2 * drx-ShortCycle and so on. |
| preferredDRX-ShortCycleTimer | Indicates the UE's preferred short DRX cycle timer for power saving; includes a value in multiples of preferredDRX-ShortCycle, where a value of 1 corresponds to preferredDRX-ShortCycle, a value of 2 corresponds to 2 * preferredDRX-ShortCycle and so on. If the field is absent from the DRX-Preference IE, it is interpreted as the UE having no preference for the short DRX cycle timer. A preference for the short DRX cycle is indicated when a preference for the short DRX cycle timer is indicated |
| DRX-LongCycle drx-LongCycleStartOffset | the long DRX cycle and/or the duration of an individual long DRX cycle the Long DRX cycle and drx-StartOffset which defines the subframe where the Long DRX cycle and Short DRX cycle starts; drx-LongCycle in ms and drx-StartOffset in multiples of 1 ms. If drx-ShortCycle is configured, the value of drx-LongCycle is a multiple of the drx-ShortCycle value. |
| preferredDRX-LongCycle | Indicates the UE's preferred long DRX cycle length for power saving; includes a value in ms where ms10 corresponds to 10 ms, ms20 corresponds to 20 ms, ms32 corresponds to 32 ms, and so on. If preferredDRX-ShortCycle is provided, the value of preferredDRX-LongCycle shall be a multiple of the preferredDRX-ShortCycle value. If the field is absent from the DRX-Preference IE, it is interpreted as the UE having no preference for the long DRX cycle |
| drx-InactivityTimer | a duration after the PDCCH occasion in which a PDCCH indicates a new UL, DL or SL transmission for the MAC entity; value in multiple integers of 1 ms, where ms0 corresponds to 0, ms1 corresponds to 1 ms, ms2 corresponds to 2 ms, and so on. |
| preferredDRX-InactivityTimer | Indicates the UE's preferred DRX inactivity timer length for power saving; includes a value in ms (milliSecond) where ms0 corresponds to 0, ms1 corresponds to 1 ms, ms2 corresponds to 2 ms, and so on. If the field is absent from the DRX-Preference IE, it is interpreted as the UE having no preference for the DRX inactivity timer. If secondary DRX group is configured, the preferredDRX-InactivityTimer only applies to the default DRX group. |
| drx-SlotOffset | an amount of delay before starting the drx-onDurationTimer, value in 1/32 ms, where value 0 corresponds to 0 ms, value 1 corresponds to 1/32 ms, value 2 corresponds to 2/32 ms, and so on. |
| drx-RetransmissionTimerDL | (per DL HARQ process except for the broadcast process) the maximum duration until a DL retransmission is received; value in number of slot lengths of the bandwidth part (BWP) where the transport block was received. value s/0 corresponds to 0 slots, s/1 corresponds to 1 slot, s/2 corresponds to 2 slots, and so on. |
| drx-RetransmissionTimerUL | (per UL HARQ process) the maximum duration until a grant for UL retransmission is received; value in number of slot lengths of the BWP where the transport block was transmitted, and wherein s/0 corresponds to 0 slots, s/1 corresponds to 1 slot, s/2 corresponds to 2 slots, and so on. |
| drx-RetransmissionTimerSL; or sl-drx-RetransmissionTimer, or sl-DRX-GC-RetransmissionTimer | (per SL HARQ process except for the SL broadcast process) the maximum duration until a grant for SL retransmission is received |
| sl-drx-onDurationTimer, or sl-DRX-GC-BC-OndurationTimer | the duration at the beginning of a sidelink (SL) DRX cycle |
| sl-drx-SlotOffset | the delay before starting the sl-drx-onDurationTimer/sl-DRX-GC-BC-OndurationTimer |
| sl-drx-InactivityTimer; or sl-DRX-GC-InactivityTimer | (except for the SL broadcast communication) the duration after the first slot of SCI (e.g., $1^{st}$ stage SCI and $2^{nd}$ stage SCI) reception in which an SCI indicates a new SL transmission for the MAC entity |
| sl-drx-StartOffset | the slot where the SL DRX cycle starts |
| sl-drx-Cycle; or sl-DRX-GC-BC-Cycle | the Sidelink DRX cycle |

One DRX on-duration/period and one DRX OFF duration/period is referred to as a "DRX cycle" or the like. When operating in DRX mode, the UE powers down most of its RAT/communication circuitry (e.g., communication circuitry 1260 of FIG. 12 and/or components therein) at least during the sleep state of the DRX cycle, which allows the UE to consume less power. DRX cycles can be long DRX cycles or short DRX cycles. The duration of a short DRX cycle is generally shorter or smaller than a duration of the long DRX cycle. Usually, a Radio Access Network (e.g., NG-RAN or the like) configures a long DRX cycle together with an additional DRX cycle where the long DRX cycle duration is an integer multiple of the short DRX cycle duration. In these cases, the UE switches monitors the PDCCH according to the short DRX cycle and switches to monitoring the PDCCH according to the long DRX cycle when no data is received or properly decoded during the short DRX cycle. The UE may also switch back to the short DRX cycle for a predefined or configured amount of time.

In the MAC-based DRX implementations, the MAC entity in (or operated by) a UE can be (pre)configured by the network (e.g., by a RAN node via RRC signaling) with suitable timer settings to enable optimized DRX operations adapting to V2X/ITS traffic characteristics (e.g., monitored channel conditions, measured signals, traffic volume, message types, and/or the like). When the V2X/ITS Rx (UE) does not receive any V2X/ITS messages (e.g., CAMs, CPMs, DENMs, VAMs, MAPEMs, SPATEMs, IVIMs, SREMs, SSEMs, and/or the like), a timer/counter T1 is started and the UE's reception circuitry is disabled after timer T1 has expired. Additionally or alternatively, another timer may be used, such as any of those discussed in [TS38331]. In some implementations, the DRX timer/cycle configuration can include one or more of the DRX parameters listed in Table 1.1-1. The DRX timer/cycle configuration can include one or more additional or alternative DRX parameters, such as those discussed in [TS38321] and/or [TS38331].

In the MAC-based DRX implementations, the DRX-onDuration (or drx-onDurationTimer) parameter is set to the time interval during which periodic V2X/ITS message(s) is/are scheduled and/or transmitted. Additionally or alternatively, the DRX-ShortCycle parameter is set to the time duration corresponding to V2X/ITS message periodicity (e.g., 100 ms or the like). Additionally or alternatively, the DRX-ShortCycleTimer parameter is set to the number of short cycles (DRX-ShortCycle) after which a long DRX cycle is to be applied. Additionally or alternatively, the DRX-LongCycle parameter is set to a multiple of DRX short cycles (e.g., one or more DRX-ShortCycles). If there is no data activity (e.g., transmission or receipt of V2X/ITS messages) during the period defined by the DRX-ShortCycle and the DRX-ShortCycleTimer (e.g., drx-ShortCycleTimer× drx-ShortCycle), the UE enters the DRX-LongCycle. Here, the UE enters the long DRX cycle upon a drx-ShortCy-cleTimer number of short cycles (e.g., when the drx-Short-CycleTimer expires).

As mentioned previously, the MAC entity of the UE can be configured by RRC with DRX functionality that controls UE's PDCCH monitoring activity (see e.g., [TS38321]). In some examples, a suitable RRC message can include a DRX-Config information element (IE) which is used to configure DRX related parameters (see e.g., [TS38331]), a DRX-ConfigSecondaryGroup IE which is used to configure DRX related parameters for a second DRX group as specified in [TS38321], a DRX-ConfigSL IE which is used to configure additional DRX parameters for the UE performing sidelink operation with resource allocation mode 1 as specified in [TS38321], and/or the SL-DRX-Config IE which is used to configure DRX related parameters for NR sidelink communication/discovery (e.g., the SL DRX timers may be calculated in the unit of physical slot). The DRX-Config, DRX-ConfigSecondaryGroup, DRX-ConfigSL, and/or SL-DRX-Config IE(s) can be included in a MAC-CellGroup-Config IE, which is used to configure MAC parameters for a cell group, including DRX.

Additionally or alternatively, the UE can be preconfigured (e.g., provisioned or otherwise configured by an OEM or the like) with a VRU profile/configuration or other data structure including various settings for DRX operation, which can include preferred values for any of the aforementioned DRX parameters and/or any other settings/parameters/conditions, such as any of those discussed herein. In these implementations, the UE can inform the network (e.g., a RAN node or the like) of such settings using the drx-PreferenceConfig IE which includes a configuration for the UE to report assistance information to inform the gNB about the UE's DRX preferences for power saving, using a UEA-ssistanceInformation message which is used for the indication of UE assistance information to the network, and/or using the DRX-Preference IE.

1.2. Location-Based VRU Communication

Figure 11:
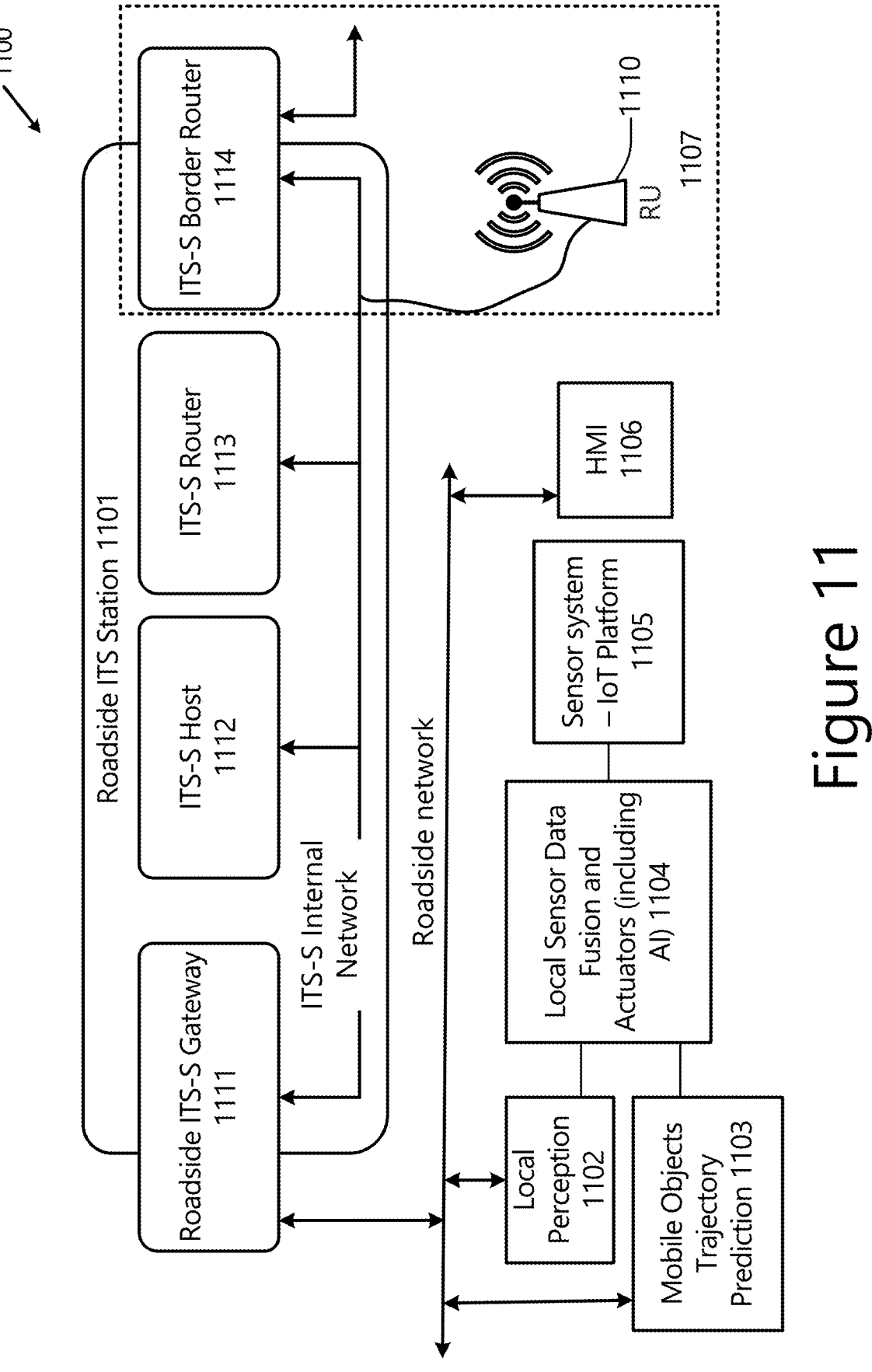
FIG. 11 depicts a roadside ITS-S in a roadside infrastructure node.

Some V2X/ITS messages can come from vehicle stations (e.g., V-ITS-S 610 of FIG. 6, and/or vehicle system 900 and/or V-ITS-S 901 of FIG. 9) and/or road side infrastructure units (RSUs) (e.g., R-ITS-S 630 of FIG. 6, and/or roadside infrastructure 1100 and/or R-ITS-S 1101 of FIG. 11). For example, when a VRU (e.g., VRU 616 and/or VRU device 610v of FIG. 6) comes close to an RSU, one or more ITS/V2X messages may be detected, and ITS/V2X message transmission by the VRU may start. The same applies when a similar signal is received by a vehicle approaching the VRU.

In the location-based VRU communication implementations, a navigation application (app) of the VRU can connect to an application residing in the network and uses map data to activate or deactivate ITS/V2X communication circuitry/functionality. Additionally or alternatively, the network may disable the RAT circuitry/functions (e.g., C-V2X transceiver, 5.9G/ITS-G5 transceiver, and the like) if the VRU is indicated or detected as being in a traffic free zone (or nearly traffic free zone).

A zone or geofence defined by or for a VRU based on the geolocation of a UE/VRU device, has been specified in C-V2X to enable zone-based V2X radio resource configuration. To realize the aforementioned features, zone-based DRX parameters can be configured. In various implementations, for those areas/zones with fewer RSUs and/or ITS/V2X traffic, a larger value can be set for DRX-ShortCycle and/or the DRX-LongCycle. Additionally or alternatively, a smaller value can be set for the DRX-ShortCycle Timer so that it is quicker for the UE to switch to a long sleep state.

1.3. Wake-Up Signal (WUS) VRU Communication

Transmission and reception establishment can also be activated by a suitable beacon signal or the like. Similar to activation of the UE based on receipt of a V2X/ITS message (e.g., from an RSU) (e.g., enterin the awake or active state), in case of a disabled UE/C-ITS receiver, beacon signaling can be used to wake up the UE from a deep sleep state (e.g., reactivate the C-ITS functionality in the UE). In these implementations, beacon devices can be deployed and/or installed at critical or otherwise desired traffic points.

A beacon device may be a network appliance and/or network element that provides communication services and/ or positioning services to various devices (e.g., UEs) operating within a predefined distance from the beacon device. Individual beacon devices transmit and/or broadcast suitable beacon signals to nearby devices. In one example, the beacon signal can be a Bluetooth or BLE signal. In this example, a beacon device may utilize Bluetooth/BLE proximity sensing techniques to transmit the beacon signal to devices within a vicinity of the beacon device. In these implementations, the beacon signal is a wake-up signal (WUS) that causes the receiving devices to exit a sleep state and enter an active state for receiving and/or transmitting suitable messages/signaling (e.g., ITS/V2X messages such as any of those discussed herein).

In another example, deep sleep reactivation (e.g., wake up) can also be executed or otherwise performed by the network (e.g., a RAN, RAN node and/or roadside infrastructure/RSUs). In these implementations, if the network receives parameters and/or some indication that a VRU/UE is approaching a roadway or other situation that requires VRU device/UE (re)activation, the network transmits a suitable WUS to the VRU device/UE to cause the VRU device/UE to exit a sleep state and enter an active state to consume VRU-related services.

In particular, the WUS and/or another like physical layer signal can be designed to realize the functionality of the aforementioned beacon signals. In these implementations, the WUS is transmitted prior to each scheduled ITS/V2X transmission occasion. Otherwise, if there is no ITS/V2X messages to be transmitted in the configured ITS/V2X occasion, either nothing is transmitted in the resource allocated to the WUS (e.g., discontinuous transmission (DTX)) or another signal (e.g., a Go-To-Sleep (GTS)) can be transmitted to indicate that the UE is to remain in the sleep mode. As a result, a "WUS-or-DTX" or "WUS-or-GTS" based power efficient communication is realized.

In any of the aforementioned examples, the WUS and/or GTS signals can be or include MAC control elements (CEs) (see e.g., [TS38321]). For example, a WUS can be or include a DRX command MAC CE indicated by PDCCH addressed to C-RNTI or CS-RNTI, or by a configured DL assignment for unicast transmission. The DRX command MAC CE is identified by a MAC subheader with Logical Channel ID (LCD) field value of 60. In these examples, if the short DRX cycle is configured (see e.g., section 1.1, supra), the VRU/UE's MAC entity starts or restarts the drx-ShortCycleTimer for each DRX group in the first symbol after the end of DRX Command MAC CE reception, and uses the short DRX cycle for each DRX group; otherwise, the MAC entity uses the long DRX cycle for each DRX group.

In another example, the WUS can be or include a long DRX command MAC CE. The long DRX command MAC CE is identified by a MAC subheader with LCID field value of 59. In these examples, the VRU/UE's MAC entity stops the drx-ShortCycleTimer for each DRX group, and uses the long DRX cycle for each DRX group.

In another example, the WUS can be or include an SL DRX command MAC CE. A VRU/UE may send an SL DRX command MAC CE to a receiving VRU/UE for unicast transmission, and when to send SL DRX Command MAC CE may be up to UE implementation. The SL DRX command MAC CE are identified by a MAC subheader with LCID field value of 61. When an SL DRX command MAC CE is received for a Source Layer-2 ID and Destination Layer-2 ID pair of a unicast, the MAC entity stops the sl-drx-onDurationTimer for the Source Layer-2 ID and Destination Layer-2 ID pair of a unicast, and stops the sl-drx-Inactivity Timer for the Source Layer-2 ID and Destination Layer-2 ID pair of a unicast.

1.4. Contextual Activation and Parameterization of VRU Communication

FIG. 1 depicts example 100 of contextual activation and parameterization of VRU communication, which is based on the position/location of the VRU 110v (which may be the same or similar as VRU 610v) w.r.t vehicular traffic 110a and/or road infrastructure 120.

In some cases, VRU communication only needs to be activated when a VRU 110v is actually in a potentially vulnerable state or situation. For example, the VRU 110v may be in a potentially vulnerable state or situation based on its location/position w.r.t vehicular traffic 110a (which may be the same or similar as vehicles 610 of FIG. 6) and/or w.r.t a roadway 120 (e.g., within some threshold or predetermined distance). The areas or locations where a user may be in a potentially vulnerable state or situation may be referred to as "high-risk geographical areas" such as, for example, high-risk geographical area (GA) 102 in FIG. 1. In some examples, a high-risk GA 102 is an area or part of a road infrastructure 120 where the safety related traffic context is heightened for VRUs 110v.

When a VRU 110v is not in a potentially vulnerable state or situation, the risk of related accidents is rather low. The areas or locations where a user is unlikely to be in a potentially vulnerable state or situation may be referred to as "low-risk geographical areas" such as, for example, low-risk GA 106 in FIG. 1. In some examples, a low-risk geographical area is an area or part of a road infrastructure 120 where the safety related traffic context is relaxed for VRUs 110v. Examples of low-risk geographical areas include rural or forested areas, inside public transport, on or in a body of water (e.g., a lake, ocean, or the like), and/or the like.

Additionally or alternatively, locations where a user/VRU 110v is in an unlikely or low-probability of being in a vulnerable state or situation may be referred to as a "mid-risk geographical area" such as the mid-risk GA 104. The mid-risk GA 104 may be an area or part of a road infrastructure 120 where the safety related traffic context is less relaxed for VRUs 110v than low-risk GAs 106 and more relaxed for VRUs 110v than high-risk GAs 102. Examples of mid-risk GAs 104 include areas between (sub)urban areas and rural areas, and/or the like.

Additionally or alternatively, locations where a user is not considered to be a VRU are not considered as low-risk GAs, but instead, these locations are considered to be "zero-risk geographical areas." Examples of zero-risk geographical areas include inside a building, inside public transport, on or in a body of water (e.g., a lake, ocean, or the like), and/or the like.

When a VRU 110v is in or entering a low-risk GA 106, the VRU communication functionality can be automatically switched off. For example, when the VRU 110v is in the low-risk GA 106, the VRU's 110v transmit and/or reception functions may be disabled or switched off. Here, the VRU 110v is provided little to no VRU-related protections/services because the VRU 110v is in a remote area that is sufficiently spaced from road infrastructure 120 (e.g., streets, highways, and the like). Additionally or alternatively, the VRU communication functionality can be automatically switched off when the VRU 110v is in, or enters, a zero-risk GA.

Additionally, as the VRU 110v moves closer to the road infrastructure 120 or otherwise moves towards areas that are populated by vehicles 110a or otherwise approaches a potentially vulnerable state, the VRU communication functionality is gradually increased. In the mid-risk GA 104, the VRU 110$v$ is provided with increased or decreased VRU-related protections/services based on the VRU's 110$v$ distance from the high-risk GA 102. When the VRU 110$v$ is in the high-risk GA 102, the VRU 110$v$ may be provided with full the VRU-related protections/services.

In a first example, as the VRU 110$v$ moves from the low-risk GA 106 into the mid-risk GA 104, the VRU's 110$v$ transmit and/or reception functions are gradually increased the closer the VRU 110$v$ is to the high-risk GA 102. This can include gradually increasing the frequency of transmission and/or reception of V2X/ITS messages in order to prepare for the arrival of the VRU 110$v$ in a potentially critical situation and/or when the VRU 110$v$ arrives in the high-risk GA 102. In this example, the VRU communication functionality is increased as the probability of VRU danger increases.

In a second example, as the VRU 110$v$ moves from the high-risk GA 102 into the mid-risk GA 104, the VRU's 110$v$ transmit and/or reception functions are gradually decreased the closer the VRU 110$v$ is to the low-risk GA 106. This can include gradually decreasing the frequency of transmission and/or reception of V2X/ITS messages in order to preserve power and/or battery life. In this example, the VRU communication functionality is decreased as the probability of VRU danger decreases.

In various implementations, the VRU 110$v$ can determine whether it is in and/or approaching a high-risk GA 102, mid-risk GA 104, low-risk GA 106, and/or zero-risk GA, and adjust its VRU communication functionality (VRU-related protections/services) accordingly, according to one or more of the following options.

In a first option, the VRU 110$v$ itself observes, measures, or otherwise determines the signal strength/quality of related ITS/V2X communications. If the signal strength/quality measurement(s) is/are below a predefined, predetermined, or configurable threshold P_low over a predefined, predetermined, or configurable observation time T_observe, then the VRU 110$v$ reduces its reception and decoding cycle time (or a DRX cycle time or length) for ITS/V2X signals. In some implementations, there may be several such thresholds, and with each threshold level, the cycle time is increased or decreased (see e.g., FIG. 2).

Figure 2:
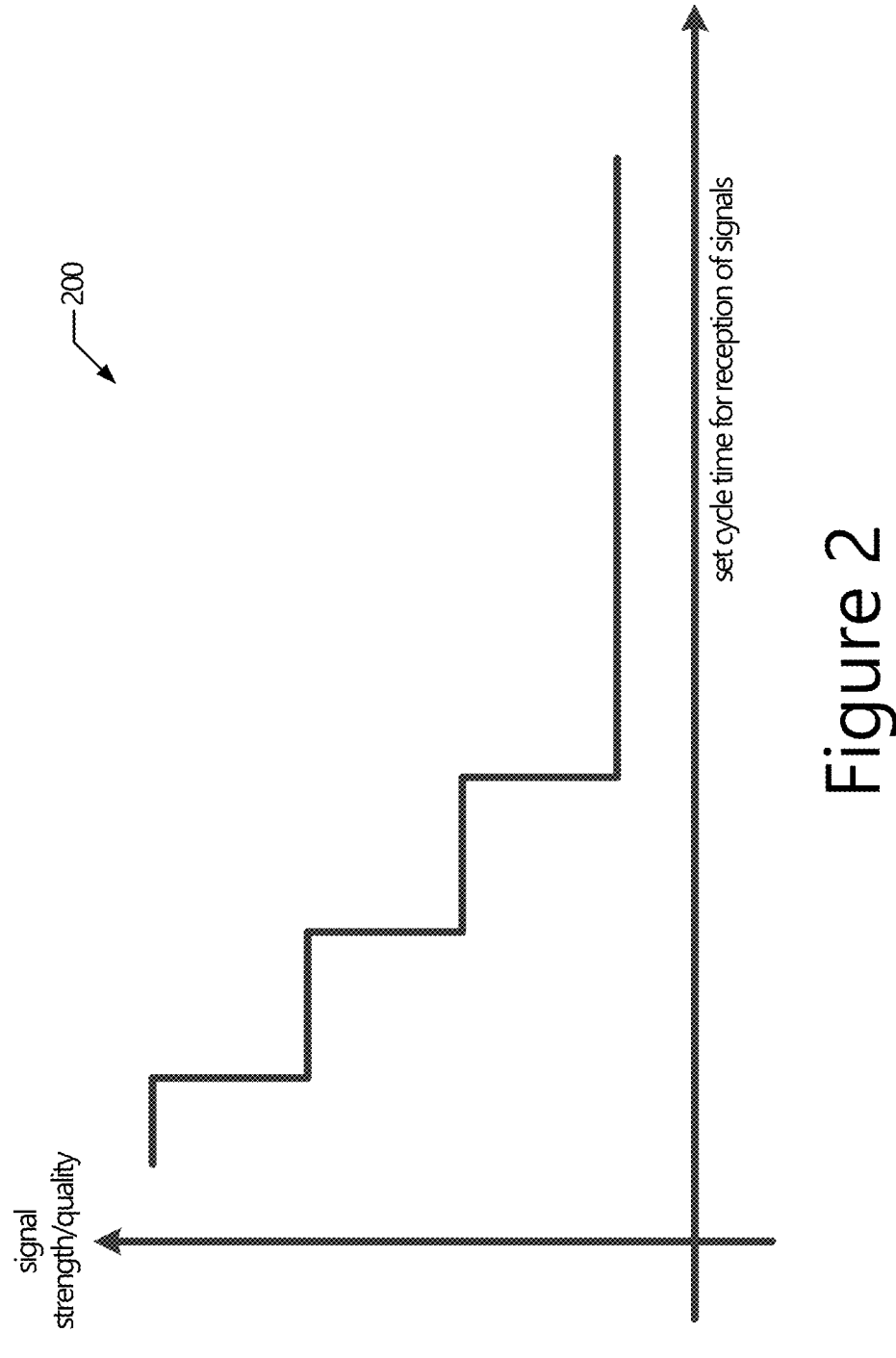
FIG. 2 depicts an example of contextual activation and parameterization timing cycle.

FIG. 2 shows an example communication timing cycle graph 200. The communication timing cycle graph 200 shows a Tx/Rx timing cycle based on a set Tx/Rx cycle time for received signaling (x-axis) versus signal strength/quality measurements (y-axis). The Tx/Rx cycle time may represent the amount of time between monitoring for incoming signaling/messages and/or transmitting/broadcasting signaling/messages and/or the time between causing the V2X/ITS RAT circuitry in the VRU 110$v$ to enter or exit a sleep mode, or turn on/off the RAT circuitry.

In the example of FIG. 2, the Tx/Rx cycle time increases as the signal strength/quality decreases, and the Tx/Rx cycle time decreases as the signal strength/quality increases. The signal strength/quality decreasing may represent a user/VRU 110$v$ being more distant from vehicular traffic 110$a$ and/or roadside roadside equipment 130 (which may be the same or similar as NAN 630 of FIG. 6, and/or may include RSUs, servers, edge compute node, network appliances, cloud computing service, and/or the like), and the signal strength/quality increasing may represent a user/VRU 110$v$ being closer to vehicular traffic 110$a$ and/or roadside equipment 130. In some implementations, the cycle time may be set to a relatively long period, but it is not set entirely to zero since the user/VRU 110$v$ may need to check sporadically or periodically whether ITS/V2X communication is coming up again.

In a second option, the VRU 110$v$ maintains (e.g., periodic) connections to the roadside equipment 130 and/or provides its location through a suitable interface (e.g., Uu interface for LTE or NR/5G systems, or a suitable WLAN interface in [IEEE802] system). The infrastructure equipment 130 observes the proximity of the VRU 110$v$ to vehicular traffic 110, and then determines a suitable cycle time for reception of V2X/ITS signals/messages. In some implementations, the Tx/Rx cycle time is reduced with an increasing distance between the VRU 110$v$ and the vehicular traffic 110$a$ (or road infrastructure 120) in a same or similar manner as discussed previously w.r.t FIG. 2.

In a third option, the VRU 110$v$ determines its own position/location w.r.t the roadway infrastructure 120 and/or roadside equipment 130, and increases or decreases its Tx/Rx cycle time as discussed previously w.r.t the second option and/or any other examples discussed herein. In one example, the VRU 110$v$ uses a suitable triangulation method to determines its position/location. One method of triangulation includes performing a signal strength calculation of one or more signals generated by one or more other devices (e.g., vehicles 110, RSU 130, other VRU devices 110$v$, one or more beacon devices, and/or the like). Additionally or alternatively, the VRU 110$v$ can utilize other measurements/metrics or information associated with one or more received signals or messages such as, for example, path loss, packet delay time, signal to noise ratio (SNR), throughput, jitter, latency, a round trip time (RTT), a number of interrupts, an out delivery of data packets, and/or other like metrics/measurements such as any of those discussed herein. Additionally or alternatively, directional signal reception or/and transmission of one or more directional antennas may be also used to determine the orientation and/or position of the various devices in a given environment such as environment 100.

In a fourth option, the VRU 110$v$ determines whether it is in a high-risk GA 102, mid-risk GA 104, low-risk GA 102, or zero-risk GA based on messages/signaling received from roadside equipment 130, vehicles 110, and/or other VRUs 110$v$ (not shown) such as MAPEMs (see e.g., [TS103301]) and/or other messages such as any of those discussed herein. These messages indicate whether a GA is high-risk, low-risk, mid-risk, and/or zero-risk, and/or any applicable restrictions such a low speed limitations and/or the like. Here, the VRU 110$v$ reduces or increases its Tx/Rx cycle time in a same or similar manner as discussed previously based on the GA indicated by the received signaling/messages.

In a fifth option, the VRU 110$v$ determines whether it is in a high-risk GA 102, mid-risk GA 104, low-risk GA 102, or zero-risk GA based on information/data obtained through GNSS circuitry (e.g., positioning circuitry 1275 of FIG. 12) and/or navigation applications. In this option, the location/position information (e.g., GNSS coordinates) may be mapped to a GA 102, 104, 106 or the like.

In any of the aforementioned options, existing messages and/or new messages may be used to set the Tx/Rx cycle timing. In some implementations, the messages for setting the Tx/Rx cycle timing can include (a) a message header including a VRU or user ID of the target VRU 110$v$; and (b) the cycle time for Tx/Rx of ITS/V2X signals/messages.

1.5. Reserved Slots for User Communication

Figure 3:
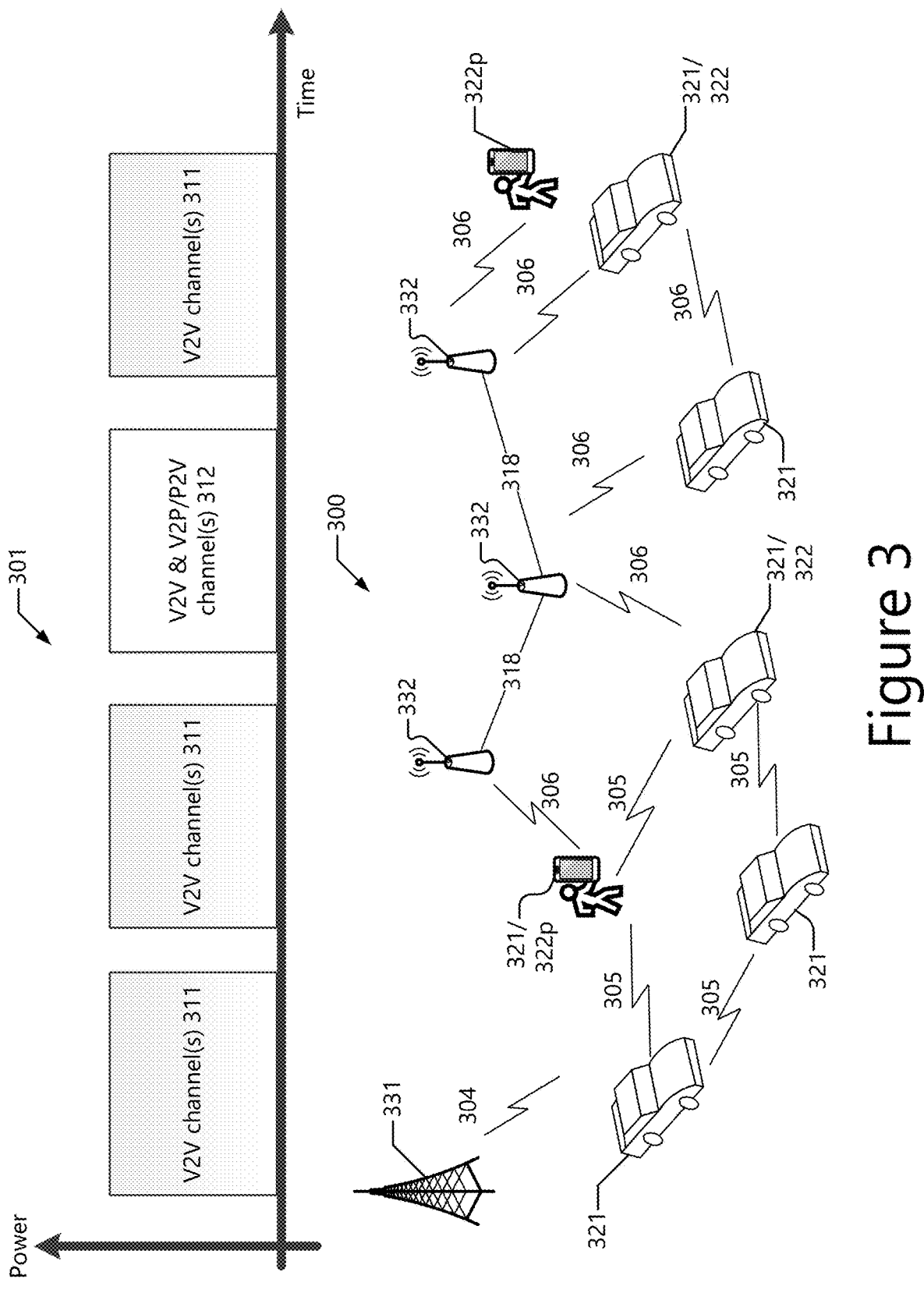
FIGS. 3 and 4 depict examples VRU communication resource configurations and/or allocations.

FIG. 3 illustrates an example arrangement 300 having multiple channels 301 available for V2X communications.

This arrangement 300 involves ITS-Ss 321 and 322, which may be the same or similar as the vehicles 110a and/or VRUs 110v in FIG. 1, the vehicle systems 610 (or IVS 601) and/or VRU 616, 610v of FIG. 6 that may communicate with one another over direct links 305, 306 and/or with RAN nodes 331 and/or R-ITS-Ss 332 via links 304, 306. The RAN nodes 331 and/or R-ITS-Ss 332 may be the same or similar as the roadside equipment 130 of FIG. 1 and/or the NAN 630 of FIG. 6 (discussed infra).

In an example, the direct links 305 operate according to a first V2X RAT (e.g., cellular V2X (C-V2X) RATs) and the direct links 306 operate according to a second V2X RAT (e.g., Wireless Local Area Network (WLAN) V2X ("W-V2X") RATs). For purposes of the present disclosure, the term "C-V2X" may refer to any 3GPP cellular-based V2X technology and the term "W-V2X" may refer to any IEEE-based V2X technology. As shown by FIG. 3, V-ITS-Ss 321 are equipped to communicate according to the first V2X RAT (e.g., C-V2X), V-ITS-Ss 322 are equipped to communicate according to a second V2X RAT (e.g., W-V2X), and V-ITS-Ss 321/322 are equipped to communicate according to both the first and second V2X RATs. Further, the RAN node 331 (e.g., an eNB, ng-eNB, gNB, en-gNB, and/or the like) is configured to provide 3GPP communication services, and may provide (or assist in providing) C-V2X services, while the R-ITS-Ss 332 are equipped to provide network connectivity for the ITS-Ss 322 employing the W-V2X RAT.

The W-V2X RATs include IEEE based V2X technologies such as, for example, DSRC for the U.S. and/or ITS-G5 for Europe, [IEEE80211p] (which is now part of [IEEE80211]), [IEEE16090], IEEE 802.11bd, [WiMAX], IEEE variants such as Vehicular Ad Hoc Network (VANET) technologies, Vehicular Ad Hoc Network MAC (VeMAC), distributed and infrastructure free TDMA based MAC protocol (DTMAC), Active Signaling-DTMAC (AS-DTMAC), prediction-based TDMA MAC (PTMAC), and/or some other suitable RATs such as any of those discussed herein. The direct links 306 are used for communications between two or more V-ITS-Ss 322, and WLAN links 306 are used for communications with a wider network (e.g., the Internet) via NANs 332. Additionally, the NANs 332 communicate with one another via links 318. In an example, the direct links 306 utilize the same protocol/network as the WLAN links 306, 318. However, in other examples, the WLAN links 306 and/or links 318 may utilize different protocol(s) than the direct links 306.

The C-V2X RATs include cellular communications-based technologies such as, for example, 3GPP LTE-V2X and/or 3GPP 5G/NR-V2X. The direct links 305 can be C-V2X sidelinks including access stratum (AS) functionality enabling V2X sidelink communication as defined in [TS23285] between nearby UEs 321, 322 using Evolved Universal Terrestrial Radio Access (E-UTRA) technology and/or 5G/NR RAT that does not traverse any network node. 3GPP C-V2X includes several communication modes as defined in [TS23287] and/or the like. One mode involves communications taking place over a cellular link ("Uu interface") 304 between an individual vehicle UE (vUE) 321 and the Radio Access Network (RAN) node 331, where a transmitting vUE 321 sends data to the RAN node 331 over the Uu interface 304, and the RAN node 331 sends that data to a receiving (Rx) vUE 321 over another Uu interface 304. Another mode involves vUEs 321, 322 communicating data with one another using a direct link ("PC5 interface") 305 between the vUEs 321 independently from the control of cellular network and/or without assistance from the RAN node 331. Another mode is a combination of the first and second modes, where control signalling takes place over the Uu interface 304 and data exchange takes place over the PC5 interface 305. Additionally or alternatively, the PC5 interface 305 and the ITS-G5 interface 307 may utilize license-exempt V2X communication channels 301 in the 5.9 GHz band, for example, three 10 MHz channels for safety related applications and the like. When the vUEs 321 are in cellular network coverage, the network decides how to configure the V2X channel and informs the vUEs 321 about V2X configurable parameters through the Uu interface 304. The message includes the carrier frequency of the V2X channel, the V2X resource pool, synchronization references, the sub-channelization scheme, the number of sub-channels per subframe, and the number of resource blocks (RBs) per sub-channel, among other information. 5G-NR V2X has a new physical layer compared to LTE-V2X whereas the scheduling of transmissions for sidelink operation is similar for both technologies based on a synchronous network, while scheduling parameters allow for more flexibility.

In order to reduce the required complexity for VRUs 321/322p (e.g., including pedestrians, IoT devices, small form factor devices, and/or the like) to access to information, VRU/user information is transmitted within given time intervals (e.g., if a repetition rate below the usual 100 ms is sufficient) such that a VRU 321/322p can selectively scan for relevant frames only, as is shown by the channel allocation scheme 301 in FIG. 3 (also referred to as "resource allocation 301").

The channel allocation scheme 301 is a Time Division Multiplexing (TDM) approach in which resources/channels 311 are allocated/reserved for vehicular communications only (e.g., V2V and/or V2I/I2V communications), and resources/channels 312 reserved for both vehicular and VRU-related communications (e.g., V2V, V2I/I2V, V2P/P2V, P2P, and/or P2I/I2P communications), where the resources are allocated at different times and/or time intervals. In the example of FIG. 3, the resources/channels 312 the VRU-related communication may be limited to specific (e.g., predetermined or configured) slots within the resources/channels 312. Furthermore, within a frame, specific Resource Block sequences may be reserved for VRU communications. The channels 311 and/or 312 can be used by any available RAT such as the first and second RATs discussed previously. Additionally or alternatively, the channel allocation scheme 301 can include co-existence mechanisms such as those discussed in U.S. application Ser. No. 17/411,943, filed on Aug. 25, 2021 ("['943]"). Although FIG. 3 shows four channels 301, any applicable number of channels may be used for any number of V2X RATs.

Additionally or alternatively, the VRU-related communications can be limited to specific time/frequency slots. In one example, specific RBs for VRU-related communication are reserved for individual VRUs 321/322p as shown by FIG. 4.

Figure 4:
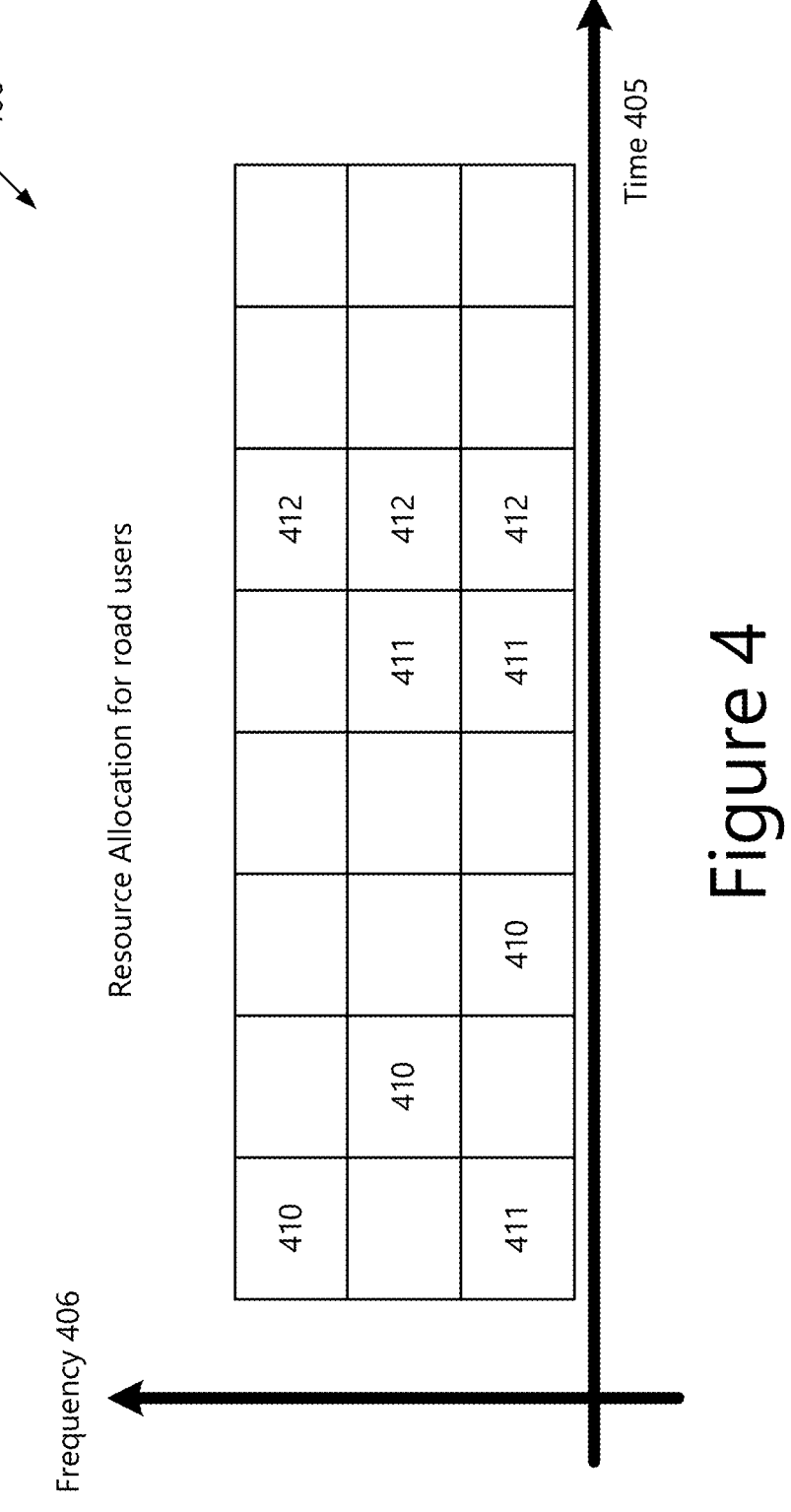

FIG. 4 shows an example time-frequency resource grid 400, which includes a time domain (axis) 405 and a frequency domain (axis) 406. The individual cells/elements in the resource grid 400 represent individual resource blocks (RBs) (note that not all RBs are not labeled in FIG. 4 for the sake of clarity). One or more transmissions are scheduled in each RB. Each RB comprises a collection of resource elements (REs) (not shown by FIG. 4), and describes the mapping of certain physical channels to REs. An RE represents the smallest time-frequency unit in a resource grid 400. In one example, an RB can include 12 consecutive subcarriers in the frequency domain 406 and 1 slot in the time domain 405, and an individual RE can be 1 subcarrier and/or 1 OFDM symbol. Additionally, the RBs may be physical RBs (PRBs), virtual RBs (VRBs), or common RBs (CRBs). Furthermore, the RBs can be part of a bandwidth part (BWP). A BWP is a subset of contiguous CRBs and/or PRBs on a given carrier.

In various implementations, VRU-related communication is limited to specific time/frequency slots in the RB grid 400. In the example of FIG. 4, RBs 410 are allocated for transmissions to/from a first V-ITS-S 321 and/or 322, RBs 411 are allocated for transmissions to/from a second V-ITS-S 321, 322, and RBs 412 are allocated for transmissions to/from a VRU ITS-S 321/322$p$. In some implementations, such information can for example be provided through RSUs/NANs 331 and/or through the Uu interface 304 (see e.g., FIG. 3). Additionally or alternatively, corresponding signaling/messages can include the following DEs/DFs: (1) a message ID indicating that time/frequency slot indications for VRU information is provided; and (2) information/configuration on RBs being reserved for VRU-related communication. In some implementations, only a subset of frames/subframes is used for VRU-related communication, and the VRU devices 321/322$p$ can choose to only listen to (monitor) the predetermined or configured frames.

When V-ITS-S 321, 322 transmit information, they identify whether the information is of relevance to VRUs 321/322$p$ or not. If information is relevant to VRUs 321/322$p$, the V-ITS-S 321, 322 transmit it in the VRU RB allocations (e.g., in RBs 412). Otherwise, any other RB choice can be used, for example, in accordance to 3GPP specifications/standards such as those relevant to resource pool concept and/or the like.

2. Computing System and Network Configurations and Arrangements

Intelligent Transport Systems (ITS) comprise advanced apps and services related to different modes of transportation and traffic to enable an increase in traffic safety and efficiency, and to reduce emissions and fuel consumption. Various forms of wireless communications and/or Radio Access Technologies (RATs) may be used for ITS. Cooperative Intelligent Transport Systems (C-ITS) have been developed to enable an increase in traffic safety and efficiency, and to reduce emissions and fuel consumption. The initial focus of C-ITS was on road traffic safety and especially on vehicle safety. C-ITS includes Collective Perception Service (CPS), which supports ITS apps in the road and traffic safety domain by facilitating information sharing among ITS stations.

FIG. 6 illustrates an overview of an vehicular network environment 600, which includes vehicles 610$a$, 610$b$, and 610$c$ (collectively referred to as "vehicle 610" or "vehicles 610"), vulnerable road user (VRU) 616, a network access node (NAN) 630, edge compute node 640, and a service provider platform (SPP) 690 (also referred to as "cloud computing service 690", "cloud 690", "servers 690", or the like). Vehicles 610$a$ and 610$b$ are illustrated as motorized vehicles, each of which are equipped with an engine, transmission, axles, wheels, as well as control systems used for driving, parking, passenger comfort and/or safety, and/or the like. The terms "motor", "motorized", and/or the like as used herein refer to devices that convert one form of energy into mechanical energy, and include internal combustion engines (ICE), compression combustion engines (CCE), electric motors, and hybrids (e.g., including an ICE/CCE and electric motor(s)), which may utilize any suitable form of fuel.

Vehicle 610$c$ is illustrated as a remote controlled or autonomous flying quadcopter, which can include various components such as, for example, a fuselage or frame, one or more rotors (e.g., either fixed-pitch rotors, variable-pitch rotors, coaxial rotors, and/or the like), one or more motors, a power/energy source (e.g., batteries, hydrogen fuel cells, solar cells, hybrid gas-electric generators, and the like), one or more sensors, and/or other like components (not shown), as well as control systems for operating the vehicle 610$c$ (e.g., flight controller (FC), flight controller board (FCB), UAV systems controllers, and the like), controlling the on-board sensors, and/or for other purposes. The vehicles 610$a$, a 10b may represent motor vehicles of varying makes, models, trim, and/or the like, and/or any other type of vehicles, and vehicle 610$c$ may represent any type of flying drone and/or unmanned aerial vehicle (UAV). Additionally, the vehicles 610 may correspond to the vehicle computing system 900 of FIG. 9.

Environment 600 also includes VRU 616, which includes a VRU device 610$v$ (also referred to as "VRU equipment 610$v$", "VRU system 610$v$", or simply "VRU 610$v$"). The VRU 616 is a non-motorized road user, such as a pedestrian, light vehicle carrying persons (e.g., wheelchair users, skateboards, e-scooters, Segways, and/or the like), motorcyclist (e.g., motorbikes, powered two wheelers, mopeds, and/or the like), and/or animals posing safety risk to other road users (e.g., pets, livestock, wild animals, and/or the like). The VRU 610$v$ includes an ITS-S that is the same or similar as the ITS-S 613 discussed previously, and/or related hardware components, other in-station services, and sensor subsystems. The VRU 610$v$ could be a pedestrian-type VRU device 610$v$ (e.g., a personal computing system 1000 of FIG. 10, such as a smartphone, tablet, wearable device, and the like), a vehicle-type VRU device 610$v$ (e.g., a device embedded in or coupled with a bicycle, motorcycle, or the like, or a pedestrian-type VRU device 610$v$ in or on a bicycle, motorcycle, or the like), and/or an IoT device (e.g., traffic control devices) and/or some other small form factor equipment/device used by a VRU 610$v$ integrating ITS-S technology. Various details regarding VRUs and VAMs are discussed in ['398], ETSI TR 103 300-1 V2.3.1 (2022 November) ("[TR103300-1]"), ETSI TS 103 300-2 V2.2.1 (2021 April) ("[TS103300-2]"), and ETSI TS 103 300-3 V2.2.1 (2023 February) ("[TS103300-3]"). For purposes of the present disclosure, the term "VRU 610$v$" may to refer to both the VRU 616 and its VRU device 610$v$, and/or a combined VRU, unless the context dictates otherwise. The various vehicles 610 referenced throughout the present disclosure, may be referred to as vehicle UEs (vUEs) 610, vehicle stations 610, vehicle ITS stations (V-ITS-S) 610, computer-assisted or autonomous driving (CA/AD) vehicles 610, drones 610, robots 610, and/or the like. Additionally, the term "user equipment 610", "UE 610", "ITS-S 610", "station 610", or "user 610" (either in singular or plural form) may to collectively refer to the vehicle 610$a$, vehicle 610$b$, vehicle 610$c$, and VRU 610$v$, unless the context dictates otherwise.

For illustrative purposes, the following description is provided for deployment scenarios including vehicles 610 in a 2D freeway/highway/roadway environment wherein the vehicles 610 are automobiles. However, other types of vehicles are also applicable, such as trucks, busses, motorboats, motorcycles, electric personal transporters, Segways, and/or any other motorized devices capable of transporting people or goods. In another example, the vehicles 610 may be robots operating in an industrial environment or the like. 3D deployment scenarios are also applicable where some or all of the vehicles 610 are implemented as flying objects, such as aircraft, drones, UAVs, and/or to any other like motorized devices. Additionally, for illustrative purposes, the following description is provided where each vehicle 610 includes in-vehicle systems (IVS) 611. However, the UEs 610 could include any additional or alternative types of computing devices/systems, such as, for example, smartphones, tablets, wearables, head-up display (HUD) device, head-mounted display device, helmet-mounted display devices, personal digital assistants (PDAs), pagers, wireless handsets, smart appliances, single-board computers (SBCs) (e.g., Raspberry Pi®, Arduino®, Intel® Edison®, and/or the like), performance monitoring devices, plug computers, compute sticks or dongles, laptops, desktop computers, workstations, robots, drones, micro-mobility vehicles/devices (e.g., powered two wheelers (PTW) (e.g., mopeds, motorcycles, and/or the like), bicycles and/or powered/ electric bicycles, standing or seated scooters and/or powered/electric scooters, powered/electric self-balancing boards, skates and/or powered/electric skates, powered/electric wheelchairs and/or personal transporters, and/or the like), in-vehicle infotainment system, in-car entertainment system, instrument cluster, onboard diagnostic device, onboard unit, dashtop mobile equipment, mobile data terminal, electronic engine management system, electronic/engine control unit and/or electronic/engine control module, embedded system, microcontroller, control module, programmable logic controller (PLC), and/or any other suitable device or system that may be operable to perform the functionality discussed herein, including any of the computing devices discussed herein.

Each station 610 includes an IVS 611, one or more sensors 612, ITS-S 613, and one or more driving control units (DCUs) 614 (also referred to as "electronic control units 614", "engine control units 614", or "ECUs 614"). For the sake of clarity, not all vehicles 610 are labeled as including these elements in FIG. 6. In various implementations, the ITS-S 613 includes a power optimization configuration(s) (PO) 615 that allows the station 610 to enable/ disable or activate/inactivate its communication functionality according to the power optimization approaches discussed herein (see e.g., section 1, discussed supra). Additionally, the VRU 610$v$ may include the same or similar components and/or subsystems as discussed herein w.r.t any of the vehicles 610, such as the sensors 612 and ITS-S 613. The IVS 600 includes a number of vehicle computing hardware subsystems and/or apps including, for example, instrument cluster subsystems, a head-up display (HUD) subsystem, infotainment/media subsystems, a vehicle status subsystem, a navigation subsystem (NAV), artificial intelligence and/or machine learning (AI/ML) subsystems, and/or other subsystems. The NAV provides navigation guidance or control, depending on whether vehicle 610 is a computer-assisted vehicle, or an autonomous driving vehicle. The NAV may include or access computer vision functionality of the and/or the AI/ML subsystem to recognize stationary or moving objects based on sensor data collected by sensors 612, and may be capable of controlling DCUs 614 based on the recognized objects. A VRU 616, 610$v$ may be configured with a VRU profile. VRU profiles are the basis for the further definition of the VRU functional architecture. The profiles are derived from the various use cases discussed herein. VAM dissemination/transmission is based on point-to-multipoint communication as discussed in ETSI EN 302 636-4-1 v 1.3.1 (2017 August) ("[EN302634-4-1]"), ETSI EN 302 636-3 v1.1.2 (2014 March) ("[EN302636-3]") may be used for transmitting VAMs, as specified in [TS103300-3]. Various aspects of VAM generation events, VRU profiles, VAM generation parameters, VAM generation triggering parameters, triggering conditions (e.g., individual VAM transmission management by the VBS 821 and cluster VAM transmission management by the VBS 821), individual VAMs, cluster VAMs, VAM redundancy mitigation, VAM generation frequency, and VAM timestamps are discussed in ['398] and [TS103300-3].

The UEs 610 also include respective ITS-Ss 613 that employ one or more Radio Access Technologies (RATs) to allows the UEs 610 to communicate directly with one another and/or with infrastructure equipment (e.g., network access node (NAN) 630). In some examples, the ITS-S 613 corresponds to the ITS-S 700 of FIG. 7. The one or more RATs may refer to cellular V2X (C-V2X) RATs (e.g., V2X technologies based on 3GPP LTE, 5G/NR, and beyond), a WLAN V2X (W-V2X) RAT (e.g., V2X technologies based on DSRC in the USA and/or ITS-G5 in the EU), and/or some other RAT, such as any of those discussed herein.

For example, the ITS-S 613 utilizes respective connections (also referred to as "channels" or "links") 620$a$, 620$b$, 620$c$, 620$v$ to communicate data (e.g., transmit and receive) data with the NAN 630. The connections 620$a$, 620$b$, 620$c$, 620$v$ are illustrated as an air interface to enable communicative coupling consistent with one or more communications protocols, such as any of those discussed herein. The ITS-Ss 613 can directly exchange data with one another via respective direct links 623$ab$, 623$bc$, 623$vc$, each of which may be based on 3GPP or C-V2X RATs (e.g., LTE/NR Proximity Services (ProSe) link, PC5 links, sidelink channels, LTE/5G Uu interface, and/or the like), IEEE or W-V2X RATs (e.g., WiFi-direct, [IEEE80211p], IEEE 802.11bd, [IEEE802154], ITS-G5, DSRC, WAVE, and/or the like), or some other RAT (e.g., Bluetooth®, and/or the like). The ITS-Ss 613 exchange ITS protocol data units (PDUs) (e.g., CAMs, CPMs, DENMs, misbehavior reports, and/or the like) and/or other messages with one another over respective links 623 and/or with the NAN 630 over respective links 620.

The ITS-S 613 are also capable of collecting or otherwise obtaining radio information, and providing the radio information to the NAN 630, the edge compute node 640, and/or the SPP/cloud 690. The radio information may be in the form of one or more measurement reports, and/or may include, for example, signal strength measurements, signal quality measurements, and/or the like. Each measurement report is tagged with a timestamp and the location of the measurement (e.g., a UE's 610 current location). As examples, the measurements collected by the UEs 610 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet error ratio (PER), packet loss rate, packet reception rate (PRR), data rate, peak data rate, end-to-end (e2e) delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/N0), energy per chip to interference power density ratio (Ec/I0), energy per chip to noise power density ratio (Ec/N0), peak-to-average power ratio (PAPR), reference signal received power (RSRP), reference signal received quality (RSRQ), received signal strength indicator (RSSI), received channel power indicator (RCPI), received signal to noise indicator (RSNI), Received Signal Code Power (RSCP), average noise plus interference (ANPI), GNSS timing of cell frames for UE positioning for E-UTRAN or 5G/NR (e.g., a timing between an NAN 630 reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurements, thermal noise power measurements, received interference power measurements, power histogram measurements, channel load measurements, STA statistics, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR), and RSRP, RSSI, RSRQ, RCPI, RSNI, and/or ANPI measurements of various beacon, Fast Initial Link Setup (FILS) discovery frames, or probe response frames for WLAN/WiFi (e.g., [IEEE80211]) networks. Other measurements may be additionally or alternatively used, such as those discussed in ['398] and/or discussed in 3GPP TS 36.214 v17.0.0 (2022 Mar. 31) ("[TS36214]"), 3GPP TS 38.215 v17.2.0 (2022 Sep. 21) ("[TS38215]"), 3GPP TS 38.314 v17.2.0 (2023 Jan. 13) ("[TS38314]"), 3GPP TS 28.552 v18.1.0 (2023 Jan. 6) ("[TS28552]"), 3GPP TS 32.425 v17.1.0 (2021 Jun. 24) ("[TS32425]"), *IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications, IEEE Std* 802.11-2020, pp. 1-4379 (26 Feb. 2021) ("[IEEE80211]"), and/or the like. Additionally or alternatively, any of the measurements (or combination of measurements) may be collected by the NAN 630 and provided to the edge compute node(s) 640, cloud compute node(s) 690 (or app server(s) 690). The measurements/metrics can also be those defined by other suitable specifications/standards, such as 3GPP (e.g., [SA6Edge]), ETSI (e.g., [MEC]), O-RAN (e.g., [O-RAN]), Intel® Smart Edge Open (formerly OpenNESS) (e.g., [ISEO]), IETF (e.g., [MEC]), IEEE/WiFi (e.g., [IEEE80211], [WiMAX], [IEEE16090], and/or the like), and/or any other like standards such as those discussed elsewhere herein. Some or all of the UEs 610 can include positioning circuitry (e.g., positioning circuitry 1243 of FIG. 12) to (coarsely) determine their respective geolocations and communicate their current position with one another and/or with the NAN 630 in a secure and reliable manner. This allows the UEs 610 to synchronize with one another and/or with the NAN 630.

The DCUs 614 include hardware elements that control various (sub)systems of the vehicles 610, such as the operation of the engine(s)/motor(s), transmission, steering, braking, rotors, propellers, servos, and/or the like. DCUs 614 are embedded systems or other like computer devices that control a corresponding system of a vehicle 610. The DCUs 614 may each have the same or similar components as compute node 1200 of FIG. 12 discussed infra, or may be some other suitable microcontroller or other like processor device, memory device(s), communications interfaces, and the like. Additionally or alternatively, one or more DCUs 614 may be the same or similar as the actuators 1244 of FIG. 12. Furthermore, individual DCUs 614 are capable of communicating with one or more sensors 612 and one or more actuators 1244 within the UE 610.

The sensors 612 are hardware elements configurable or operable to detect an environment surrounding the vehicles 610 and/or changes in the environment. The sensors 612 are configurable or operable to provide various sensor data to the DCUs 614 and/or one or more AI agents to enable the DCUs 614 and/or one or more AI agents to control respective control systems of the vehicles 610. In particular, the IVS 611 may include or implement a facilities layer and operate one or more facilities within the facilities layer. The sensors 612 include(s) devices, modules, and/or subsystems whose purpose is to detect events or changes in its environment and send the information (sensor data) about the detected events to some other a device, module, subsystem, and/or the like. Some or all of the sensors 612 may be the same or similar as the sensor circuitry 1242 of FIG. 12.

The NAN 630 is a network element that is part of an access network that provides network connectivity to the UEs 610 via respective interfaces/links 620. In V2X scenarios, the NAN 630 may be or act as an road side unit (RSU) or roadside (R-ITS-S), which refers to any transportation infrastructure entity used for V2X communications. In these scenarios, the NAN 630 includes an ITS-S that is the same or similar as ITS-S 613 and/or may be the same or similar as the roadside infrastructure system 1100 of FIG. 11. The access network may be Radio Access Networks (RANs) such as an NG-RAN or a 5G RAN for a RAN that operates in a 5G/NR cellular network, an E-UTRAN for a RAN that operates in an LTE or 4G cellular network, a legacy RAN such as a UTRAN or GERAN for GSM or CDMA cellular networks, an Access Service Network for WiMAX implementations, and/or the like. All or parts of the RAN may be implemented as one or more RAN functions (RANFs) or other software entities running on server(s) as part of a virtual network, which may be referred to as a cloud RAN (CRAN), Cognitive Radio (CR), a virtual RAN (vRAN), RAN intelligent controller (RIC), and/or the like. The RAN may implement a split architecture wherein one or more communication protocol layers are operated by the RANF or controller and other communication protocol entities are operated by individual NANs 630. In either implementation, the NAN 630 can include ground stations (e.g., terrestrial access points) and/or satellite stations to provide network connectivity or coverage within a geographic area (e.g., a cell). The NAN 630 may be implemented as one or more dedicated physical devices such as a macrocell base stations and/or a low power base station for providing femtocells, picocells, or other like cells having smaller coverage areas, smaller user capacity, or higher bandwidth compared to macrocells.

As alluded to previously, the RATs employed by the NAN 630 and the UEs 610 may include any number of V2X RATs may be used for V2X communication, which allow the UEs 610 to communicate directly with one another, and/or communicate with infrastructure equipment (e.g., NAN 630). As examples, the V2X RATs can include a WLAN V2X (W-V2X) RAT based on IEEE V2X technologies and a cellular V2X (C-V2X) RAT based on 3GPP technologies. The C-V2X RAT may be based on any suitable 3GPP standard including any of those mentioned herein. The W-V2X RATs include, for example, *IEEE Guide for Wireless Access in Vehicular Environments (WAVE) Architecture, IEEE Std* 1609.0-2019, pp. 1-106 (10 Apr. 2019) ("[IEEE16090]"), *V2X Communications Message Set Dictionary, SAE Std* J2735_202211 (14 Nov. 2022) ("[J2735]"), Intelligent Transport Systems in the 5 GHz frequency band (ITS-G5), the [IEEE80211p] (which is the layer 1 (L1) and layer 2 (L2) part of WAVE, DSRC, and ITS-G5), and sometimes *IEEE Standard for Air Interface for Broadband Wireless Access Systems*, IEEE Std 802.16-2017, pp. 1-2726 (2 Mar. 2018) (sometimes referred to as "World-wide Interoperability for Microwave Access" or "WiMAX") ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including [IEEE80211p]-based RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020 January) ("[EN302663]") and describes the access layer of the ITS-S reference architecture 700. The ITS-G5 access layer comprises [IEEE80211] (which now incorporates [IEEE80211p]) and/or IEEE/ISO/IEC 8802-2-1998 protocols, as well as features for Decentralized Congestion Control (DCC) methods discussed in ETSI TS 102 687 V1.2.1 (2018 April) ("[TS102687]"). The access layer for 3GPP C-V2X based interface(s) is outlined in, inter alia, ETSI EN 303 613 V1.1.1 (2020 January), 3GPP TS 23.285 v17.1.0 (2022 Jun. 15) ("[TS23285]"); and 3GPP 5G/NR-V2X is outlined in, inter alia, 3GPP TR 23.786 v16.1.0 (2019 June) and 3GPP TS 23.287 v18.0.0 (2023 Mar. 31) ("[TS23287]").

The NAN 630 and/or an edge compute node 640 may provide one or more services/capabilities 680. In an example implementation, RSU 630 is a computing device coupled with radio frequency circuitry located on a roadside that provides connectivity support to passing UEs 610. The RSU 630 may also include internal data storage circuitry to store intersection map geometry, traffic statistics, media, as well as apps/software to sense and control ongoing vehicular and pedestrian traffic. The RSU 630 provides various services/capabilities 680 such as, for example, very low latency communications required for high speed events, such as crash avoidance, traffic warnings, and the like. Additionally or alternatively, the RSU 630 may provide other services/capabilities 680 such as, for example, cellular/WLAN communications services. In some implementations, the components of the RSU 630 may be packaged in a weatherproof enclosure suitable for outdoor installation, and may include a network interface controller to provide a wired connection (e.g., Ethernet or the like) to a traffic signal controller and/or a backhaul network. Further, RSU 630 may include wired or wireless interfaces to communicate with other RSUs 630 (not shown by FIG. 6).

The network 665 may represent a network such as the Internet, a wireless local area network (WLAN), or a wireless wide area network (WWAN), a cellular network and/or cellular core network, a backbone network, an edge computing network, a cloud computing service, a data network (DN), proprietary and/or enterprise networks for a company or organization, and/or combinations thereof. As examples, the network 665 and/or access technologies may include cellular technology (e.g., 3GPP LTE, NR/5G, MuLTEfire, WiMAX, and so forth), WLAN (e.g., WiFi and the like), and/or any other suitable access technology, such as any of those discussed herein.

The SPP 690 may represent one or more app servers, a cloud computing service that provides cloud computing services, and/or some other remote infrastructure. The SPP 690 may include any one of a number of services and capabilities 680 such as, for example, ITS-related apps and services, driving assistance (e.g., mapping/navigation), content (e.g., multi-media infotainment) streaming services, social media services, and/or any other services. In various implementations, the services/capabilities 680 provided by the SPP 690 includes a RUM service 605c that is configured to operate aspects of the infrastructure-centric RUM approaches and/or the charging-based RUM approaches discussed herein. In some implementations, the RUM service 605c is implemented or embodied as an application function and/or a cloud computing service that interacts with other apps/functions/services 680 provided by the SPP 690. Additionally or alternatively, the SPP 690 provides geographic mapping services, spatial analysis services, and/or location-based services, such as any of those discussed herein.

An edge compute node 640 (or a collection of edge compute nodes 640 as part of an edge network or "edge cloud") is colocated with the NAN 630. The edge compute node 640 includes an edge platform (also referred to as "edge platform 640") may provide any number of services/capabilities 680 to UEs 610, which may be the same or different than the services/capabilities 680 provided by the service provider platform 690. For example, the services/capabilities 680 provided by edge compute node 640 can include a distributed computing environment for hosting apps and services, and/or providing storage and processing resources so that data and/or content can be processed in close proximity to subscribers (e.g., UEs 610). The edge compute node 640 also supports multitenancy run-time and hosting environment(s) for apps, including virtual appliance apps that may be delivered as packaged virtual machine (VM) images, middleware and infrastructure services, cloud-computing capabilities, IT services, content delivery services including content caching, mobile big data analytics, and computational offloading, among others. Computational offloading involves offloading computational tasks, workloads, apps, and/or services to the edge compute node 640 from the UEs 610, core network, cloud service, and/or server(s) 690, or vice versa. For example, a device app or client app operating in a ITS-S 610 may offload app tasks or workloads to one or more edge servers 640. In another example, an edge server 640 may offload app tasks or workloads to one or more UEs 610 (e.g., for distributed ML computation or the like).

The edge compute node 640 includes or is part of an edge computing network (or edge cloud) that employs one or more edge computing technologies (ECTs). In one example implementation, the ECT is and/or operates according to the MEC framework, as discussed in ETSI GR MEC 001 V3.1.1 (2022 January), ETSI GS MEC 003 V3.1.1 (2022 March), ETSI GS MEC 009 V3.2.1 (2022 July), ETSI GS MEC 010-1 V1.1.1 (2017 October), ETSI GS MEC 010-2 V2.2.1 (2022 February), ETSI GS MEC 011 v3.1.1 (202-09), ETSI GS MEC 012 V2.2.1 (2022 February), ETSI GS MEC 013 V3.1.1 (2023 January), ETSI GS MEC 014 V2.1.1 (2021 March), ETSI GS MEC 015 V2.2.1 (2022 December), ETSI GS MEC 016 V2.2.1 (2020 April), ETSI GS MEC 021 v2.2.1 (2022 February), ETSI GR MEC 024 v2.1.1 (2019 November), ETSI GS MEC 028 V2.3.1 (2022 July), ETSI GS MEC 029 v2.2.1 (2022 January), ETSI GS MEC 030 v3.1.1 (2023 March), and ETSI GR MEC 031 v2.1.1 (2020 October) (collectively referred to herein as "[MEC]"), the contents of each of which are hereby incorporated by reference in their entireties. In another example implementation, the ECT is and/or operates according to the Open RAN alliance ("O-RAN") framework, as described in *O-RAN Architecture Description* v07.00, O-RAN ALLIANCE WG1 (October 2022); *O-RAN Working Group 2 AI/ML workflow description and requirements* v01.03 O-RAN ALLI-ANCE WG2 (October 2021); *O-RAN Working Group 2 Non-RT RIC: Functional Architecture* v01.01, O-RAN ALLIANCE WG2 (June 2021); *O-RAN Working Group 3 Near-Real-time RAN Intelligent Controller Architecture & E2 General Aspects and Principles* v02.02 (July 2022); *O-RAN Working Group 3 Near-Real-time Intelligent Controller E2 Service Model (E2SM)* v02.01 (March 2022); and/or any other O-RAN standard/specification (collectively referred to as "[O-RAN]"), the contents of each of which are hereby incorporated by reference in their entireties. In another example implementation, the ECT is and/or operates according to the 3rd Generation Partnership Project (3GPP) System Aspects Working Group 6 (SA6) Architecture for enabling Edge Applications (referred to as "3GPP edge computing") as discussed in 3GPP TS 23.558 v18.1.0 (2022 Dec. 23) ("[TS23558]"), 3GPP TS 23.501 v18.0.0 (2022 Dec. 21) ("[TS23501]"), 23.548 v18.0.0 (2022 Dec. 21) ("[TS23548]"), 3GPP TR 23.700-98 v18.0.0 (2022 Dec. 23) ("[TR23700-98]"), and U.S. application Ser. No. 17/484,719 filed on 24 Sep. 2021 ("['719]") (collectively referred to as "[SA6Edge]"), the contents of each of which are hereby incorporated by reference in their entireties. In another example implementation, the ECT is and/or operates according to the Intel® Smart Edge Open framework (formerly known as OpenNESS) as discussed in Intel® Smart Edge Open Developer Guide, version 21.09 (30 Sep. 2021), available at: https://smart-edge-open.github.io/("[ISEO]"), the contents of which is hereby incorporated by reference in its entirety. In another example implementation, the ECT operates according to the Multi-Access Management Services (MAMS) framework as discussed in Kanugovi et al., *Multi-Access Management Services (MAMS)*, INTERNET ENGI-NEERING TASK FORCE (IETF), Request for Comments (RFC) 8743 (March 2020), Ford et al., *TCP Extensions for Multipath Operation with Multiple Addresses*, IETF RFC 8684, (March 2020), De Coninck et al., *Multipath Extensions for QUIC (MP-QUIC)*, IETF DRAFT-DECONINCK-QUIC-MULTIPATH-07, IETA, QUIC Working Group (3 May 2021), Zhu et al., *User-Plane Protocols for Multiple Access Management Service*, IETF DRAFT-ZHU-INTAREA-MAMS-USER-PROTOCOL-09, IETA, INTAREA (4 Mar. 2020), and Zhu et al., *Generic Multi-Access (GMA) Convergence Encapsulation Protocols*, IETF RFC 9188 (February 2022) (collectively referred to as "[MAMS]"), the contents of each of which are hereby incorporated by reference in their entireties. Any of the aforementioned example implementations, and/or in any other example implementation discussed herein, may also include one or more virtualization technologies, such as those discussed in ETSI GRNFV 001 V1.3.1 (2021 March); ETSI GS NFV 002 V1.2.1 (2014 December); ETSI GRNFV 003 V1.6.1 (2021 March); ETSI GS NFV 006 V2.1.1 (2021 January); ETSI GS NFV-INF 001 V1.1.1 (2015 January); ETSI GS NFV-INF 003 V1.1.1 (2014 December); ETSI GS NFV-INF 004 V1.1.1 (2015 January); ETSI GS NFV-MAN 001 v1.1.1 (2014 December); Israel et al., *OSM Release FIVE Technical Overview*, ETSI OPEN SOURCE MANO, OSM White Paper, 1st ed. (January 2019); *E2E Network Slicing Architecture*, GSMA, Official Doc. NG.127, v1.0 (3 Jun. 2021); *Open Network Automation Platform (ONAP) documentation*, Release Istanbul, v9.0.1 (17 Feb. 2022); 3GPP Service Based Management Architecture (SBMA) as discussed in 3GPP TS 28.533 v17.1.0 (2021 Dec. 23) ("[TS28533]"); the contents of each of which are hereby incorporated by reference in their entireties. It should be understood that the aforementioned edge computing frameworks/ECTs and services deployment examples are only illustrative examples of ECTs, and that the present disclosure may be applicable to many other or additional edge computing/networking technologies in various combinations and layouts of devices located at the edge of a network including the various edge networks/ECTs described herein. Further, the techniques disclosed herein may relate to other IoT ECTs, edge networks, and/or and configurations, and other intermediate processing entities and architectures may also be applicable to the present disclosure. For example, many ECTs and/or edge networking technologies may be applicable to the present disclosure in various combinations and layouts of devices located at the edge of a network. Examples of such edge computing/networking technologies include [MEC]; [O-RAN]; [ISEO]; [SA6Edge]; Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Data-center (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure.

Figure 7:
FIG. 7 depicts an ITS-S reference architecture.
Figure 7:

FIG. 7 shows an example ITS-S reference architecture 700. Some or all of the components depicted by FIG. 7 follows the ITSC protocol, which is based on the principles of the OSI model for layered communication protocols extended for ITS applications (apps). The ITSC 700 includes an access layer 704 that corresponds with the OSI layers 1 and 2, a networking & transport (N&T) layer 703 that corresponds with OSI layers 3 and 4, the facilities layer which corresponds with OSI layers 5, 6, and at least some functionality of OSI layer 7, and an apps layer 701 that corresponds with some or all of OSI layer 7. Each of these layers are interconnected via respective observable interfaces, service access points (SAPs), APIs, middleware, and/or other like connectors or interfaces (see e.g., ETSI EN 302 665 V1.1.1 (2010 September) ("[EN302665]")). Each of the interfaces/SAPs may provide the full duplex exchange of data with the facilities layer 702, and may implement suitable APIs to enable communication between the various entities/elements.

The apps layer 701 provides ITS services, and ITS apps are defined within the app layer 701. An ITS app is an app layer entity that implements logic for fulfilling one or more ITS use cases. An ITS app makes use of the underlying facilities and communication capacities provided by the ITS-S. Each app can be assigned to one of the three identified app classes: road safety, traffic efficiency, and other apps (see e.g., [EN302663]), ETSI TR 102 638 V1.1.1 (2009 June) ("[TR102638]"), and ETSI TS 102 940 v2.1.1 (2021 July) ("[TS102940]")). Examples of ITS apps may include driving assistance for cooperative awareness (CA), driving assistance for road hazard warnings (RHW), Automatic Emergency Braking (AEB), Forward Collision Warning (FCW), cooperative adaptive cruise control (CACC), control loss warning (CLW), queue warning, Automated Parking System (APS), pre-crash sensing warning, cooperative Speed Management (CSM) (e.g., curve speed warning and the like), mapping and/or navigation apps (e.g., turnby-turn navigation and cooperative navigation), cooperative navigation (e.g., platooning and the like), location based services (LBS), community services, ITS-S lifecycle management services, transport related electronic financial transactions, traffic light maneuver (TLM), road and lane topology (RLT), infrastructure to vehicle information (IVI), traffic light control (TLC), and the like. A V-ITS-S 610 provides ITS apps to vehicle drivers and/or passengers, and may require an interface for accessing in-vehicle data from the in-vehicle network or in-vehicle system. For deployment and performances needs, specific instances of a V-ITS-S 610 may contain groupings of apps and/or facilities. In some examples, the apps layer 701 recommends a possible distribution of functional entities that would be involved in the protection of VRUs 616 based on the analysis of VRU use cases. In this example, the apps layer 701 includes device role setting function/app 711, infrastructure services function/app 712, maneuver coordination function/app 713, cooperative perception function/app 714, remote sensor data fusion function/app 715, collision risk (CR) analysis function/app 716, CR avoidance function/app 717, and event detection function/app 718.

The device role setting module 711 takes the configuration parameter settings and user preference settings and enables/disables different VRU profiles depending on the parameter settings, user preference settings, and/or other data (e.g., sensor data and the like). A VRU can be equipped with a portable device which needs to be initially configured and may evolve during its operation following context changes which need to be specified. This is particularly true for the setting-up of the VRU profile and type which can be achieved automatically at power on or via an HMI. The change of the road user vulnerability state needs to be also provided either to activate the VBS 721 when the road user becomes vulnerable or to de-activate it when entering a protected area. The initial configuration can be set-up automatically when the device is powered up. This can be the case for the VRU equipment type which may be: VRU-Tx (e.g., a VRU only with the communication capability to broadcast messages complying with the channel congestion control rules); VRU-Rx (a VRU only communication capability to receive messages); and VRU-St (e.g., a VRU with full duplex (e.g., Tx and Rx) communication capabilities). During operation the VRU profile may also change due to some clustering or de-assembly. Consequently, the VRU device role will be able to evolve according to the VRU profile changes The infrastructure services module 712 is responsible for launching new VRU instantiations, collecting usage data, and/or consuming services from infrastructure stations. Existing infrastructure services 712 such as those described herein can be used in the context of the VBS 721. The broadcast of the SPAT & MAP (e.g., SPAT relevance delimited area) is already standardized and used by vehicles at intersection level. In principle they protect VRUs 616 crossing. However, signal violation warnings may exist and can be detected and signaled using DENM. This signal violation indication using DENMs is very relevant to VRU devices as indicating an increase of the collision risk with the vehicle which violates the signal. If it uses local captors or detects and analyses VAMs, the traffic light controller may delay the red phase change to green and allow the VRU to safely terminate its road crossing. The contextual speed limit using IVI (In Vehicle Information) can be adapted when a large cluster of VRUs 616 is detected (ex: limiting the vehicles' speed to 30 km/hour). At such reduced speed a vehicle may act efficiently when perceiving the VRUs 616 by means of its own local perception system The remote sensor data fusion and actuator apps/functions 715 (including ML/AI techniques such as any of those discussed herein) is also included in some implementations. The local perception data obtained by the computation of data collected by local sensors may be augmented by remote data collected by elements of the VRU system (e.g., VRU system 610v, V-ITS-Ss 610, R-ITS-Ss 630) via the ITS-S. These remote data are transferred using standard services such as the CPS and/or the like. In such case it may be necessary to fuse these data. In some implementations, the data fusion may provide at least three possible results: (i) After a data consistency check, the received remote data are not coherent with the local data, wherein the system element has to decide which source of data can be trusted and ignore the other; (ii) only one input is available (e.g., the remote data) which means that the other source does not have the possibility to provide information, wherein the system element may trust the only available source; and (iii) after a data consistency check, the two sources are providing coherent data which augment the individual inputs provided. The use of ML/AI may be necessary to recognize and classify the detected objects (e.g., VRU, motorcycle, type of vehicle, and/or the like) but also their associated dynamics. The AI/ML models/algorithms can be located in any element of the VRU system 610v. The same approach is applicable to actuators, but in this case, the actuators are the destination of the data fusion. In some implementations, the sensor data fusion and actuator apps/functions 715 may be the same or similar as the local device sensor fusion and actuator application 904, 1004, 1104.

The local perception is provided by the collection of information from the environment of the considered ITS element (e.g., VRU device, vehicle, infrastructure, and/or the like). This information collection is achieved using relevant sensors (e.g., optical camera, thermal camera, radar, LIDAR, sonar, microphones, and/or the like). The remote perception is provided by the provision of perception data via C-ITS (e.g., V2X communication). Existing basic services 726 (e.g., CA, CBS, CPS, RLT, TLM, and/or the like) can be used to transfer a remote perception. Several perception sources may then be used to achieve the cooperative perception function (CP) 714.

The CR analysis function 716 analyses the motion dynamic prediction of the considered moving objects associated to their respective levels of confidence (reliability). An objective is to estimate the likelihood of a collision and then to identify as precisely as possible the Time To Collision (TTC) if the resulting likelihood is high. Other variables may be used to compute this estimation. The VRU CR analysis function 716, and dynamic state prediction are able to reliably predict the relevant road users maneuvers with an acceptable level of confidence for the purpose of triggering the appropriate collision avoidance action, assuming that the input data is of sufficient quality. The CR analysis function 716 analyses the level of collision risk based on a reliable prediction of the respective dynamic state evolution. Consequently, the reliability level may be characterized in terms of confidence level for the chosen collision risk metrics as discussed in clauses 6.5.10.5 and 6.5.10.9 of [TS103300-2]. The confidence of a VRU dynamic state prediction is computed for the purpose of risk analysis. The prediction of the dynamic state of the VRU is complicated especially for some specific VRU profiles (e.g., animal, child, disabled person, and/or the like). Therefore, a confidence level may be associated to this prediction as explained in clauses 6.5.10.5, 6.5.10.6 and 6.5.10.9 of [TS103300-2]. The VRU movement reliable prediction is used to trigger the broadcasting of relevant VAMs when a risk of collision involving a VRU is detected with sufficient confidence to avoid false positive alerts (see e.g., clauses 6.5.10.5, 6.5.10.6 and 6.5.10.9 of [TS103300-2]).

The following two conditions are used to calculate the TTC. First, two or more considered moving objects follow trajectories which intersect somewhere at a position which can be called "potential conflict point". Second, if the moving objects maintain their motion dynamics (e.g., approaches, trajectories, speeds, and/or the like) it is possible to predict that they will collide at a given time which can be estimated through the computation of the time (referred to as Time To Collision (TTC)) necessary for them to arrive simultaneously at the level of the identified potential conflict point. The TTC is a calculated data element enabling the selection of the nature and urgency of a collision avoidance action to be undertaken. A TTC prediction may only be reliably established when the VRU 616 enters a collision risk area. This is due to the uncertainty nature of the VRU pedestrian motion dynamic (mainly its trajectory) before deciding to cross the road.

At the potential conflict point level, another measurement, the 'time difference for pedestrian and vehicle travelling to the potential conflict point' (TDTC) can be used to estimate the collision risk level. For example, if it is not acted on the motion dynamic of the pedestrian or/and on the motion dynamic of the vehicle, TDTC is equal to 0 and the collision is certain. Increasing the TDTC reduces the risk of collision between the VRU and the vehicle. The potential conflict point is in the middle of the collision risk area which can be defined according to the lane width (e.g., 3.5 m) and vehicle width (maximum 2 m for passenger cars).

The TTC is one of the variables that can be used to define a collision avoidance strategy and the operational collision avoidance actions to be undertaken. Other variables may be considered such as the road state, the weather conditions, the triple of {Longitudinal Distance (LoD), Lateral Distance (LaD), Vertical Distance (VD)} along with the corresponding threshold triple of {MSLaD, MSLoD, MSVD}, Trajectory Interception Indicator (TII), and the mobile objects capabilities to react to a collision risk and avoid a collision (see e.g., clause 6.5.10.9 in [TS103300-2]). The TII is an indicator of the likelihood that the VRU 616 and one or more other VRUs 616, non-VRUs, or even objects on the road are going to collide.

The CR analysis function 716 compares LaD, LoD and VD, with their respective predefined thresholds, MSLaD, MSLoD, MSVD, respectively, if all the three metrics are simultaneously less than their respective thresholds, that is LaD<MSLaD, LoD<MSLoD, VD<MSVD, then the collision avoidance actions would be initiated. Those thresholds could be set and updated periodically or dynamically depending on the speed, acceleration, type, and loading of the vehicles and VRUs 616, and environment and weather conditions. On the other hand, the TII reflects how likely is the ego-VRU ITS-S 610v trajectory going to be intercepted by the neighboring ITSs (e.g., other VRUs 616 and/or non-VRU ITSs such as vehicles 610). The likelihood of a collision associated with the TTC may also be used as a triggering condition for the broadcast of messages (e.g., an infrastructure element getting a complete perception of the situation may broadcast DENM, IVI (e.g., contextual speed limit), CPM, MCM, and/or some other suitable ITS message, such as any of those discussed herein).

The CR avoidance function/application 717 includes the collision avoidance strategy to be selected according to the TTC value. In the case of autonomous vehicles 610, the CR avoidance function 717 may involve the identification of maneuver coordination 713/vehicle motion control 908 to achieve the collision avoidance as per the likelihood of VRU trajectory interception with other road users captured by TII and Maneuver Identifier (MI) as discussed infra.

The collision avoidance strategy may consider several environmental conditions such as visibility conditions related to the local weather, vehicle stability conditions related to the road state (e.g., slippery), and vehicle braking capabilities. The vehicle collision avoidance strategy then needs to consider the action capabilities of the VRU according to its profile, the remaining TTC, the road and weather conditions as well as the vehicle autonomous action capabilities. The collision avoidance actions may be implemented using maneuver coordination 713 (and related maneuver coordination message (MCM) exchange) as done in the French PAC V2X project or other like systems. In one example, when in good conditions, it is possible to trigger a collision avoidance action when the TTC is greater than two seconds (one second for the driver reaction time and one second to achieve the collision avoidance action). Below two seconds, the vehicle can be considered to be in a "pre-crash" situation and so it needs to trigger a mitigation action to reduce the severity of the collision impact for the VRU 616, 610v. The possible collision avoidance actions and impact mitigation actions have been listed in requirement FSYS08 in clause 5 of [TS103300-2].

Road infrastructure elements (e.g., R-ITS-Ss 630) may also include a CR analysis function 716 as well as a CR avoidance function 717. These functions may indicate collision avoidance actions to the neighboring VRUs 616, 610v and/or V-ITS-Ss 610. In some examples, the collision avoidance actions for VRUs 616, 610v, V-ITS-Ss 610, and/or R-ITS-Ss 630 may depend on the level of automation of the vehicle, infrastructure, and/or VRU 610v. The collision avoidance action or impact mitigation action are triggered as a warning/alert to the driver or as a direct action on the UE 610 itself. Examples of collision avoidance include any combination of: extending or changing the phase of a traffic light; acting on the trajectory and/or velocity of the UEs 610 (e.g., slow down, change lane, and/or the like) if the vehicle 610 has a sufficient level of automation; alert the ITS device user through the HMI; disseminate a C-ITS message to other road users, including the VRU 616, 610v if relevant. Examples of impact mitigation actions may include any combination of triggering a protective mean at the vehicle level (e.g., extended external airbag); triggering a portable VRU protection airbag. The road infrastructure may offer services to support the road crossing by VRU such as traffic lights. When a VRU starts crossing a road at a traffic light level authorizing him, the traffic light should not change of phase as long as the VRU has not completed its crossing. Accordingly, the VAM can contain data elements enabling the traffic light to determine the end of the road crossing by the VRU 616, 610v.

The maneuver coordination function 713 executes the collision avoidance actions which are associated with the collision avoidance strategy that has been decided (and selected). The collision avoidance actions are triggered at the level of the VRU 616, 610v, the vehicle 610, or both, depending on the VRU capabilities to act (e.g., VRU profile and type), the vehicle type and capabilities and the actual risk of collision. VRUs 616, 610v do not always have the capability to act to avoid a collision (e.g., animal, children, aging person, disabled, and/or the like), especially if the TTC is short (a few seconds) (see e.g., clauses 6.5.10.5 and 6.5.10.6 of [TS103300-2]. This function should be present at the vehicle 610 level, depending also on the vehicle 610 level of automation (e.g., not present in non-automated vehicles), and may be present at the VRU device 610v level according to the VRU profile. At the vehicle 610 level, this function interfaces the vehicle electronics controlling the vehicle dynamic state in terms of heading and velocity. At the VRU device 610v level, this function may interface the HMI support function 724, according to the VRU profile, to be able to issue a warning or alert to the VRU 616, 610v according to the TTC.

Maneuver coordination 713 can be proposed to vehicles from an infrastructure element, which may be able to obtain a better perception of the motion dynamics of the involved moving objects, by means of its own sensors or by the fusion of their data with the remote perception obtained from standard messages (e.g., CAMs, CPMs, and/or the like). The maneuver coordination 713 at the VRU 616 may be enabled by sharing among the ego-VRU and the neighboring ITSs, first the TII reflecting how likely is the ego VRU ITS-Ss 610v trajectory going to be intercepted by the neighboring ITSs (other VRU or non-VRU ITSs such as vehicles), and second a Maneuver Identifier (MI) to indicate the type of VRU maneuvering needed. An MI is an identifier of a maneuver (to be) used in a maneuver coordination service (MCS) 713. The choice of maneuver may be generated locally based on the available sensor data at the VRU ITS-S 610v and may be shared with neighboring ITS-S (e.g., other VRUs 616 and/or non-VRUs) in the vicinity of the ego VRU ITS-S 610v to initiate a joint maneuver coordination among VRUs 616 (see e.g., clause 6.5.10.9 of [TS103300-2]).

Depending upon the analysis of the scene in terms of sensory as well as shared inputs, simple TII ranges can be defined to indicate the likelihood of the ego-VRU's 616 path to be intercepted by another entity. Such indication helps to trigger timely maneuvering. For instance, TII could be defined in terms of TII index that may simply indicate the chances of potential trajectory interception (low, medium, high or very high) for CR analysis 716. If there are multiple other entities, the TII may be indicated for the specific entity differentiable via a simple ID which depends upon the simultaneous number of entities in the vicinity at that time. The vicinity could even be just one cluster that the current VRU is located in. For example, the minimum number of entities or users in a cluster is 50 per cluster (worst case). However, the set of users that may have the potential to collide with the VRU could be much less than 50 thus possible to indicate via few bits in say, VAM. On the other hand, the MI parameter can be helpful in CR avoidance 717 by triggering/suggesting the type of maneuver action needed at the VRUs 616, 610v. The number of such possible maneuver actions may be only a few. For simplicity, it could also define as the possible actions to choose from as {longitudinal trajectory change maneuvering, lateral trajectory change maneuvering, heading change maneuvering or emergency braking/deceleration} in order to avoid potential collision indicated by the TII. The TII and MI parameters can also be exchanged via inclusion in part of a VAM DF structure.

The event detection function 718 assists the VBS 721 during its operation when transitioning from one state to another. Examples of the events to be considered include: change of a VRU role when a road user becomes vulnerable (activation) or when a road user is not any more vulnerable (de-activation); change of a VRU profile when a VRU enters a cluster with other VRU(s) or with a new mechanical element (e.g., bicycle, scooter, moto, and/or the like), or when a VRU cluster is disassembling; risk of collision between one or several VRU(s) and at least one other VRU (using a VRU vehicle) or a vehicle (such event is detected via the perception capabilities of the VRU system); change of the VRU motion dynamic (trajectory or velocity) which will impact the TTC and the reliability of the previous prediction; and change of the status of a road infrastructure piece of equipment (e.g., a traffic light phase) impacting the VRU movements.

The facilities layer 702 comprises middleware, software connectors, software glue, or the like, comprising multiple facility layer functions (or simply "facilities"). In particular, the facilities layer contains functionality from the OSI application layer, the OSI presentation layer (e.g., ASN.1 encoding and decoding, and encryption) and the OSI session layer (e.g., inter-host communication). A facility is a component that provides functions, information, and/or services to the applications in the application layer and exchanges data with lower layers for communicating that data with other ITS-Ss. C-ITS facility services can be used by ITS apps. Examples of these facility services include: VRU awareness provided by the VRU basic service facility (VBS) 721 to create and maintain awareness of VRUs participating in the VRU system; Positioning and Time management (PoTi) provided by a PoTi facility 722; Local Dynamic Map (LDM) provided by LDM facility 723; HMI support provided by the HMI support facility 724; Decentralized Congestion Control (DCC) provided by a DCC-FAC facility 725; Device Data Provider (DDP) facility 726; and other facility layer services 727 such as, for example, Cooperative Awareness (CA) provided by cooperative awareness basic service (CABS) facility (see e.g., ETSI EN 302 637-2 v1.4.1 (2019 April) ("[EN302637-2]")) to create and maintain awareness of ITS-Ss and to support cooperative performance of vehicles using the road network; Decentralized Environmental Notification (DEN) provided by a DEN basic service facility to alert road users of a detected event using ITS communication technologies; Cooperative Perception (CP) provided by a CP services (CPS) facility (see e.g., ETSI TS 103 324 v0.0.22 (2021 May) ("[TS103324]"), which is hereby incorporated by reference in its entirety) complementing or replacing the CABS to specify how an ITS-S can inform other ITS-Ss about the position, dynamics and attributes of detected neighbouring road users and other objects; Multimedia Content Dissemination (MCD) to control the dissemination of information using ITS communication technologies; Interference Management Zone to support the dynamic band sharing in co-channel and adjacent channel scenarios between ITS stations and other services and applications; Diagnosis, Logging and Status for maintenance and information purposes; Signal Phase and Timing Service (SPATS) and/or Traffic Light Maneuver (TLM) service (see e.g., ETSI TS 103 301 V2.1.1 (2021 March) ("[TS103301]"), the contents of which is hereby incorporated by reference in its entirety); digital map service (MAP); Maneuver Coordination Services (MCS); Road and Lane Topology (RLT) services to receive MAPEMs. Information to trigger the transmission of messages are sent to the VBS 721, and the VBS 721 forwards received messages to the relevant applications and/or facilities. A list of the common facilities is given by ETSI TS 102 894-1 v1.1.1 (2013 August) ("[TS102894-1]"), which is hereby incorporated by reference in its entirety.

FIG. 7 shows VRU-specific functionality, including interfaces mapped to the ITS-S architecture 700. The VBS 721 is responsible for transmitting VAMs, to identify whether the VRU is part of a cluster, and to enable the assessment of the potential risk of collision by ITS apps. The VBS 721 consumes data from and provides data to other services located in the facilities layer 702 in order to collect relevant information for VAM generation and to forward the received VAM content for further processing. The VRU-specific functionality is centered around the VBS 721 located in the facilities layer 702, which consumes data from other facility layer services such as the PoTi 722, LDM 723, HMI support 724, DCC-FAC 725, DPP 726, and other facilities layer services 727 (e.g., CA, CPS, RLT, TLM, and/or the like).

ITS-S facilities layer entities for the collection of data include the DDP 726 and the PoTi 722, and for received data the LDM 723 as receiving terminal. The DDP 726 provides device status information obtained from its local perception entities (see e.g., [TS103300-2]) to the VBS 721. The PoTi 722 (see e.g., ETSI EN 302 890-2) provides the position of the ITS-S and time information for use by ITS apps, facility, network, management, and security layers. In the context of layer for reducing at the number of generated messages based on the congestion level. The VBS 721 may also interact with other services in the ITS-S facilities layer 702 such as, for example, the DCC-FAC 725 to set the VAM duty cycle, the CABS to provide information for the motorcycle special container, the Collective Perception Service (CPS) to receive CPMs, the Road and Lane Topology service (RLT) to receive MAPEMs, and the Traffic Light Manoeuvre service (TLM) to receive SPATEMs.

The VBS 721 operates the VAM protocol and provides three main services, including: handling the VRU role, sending VAMs, and receiving VAMs. The VBS 721 uses the services provided by the protocol entities of the ITS N&T layer 703 to disseminate VAMs. When handling the VRU role, the VBS 721 receives unsolicited indications from the VRU profile management entity 761 (see e.g., clause 6.4 in [TS103300-2]) on whether the device user is in a context where it is considered to be a VRU (e.g., pedestrian crossing a road) or not (e.g., passenger in a bus, inside a building, and/or the like). The VBS 721 remains operational in both states as defined by Table 2-1.

TABLE 2-1

| Possible roles of the VRU during VRU basic service operation | | | | |
|---|---|---|---|---|
| VRU role | Specification | Valid VRU profiles | Valid VRU types | Additional explanation |
| VRU_ROLE_ ON | The device user is considered as a VRU. Based on information received from VRU profile management entity, the VBS checks the type of VRU and the profile of VRU. It also handles the VBS clustering state and provide services to other entities, as defined in clause 5. | ALL | ALL | The VBS state should be changed according to the condition of VRU device user as notified by the VRU profile Management entity. The VRU device can send VAMs, receive VAMs, or both while checking the position of VRU device user through the PoTi entity. Except for VRUs of profile 3, it may execute the VRU clustering functions (see clause 5). |
| VRU_ROLE_ OFF | The device user is not considered as a VRU. The VRU device neither sends nor receives VAMs | ALL | ALL | The VRU is located in a "zero-risk" geographical area, for example in a bus, in a passenger car, etc. The VBS remains operational in this state to monitor any notification that the role has changed to VRU_ROLE_ON. |

ITS, the "position" includes attitude and movement parameters including velocity, heading, horizontal speed and optionally others. The kinematic and attitude state of a rigid body contained in the ITS-S included position, velocity, acceleration, orientation, angular velocity, and possible other motion related information. The position information at a specific moment in time is referred to as the kinematic and attitude state including time, of the rigid body. In addition to the kinematic and attitude state, PoTi 722 should also maintain information on the confidence of the kinematic and attitude state variables. The LDM 723 is a database in the ITS-S (e.g., a local georeferenced database), which in addition to on-board sensor data is updated with received VAM data and/or other data (see e.g., ETSI TR 102 863 v1.1.1 (2011 June), ETSI EN 302 895 v1.1.1 (2014 September) ("[TS302895]"), and ETSI TR 102 863 v1.1.1 (2011 June) ("[TR102863]"), the contents of each of which are hereby incorporated by reference in their entireties). Message dissemination-specific information related to the current channel utilization are received by interfacing with the DCC-FAC entity 725. The DCC-FAC 725 provides access network congestion information to the VBS 721, and contributes to the overall ITS-S congestion control functionalities using various methods at the facilities and applications There may be cases where the VRU profile management entity provides invalid information, e.g., the VRU device user is considered as a VRU, while its role should be VRU_ROLE_OFF. This is implementation dependent, as the receiving ITS-S should have very strong plausibility check and take into account the VRU context during their risk analysis. The precision of the positioning system (both at transmitting and receiving side) would also have a strong impact on the detection of such cases Sending VAMs includes two activities: generation of VAMs and transmission of VAMs. In VAM generation, the originating ITS-S 610v composes the VAM, which is then delivered to the ITS N&T layer 703 for dissemination. In VAM transmission, the VAM is transmitted over one or more communications media using one or more transport and networking protocols. A natural model is for VAMs to be sent by the originating ITS-S to all ITS-Ss within the direct communication range. VAMs are generated at a frequency determined by the controlling VBS 721 in the originating ITS-S. If a VRU ITS-S is not in a cluster, or is the leader of a cluster, it transmits the VAM periodically. VRU ITS-S 610v that are in a cluster, but not the leader of a cluster, do not transmit the VAM. The generation frequency is determined based on the change of kinematic state, location of the VRU ITS-S 610v, and congestion in the radio channel. Security measures such as authentication are applied to the VAM during the transmission process in coordination with the security entity.

Upon receiving a VAM, the VBS 721, 821 makes the content of the VAM available to the ITS applications and/or to other facilities within the receiving ITS-S 610v, 630, 610, such as the LDM 723. It applies all necessary security measures such as relevance or message integrity check in coordination with the security entity 706.

The VBS 721 interfaces through the Network—Transport/Facilities (NF)-SAP with the N&T layer 703 for exchanging of VAMs with other ITS-Ss. The VBS 721 interfaces through the Security-Facilities (SF)-SAP with the Security entity 706 to access security services for VAM transmission and/or VAM reception. The VBS 721 interfaces through the Management-Facilities (MF)-SAP with the Management entity and through the Facilities-Application (FA)-SAP with the application layer 701 if received VAM data is intended to be provided to one or more applications. Each of the aforementioned interfaces/SAPs may provide the full duplex exchange of data with the facilities layer, and may implement suitable APIs, middleware, and/or other like connectors or interfaces (see e.g., [EN302665]) to enable communication between the various entities/elements.

The facility layer messages (e.g., CAMs, CPMs, DENMs, VAMs, MAP (topology) Extended Messages (MAPEMs), SPAT Extended Messages (SPATEMs), Infrastructure to Vehicle Information Messages (IVIMs), Signal Request Extended Messages (SREMs), Signal request Status Extended Messages (SSEMs), and/or the like) are included in ITS packets, which are facilities layer PDUs that are passed to the access layer 704 via the N&T layer 703 or passed to the application layer 701 for consumption by one or more ITS applications. In this way, the DENM format is agnostic to the underlying access layer 704 and is designed to allow DENMs to be shared regardless of the underlying access technology/RAT.

Additionally or alternatively, various other infrastructure services 726 (e.g., CA, CBS, CPS, RLT, TLM, and/or the like) can be used in the context of the VBS 721. For example, the broadcast of SPAT and SPAT relevance delimited area (e.g., MAP) is already standardized and used by vehicles at intersection level. In principle they protect VRUs 616, 610v crossing. However, signal violation warnings may exist and can be detected and signaled using DENM. This signal violation indication using DENMs is relevant to VRU devices 610v as indicating an increase of the collision risk with a vehicle 610 which violates the signal. If it uses local captors or detects and analyses VAMs, a traffic light controller may delay the red phase change to green and allow the VRU 616, 610v to safely terminate its road crossing. The contextual speed limit using In-Vehicle Information (IVI) can be adapted when a large cluster of VRUs 616, 610v is detected (e.g., limiting the vehicles' speed to 30 km/hour). At such reduced speed a vehicle 610 may act efficiently when perceiving the VRUs 616, 610v by means of its own local perception system.

The N&T layer 703 provides functionality of the OSI network layer and the OSI transport layer and includes one or more networking protocols, one or more transport protocols, and network and transport layer management. Additionally, sensor interfaces and communication interfaces may be part of the N&T layer 703 and access layer 704. The networking protocols may include, inter alia, IPv4, IPv6, IPv6 networking with mobility support, IPv6 over GeoNetworking, the CALM FAST protocol, and/or the like. The transport protocols may include, inter alia, BOSH, BTP, GRE, GeoNetworking protocol, MPTCP, MPUDP, QUIC, RSVP, SCTP, TCP, UDP, VPN, one or more dedicated ITSC transport protocols, or some other suitable transport protocol. Each of the networking protocols may be connected to a corresponding transport protocol.

The access layer includes a physical layer (PHY) 704 connecting physically to the communication medium, a data link layer (DLL), which may be sub-divided into a medium access control sub-layer (MAC) managing the access to the communication medium, and a logical link control sub-layer (LLC), management adaptation entity (MAE) to directly manage the PHY 704 and DLL, and a security adaptation entity (SAE) to provide security services for the access layer. The access layer may also include external communication interfaces (CIs) and internal CIs. The CIs are instantiations of a specific access layer technology or RAT and protocol such as 3GPP LTE, 3GPP 5G/NR, C-V2X (e.g., based on 3GPP LTE and/or 5G/NR), WiFi, W-V2X (e.g., including ITS-G5, DSRC, and/or the like), DSL, Ethernet, Bluetooth, and/or any other RAT and/or communication protocols discussed herein, or combinations thereof. The CIs provide the functionality of one or more logical channels (LCHs), where the mapping of LCHs on to physical channels is specified by the standard of the particular access technology involved. As alluded to previously, the V2X RATs may include ITS-G5/DSRC and 3GPP C-V2X. Additionally or alternatively, other access layer technologies (e.g., V2X RATs) may be used in various other implementations.

The management entity 705 is in charge of managing communications in the ITS-S including, for example, cross-interface management, Inter-unit management communications (IUMC), networking management, communications service management, ITS app management, station management, management of general congestion control, management of service advertisement, management of legacy system protection, managing access to a common Management Information Base (MIB), and so forth. The management layer 705 includes a VRU profile management (mgmnt) entity/function 761 ("VPM 761"). The VPM 761 is a support element for the VBS 721 that manages the VRU profile during a VRU active session. Profile management is part of the ITS-S configuration management and is then initialized with necessary typical parameters' values to be able to fulfil its operation. The ITS-S configuration management is also responsible for updates (e.g., for new standard versions), which are necessary during the whole life cycle of the system.

When the VBS 721 is activated (vulnerability configured), the VRU profile management needs to characterize a VRU personalized profile based on its experience and on provided initial configuration (generic VRU type). The VRU profile management may then continue to learn about the VRU habits and behaviors with the objective to increase the level of confidence (reliability) being associated to its motion dynamic (trajectories and velocities) and to its evolution predictions. The VPM 761 is able to adapt the VRU profile according to detected events which can be signaled by the VBS management 821 and the VRU cluster management 802 for cluster building/formation or cluster disassembly/disbandenment (see e.g., FIG. 8). According to its profile, a VRU 616, 610v may or may not be impacted by some road infrastructure event (e.g., evolution of a traffic light phase), so enabling a better estimation of the confidence level to be associated to its movements. For example, an adult pedestrian will likely wait at a green traffic light and then cross the road when the traffic light turns to red (or vice versa), whereas an animal will likely not wait for traffic signals before entering a roadway, and a child may or may not wait depending on the child's age, level of education, and/or other factors.

The security entity 706 provides security services to the OSI communication protocol stack, to the security entity and to the management entity 705. The security entity 706 contains security functionality related to the ITSC communication protocol stack, the ITS station and ITS apps such as, for example, firewall and intrusion management; authentication, authorization and profile management; identity, crypto key and certificate management; a common security information base (SIB); hardware security modules (HSM); and so forth. In some implementations, the security entity 706 can also be considered as a specific part of the management entity 705. In some implementations, the security entity 706 includes a security services layer/entity (see e.g., [TS102940]). Examples of the security services provided by the security services entity in the security entity 706 are discussed in Table 3 in [TS102940]. In FIG. 7, the security entity 706 is shown as a vertical layer adjacent to each of the ITS. In some implementations, security services are provided by the security entity 706 on a layer-by-layer basis so that the security layer 706 can be considered to be subdivided into the four basic ITS processing layers (e.g., one for each of the apps layer 701, facilities layer 702, N&T layer 703, and access layer 704). Security services are provided on a layer-by-layer basis, in the manner that each of the security services operates within one or several ITS architectural layers (or within a security management layer/entity of the security layer 706). Besides these security processing services, which provide secure communications between ITS-Ss, the security entity 706 in the ITS-S architecture 700 can include two additional sub-parts: security management services layer/entity and security defense layer/entity. The security defense layer prevents direct attacks against critical system assets and data and increases the likelihood of the attacker being detected. The security defense layer can include mechanisms such as intrusion detection and prevention (IDS/IPS), firewall activities, and intrusion response mechanisms. The security defense layer includes misbehavior detection (MD) functionality, which performs plausibility checks on the security elements, processing of incoming V2X messages including the various MD functionality discussed herein. The MD performs misbehavior detection on CAMs, DENMs, CPMs, VAMs, and/or other ITS-S/V2X messages.

Figure 9:
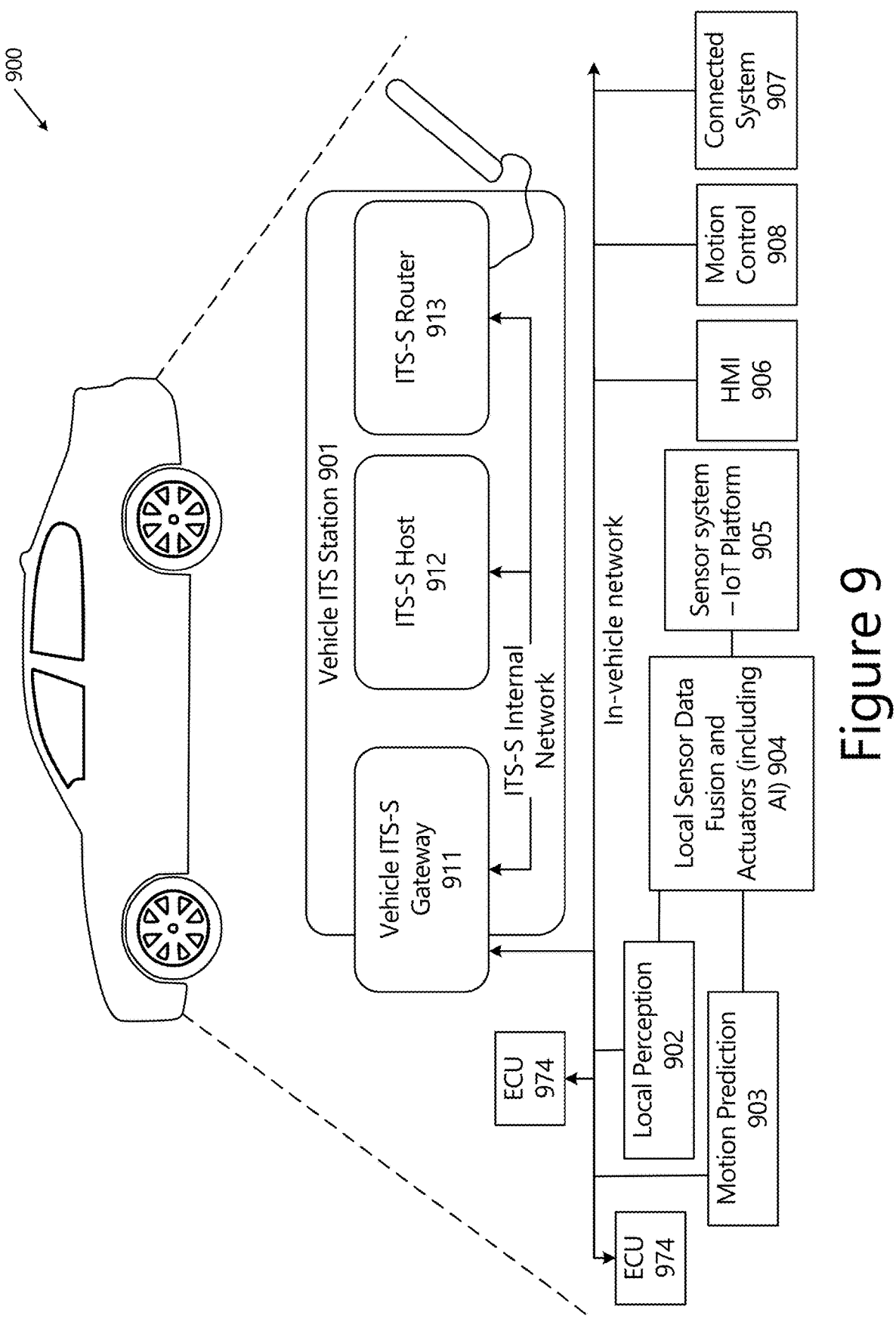
FIG. 9 depicts ae vehicle ITS station (V-ITS-S) in a vehicle system.

The ITS-S reference architecture 700 may be applicable to the elements of FIGS. 9 and 11. The ITS-S gateway 911, 1111 (see e.g., FIGS. 9 and 11) interconnects, at the facilities layer, an OSI protocol stack at OSI layers 5 to 7. The OSI protocol stack is typically is connected to the system (e.g., vehicle system or roadside system) network, and the ITSC protocol stack is connected to the ITS station-internal network. The ITS-S gateway 911, 1111 (see e.g., FIGS. 9 and 11) is capable of converting protocols. This allows an ITS-S to communicate with external elements of the system in which it is implemented. The ITS-S router 911, 1111 provides the functionality the ITS-S reference architecture 700 excluding the applications layer 701 and the facilities layer 702. The ITS-S router 911, 1111 interconnects two different ITS protocol stacks at layer 3. The ITS-S router 911, 1111 may be capable of converting protocols. One of these protocol stacks typically is connected to the ITS station-internal network. The ITS-S border router 1114 (see e.g., FIG. 11) provides the same functionality as the ITS-S router 911,

1111, but includes a protocol stack related to an external network that may not follow the management and security principles of ITS (e.g., the ITS Mgmnt and ITS Security layers in FIG. 7).

Additionally, other entities that operate at the same level but are not included in the ITS-S include the relevant users at that level, the relevant HMI (e.g., audio devices, display/touchscreen devices, and/or the like); when the ITS-S is a vehicle, vehicle motion control for computer-assisted and/or automated vehicles (both HMI and vehicle motion control entities may be triggered by the ITS-S applications); a local device sensor system and IoT Platform that collects and shares IoT data; local device sensor fusion and actuator application(s), which may contain ML/AI and aggregates the data flow issued by the sensor system; local perception and trajectory prediction applications that consume the output of the fusion application and feed the ITS-S applications; and the relevant ITS-S. The sensor system can include one or more cameras, radars, LIDARs, and/or the like, in a V-ITS-S 610 or R-ITS-S 630. In the central station, the sensor system includes sensors that may be located on the side of the road, but directly report their data to the central station, without the involvement of a V-ITS-S 610 or R-ITS-S 630. In some cases, the sensor system may additionally include gyroscope(s), accelerometer(s), and the like (see e.g., sensor circuitry 1272 of FIG. 12). These elements are discussed in more detail infra w.r.t FIGS. 9, 10, and 11. In some examples, the ITS-S reference architecture 700 can include object data extraction mechanism(s) and/or data fusion mechanism(s), such as those discussed in ['398] or the like.

Figure 8:
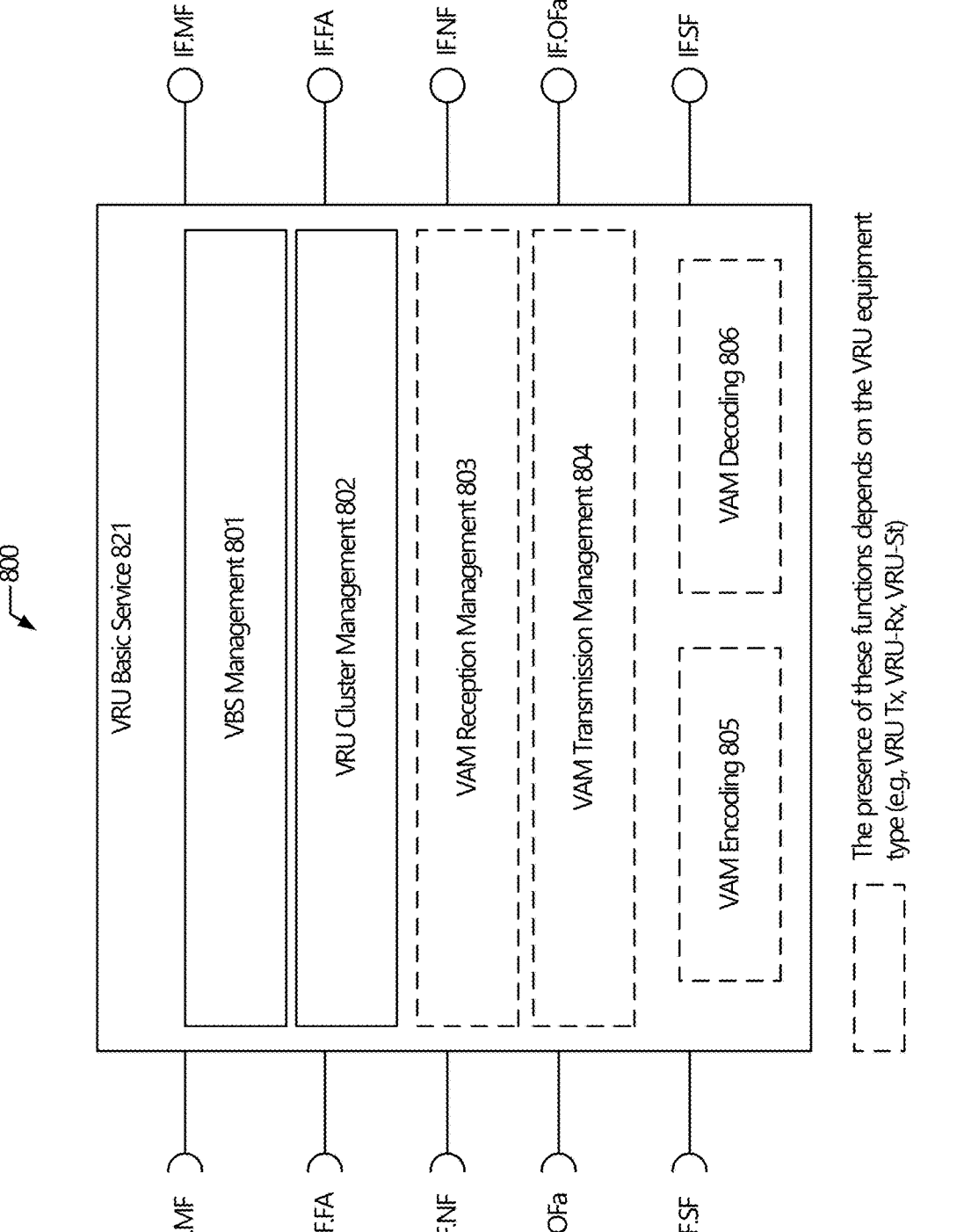
FIG. 8 depicts a VRU basic service (VBS) functional model.

FIG. 8 shows an example VBS functional model 800. The VBS 821 is a facilities layer entity that operates the VAM protocol, and may correspond to the VBS 721 of FIG. 7. The VBS 821 includes a VBS service management function (VBSSM) 801, a VRU cluster management function (VCM) 802, a VAM reception management function (VRxM) 803, a VAM transmission management function (VTxM) 804, VAM encoding function 805, and VAM decoding function 806. The presence of some or all of these functions depends on the VRU equipment type (e.g., VRU-Tx, VRU-Rx, or VRU-St), and may vary depending on application, use case, and/or design choice. In the example of FIG. 8, the presence/absence of the dotted/dashed blocks depend on whether the VRU equipment type is VRU-Tx, VRU-Rx or VRU-St (see e.g., [TS103300-2]).

The VBSSM 801 is responsible for activating or deactivating the VAM transmission according to the device role parameters as well as managing the triggering conditions for VAM transmission. The VBSSM 801 executes the following operations: store assigned ITS-AID and port number(s) to be used for the VBS 821; store the VRU configuration received at ITS-S initialization time or updated later for the coding of VAM data elements; manage the interaction with other basic services (e.g., PoTi 722, DDP 726, and/or the other facilities discussed herein); receive information from and transmit information to the HMI 724 (e.g., based on VRU profile and/or VRU role); activate/deactivate the VAM transmission according to VRU profile management parameters and/or device role parameters (e.g., the service is deactivated when a pedestrian enters a bus); and manage the triggering conditions of VAM transmission accounting for the network congestion control rules (see e.g., [TS103300-2]).

The VCM 802 manages combined and clustered VRU creation and breaking down. When implemented, the VCM 802 executes the following functions: detect if the associated VRU has the capability to become the leader of a cluster;

manage the VRU cluster or combined cluster creation and breaking up; compute and store the cluster parameters for the coding of VAM data elements specific to the cluster; detect if the associated VRU should join or leave a cluster; manage the VBS state machine associated to the VRU according to detected cluster event; and activate or de-activate the transmission of VAMs according to the VBS clustering state. Various other aspects of VRU clustering operation are discussed in [TS103300-2] and [TS103300-3].

The VRxM 803, after VAM message decoding, checks the relevance, consistency, plausibility, integrity, and the like of the Rx VAM and stores or deletes the Rx VAM data elements via a configured port indicating the selected communication profile. In some implementations, the VAM encoding function 805 is available only if the VTxM 804 is available. The VRU decoding function 806 extracts the relevant DEs contained in the Rx VAM. These data elements are then communicated to the VRxM 803. In some implementations, the VAM decoding function 806 is available only if the VAM reception management function 803 is available.

The interactions between the VBS 821 and other facilities layer entities in the ITS-S architecture are used to obtain information for the generation of the VAM. The interfaces for these interactions are described in Table 2-2. The IF.OFa (interfaces to other facilities) are implementation dependent.

TABLE 2-2

| VRU Basic Service interfaces (IF.OFa) | |
|---|---|
| Interfaced functionality | Parameters |
| PoTi | Information of the positioning and timing are sent to the VBS, e.g., the position of the ITS-S and time information specified in [EN302890-2]. Further details are described in clause 6.5.10.3 of [TS103300-2]. |
| CA Basic service | In case of a motorcycle, the VRU basic service needs to inform the Cooperative Awareness basic service that the vehicle is a VRU from VRU profile 3 and trigger the dedicated container when transmitting CAMs. It also needs to provide associated DEs to put in the VRU special container, e.g., type of profile, roll angle, path prediction, etc. |
| Congestion Control | Information to optimize the use of the available channel are sent to the VRU basic service, e.g., T_GenVam_Dcc in the case of the ITS-G5 access layer. Further details are described in clause 6.5.10.5 of [TS103300-2]. |
| HMI support | The interactions between the VRU basic service and the HMI support function of the facilities layer are necessary for the exchange of information (parameters, data elements) to be used for the management of the VRU awareness service and the provisioning of data elements in VAMs. The HMI support function can be implemented to select any proper data in the candidate list such as VRU profile. The HMI support function can forward input data from the touchscreen or button in the device of VRU to VRU basic service. Awareness advices and alert may be provided to VRU via its HMI according to its personalized characteristics. Further details are described in clause 6.5.7 of [TS103300-2]. |
| LDM | LDM / VAM data are exchanged via the interface between LDM and the VRU Basic Service. Further details are described in clause 6.5.10.2 of [TS103300-2]. |
| Device Data Provider (DDP) | The DDP provides the device status information obtained from its local perception entities (see e.g., [TS103300-2]) to the VRU Basic Service. |
| Other Application Support Facilities | Information to trigger the transmission of messages are sent to the VRU Basic Service. The VRU Basic Service forwards received messages to the relevant applications. Further details are described in clause 6.5.10.4 [TS103300-2]. | in the LDM 723. In particular, the VRxM 803 executes the following functions after VAM messages decoding: checks the relevance of the received message according to its current mobility characteristics and state; determines whether the received message and its security "envelope" meet all the relevant security conditions, including consistency, plausibility and cryptographic integrity; and deletes or store the received message data elements in the LDM 723 according to previous operations results. Additionally or alternatively, the VRxM 803 performs the following operations after VAM messages decoding: checks the consistency, plausibility and integrity (see the liaison with security protocols) of the received message semantic.

The VTxM 804 assembles VAM DEs and sending to the encoding function 805. The VTxM 804 performs the following operations upon request of the VBSSM 801: assembles the VAM data elements complying with the message specification; and sends the constructed VAM to the VAM encoding function 805. In some implementations, the VTxM 804 is only available at the VRU device level, not at the level of other ITS elements such as V-ITS-Ss 610 or R-ITS-Ss 630. Even at the VRU device level, this function may not be present depending on its initial configuration (see device role setting function 711). The VAM encoding function 805 encodes the VAM DEs provided by the VTxM 804 and triggers VAM transmission to the N&T layer 703

The IF.FA is an interface to ITS applications. An ITS application is a function of the ITS application layer 701 that implements the application logic of one or more use cases. The VBS 821 provides the interfaces to the ITS-S applications for the VAM protocol operation of the originator (Tx) ITS-S and Rx ITS-S. The IF.FA may be implemented as an API with data exchanged between the VBS 821 and ITS apps via the API. In another possible implementation, the interface to the application layer 701 may be implemented as FA-SAP. According to designers' implementation, the VBS 821 may need to directly exchange data, parameters, states evolutions and event detection signals with an ITS application. Additionally or alternatively, the IF.FA between the VBS 821 and individual ITS apps is implementation-specific.

When the SPAT/MAP basic service is locally present, the traffic light states (e.g., phase and timing) is communicated to the app, which is using it for predicting the VRU motion dynamic according to the VRU related traffic light phase and timing and the likelihood that the VRU behaves in respect of the traffic light state. The result of this application analysis, for example as the path prediction, may then be provided to the VBS 821 for inclusion in the VAM.

The VRU cluster status and the path prediction can be the cases when the VBS 821 may need to exchange data, parameters with ITS applications directly. The VBS may need to exchange data with ITS applications via LDM to detect whether the VRU is located in a low-risk geographical area, which impacts the sending of VAM.

The IF.NF is an interface to the ITS-S N&T layer 703. The VBS 821 exchanges information with ITS N&T layer 703 via the interface NF. A specification of the interface IF.NF as NF-SAP is provided in ETSI TS 102 723-11 V1.1.1 (2013 November). At the originating ITS-S, the VBS 821 provides the VAM embedded in a facilities-layer Service Data Unit (FL-SDU) together with protocol control information (PCI) according to ETSI EN 302 636-5-1 V2.1.0 (2017 May) to the ITS N&T layer 703. At the receiving ITS-S, the ITS N&T layer 703 passes the received VAM to the VBS 821, when available. The interface between the VBS 821 and the &T layer 703 relies on the services of the GeoNetworking/ BTP stack or to the IPv6 stack and the combined IPv6/ GeoNetworking stack.

The IF.MF is an interface to the ITS-S management entity 705. The VBS 821 may exchange primitives with management entity 705 via the MF-SAP interface (see e.g., FIG. 7). The VBS 821 gets information for congestion control from the management entity 705. The VBS 821 is able to receive unsolicited notifications from the ITS-S management entity 705 when the VRU role changes from VRU (e.g., pedestrian crossing a road) to not VRU (e.g., passenger in a bus), and vice-versa. A specification of the MF-SAP and a list of primitives exchanged with the management layer 705 are provided in ETSI TS 102 723-5 V1.1.1 (2012 November). The VBS 821 receives communication profile parameters from the network management function located in the management entity 705 for the selection of the network and its associated communication profile to be used for the VAM dissemination.

The IF.SF is an interface to the ITS-S security entity 706. The VBS 821 may exchange primitives with the security entity 706 of the ITS-S via the SF-SAP interface using the SF interface (IF.SF) provided by the security entity 706 (see e.g., FIG. 7). The SF-SAP interface is provisioned in [EN302665]. Accordingly, this clause refers informatively to ETSI TS 102 723-8 V1.1.1 (2016 April) ("[TS102723-8]") as it specifies a functionality equivalent to the functionality defined in this clause, even though targeted at the SN-SAP interface. The VBS 821 subscribes to the identity change service provided by the security entity 706 as specified in ETSI TS 102 731 V1.1.1 (2010 June). A model for subscribing to this service is provided by the SN_IDCHANGE_SUBSCRIBE primitives in [TS102723-8].

When the VBS 821 is notified by the security entity of a pending identifier change, it shall temporarily stop generating VAMs. Once the VBS 821 receives notification that the identifier change has been committed, it shall restart generating and sending VAMs. The VAMs sent after the COMMIT shall have different StationId and (if present) ClusterId values than the VAMs sent before the COMMIT. A model for being notified of and committing to identifier changes is provided by the SN-SAP primitive SN_ID-CHANGE_EVENT with command types PREPARE and COMMIT as specified in [TS102723-8].

The VBS 821 may determine through mechanisms that its VRU is in an elevated-hazard situation and may in this situation inhibit identifier change. Once the elevated hazard situation is over the VBS shall permit identifier change again. The VBS should not prolong identifier locking unnecessarily. A model for locking and unlocking identifier changes is provided by the SN-SAP primitives SN_ID_LOCK and SN_ID_UNLOCK as specified in [TS102723-8].

FIG. 9 depicts an example vehicle computing system 900. In this example, the vehicle computing system 900 includes a V-ITS-S 901 and Electronic Control Units (ECUs) 974. The V-ITS-S 901 includes a V-ITS-S gateway 911, an ITS-S host 912, and an ITS-S router 913. The vehicle ITS-S gateway 911 provides functionality to connect the components at the in-vehicle network (e.g., ECUs 974) to the ITS station-internal network. The interface to the in-vehicle components (e.g., ECUs 974, and so forth) may be the same or similar as those discussed herein (see e.g., IX 1256 of FIG. 12) and/or may be a proprietary interface/interconnect. Access to components (e.g., ECUs 974) may be implementation specific. The ECUs 974 may be the same or similar to the driving control units (DCUs) 674 discussed previously w.r.t FIG. 6 and/or the actuator(s) 1274 of FIG. 12. The ITS-S 901 connects to ITS ad hoc networks via the ITS-S router 913.

Figure 10:
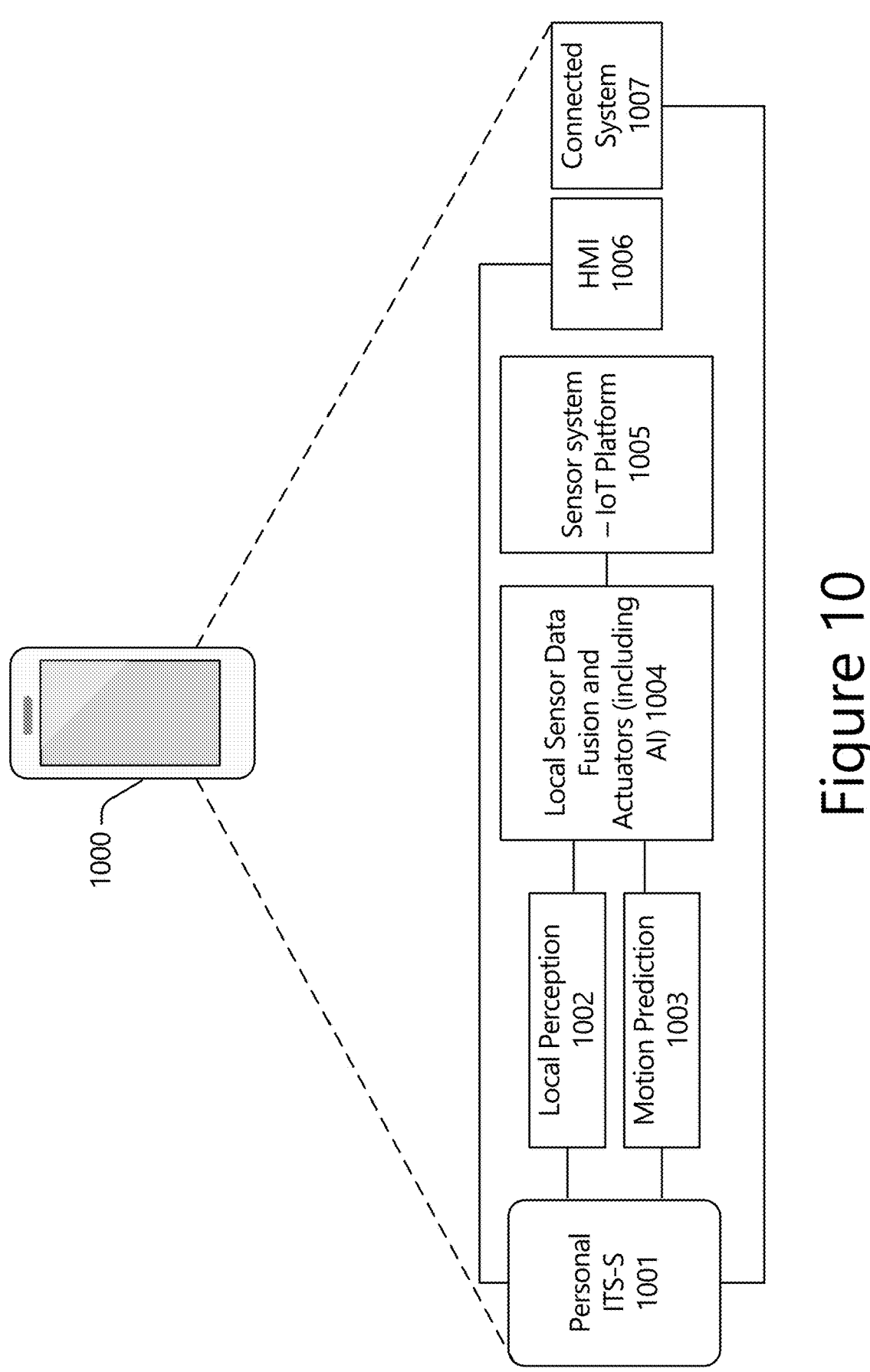
FIG. 10 depicts a personal ITS station (P-ITS-S), which may be used as a VRU ITS-S.

FIG. 10 depicts an example personal computing system 1000. The personal ITS sub-system 1000 provides the application and communication functionality of ITSC in mobile devices, such as smartphones, tablet computers, wearable devices, PDAs, portable media players, laptops, and/or other mobile devices. The personal ITS sub-system 1000 contains a personal ITS station (P-ITS-S) 1001 and various other entities not included in the P-ITS-S 1001, which are discussed in more detail infra. The device used as a P-ITS-S 1001 may also perform HMI functionality as part of another ITS sub-system, connecting to the other ITS sub-system via the ITS station-internal network (not shown). In some examples, the personal ITS sub-system 1000 is an VRU ITS-S 610v.

FIG. 11 depicts an example roadside infrastructure system 1100. In this example, the roadside infrastructure system 1100 includes an R-ITS-S 1101, output device(s) 1105, sensor(s) 1108, and one or more radio units (RUs) 1110. The R-ITS-S 1101 includes a R-ITS-S gateway 1111, an ITS-S host 1112, an ITS-S router 1113, and an ITS-S border router 1114. The ITS station connects to ITS ad hoc networks and/or ITS access networks via the ITS-S router 1113. The R-ITS-S gateway 911 provides functionality to connect the components of the roadside system (e.g., output devices 1105 and sensors 1108) at the roadside network to the ITS station-internal network. The interface to the in-vehicle components (e.g., ECUs 974) may be the same or similar as those discussed herein (see e.g., IX 1256 of FIG. 12) and/or may be a proprietary interface/interconnect. Access to components (e.g., ECUs 974) may be implementation specific. The sensor(s) 1108 may be inductive loops and/or sensors that are the same or similar to the sensors 672 discussed infra w.r.t FIG. 6 and/or sensor circuitry 1272 discussed infra w.r.t FIG. 12.

The actuators 1113 are devices that are responsible for moving and controlling a mechanism or system. The actuators 1113 are used to change the operational state (e.g., on/off, zoom or focus, and/or the like), position, and/or orientation of the sensors 1108. The actuators 1113 are used to change the operational state of some other roadside equipment, such as gates, traffic lights, digital signage or variable message signs (VMS), and/or the like The actuators 1113 are configured to receive control signals from the R-ITS-S 1101 via the roadside network, and convert the signal energy (or some other energy) into an electrical and/or mechanical motion. The control signals may be relatively low energy electric voltage or current. The actuators 1113 comprise electromechanical relays and/or solid state relays, which are configured to switch electronic devices on/off and/or control motors, and/or may be that same or similar or actuators 1274 discussed infra w.r.t FIG. 12.

Each of FIGS. 9, 10, and 11 also show entities which operate at the same level but are not included in the ITS-S including the relevant HMI 906, 1006, and 1106; vehicle motion control 908 (only at the vehicle level); local device sensor system and IoT Platform 905, 1005, and 1105; local device sensor fusion and actuator application 904, 1004, and 1104; local perception and trajectory prediction applications 902, 1002, and 1102; motion prediction 903 and 1003, or mobile objects trajectory prediction 1103 (at the RSU level); and connected system 907, 1007, and 1107.

The local device sensor system and IoT Platform 905, 1005, and 1105 collects and shares IoT data. The VRU sensor system and IoT Platform 1005 is at least composed of the PoTi management function present in each ITS-S of the system (see e.g., ETSI EN 302 890-2 ("[EN302890-2]")). The PoTi entity provides the global time common to all system elements and the real time position of the mobile elements. Local sensors may also be embedded in other mobile elements as well as in the road infrastructure (e.g., camera in a smart traffic light, electronic signage, and/or the like). An IoT platform, which can be distributed over the system elements, may contribute to provide additional information related to the environment surrounding the VRU system 1000. The sensor system can include one or more cameras, radars, LiDARs, and/or other sensors (see e.g., 1222 of FIG. 12), in a V-ITS-S 610 or R-ITS-S 630. In the VRU device 610v, 1000, the sensor system may include gyroscope(s), accelerometer(s), and the like (see e.g., 1222 of FIG. 12). In a central station (not shown), the sensor system includes sensors that may be located on the side of the road, but directly report their data to the central station, without the involvement of a V-ITS-S 610 or an R-ITS-S 630.

The (local) sensor data fusion function and/or actuator apps 904, 1004, and 1104 provides the fusion of local perception data obtained from the VRU sensor system and/or different local sensors. This may include aggregating data flows issued by the sensor system and/or different local sensors. The local sensor fusion and actuator app(s) may contain machine learning (ML)/artificial intelligence (AI) algorithms and/or models. Additional aspects of these apps 904, 1004, and 1104 and/or AI/ML models are discussed in such as those discussed in ['398].

A local perception function 902, 1002, and 1102 (which may or may not include trajectory prediction application(s)) is provided by the local processing of information collected by local sensor(s) associated to the system element. The local perception (and trajectory prediction) function 902, 1002, and 1102 consumes the output of the sensor data fusion application/function 904, 1004, and 1104 and feeds ITS-S applications with the perception data (and/or trajectory predictions). The local perception (and trajectory prediction) function 902, 1002, and 1102 detects and characterize objects (static and mobile) which are likely to cross the trajectory of the considered moving objects. The infrastructure, and particularly the road infrastructure 1100, may offer services relevant to the VRU support service. The infrastructure may have its own sensors detecting VRUs 616, 610v evolutions and then computing a risk of collision if also detecting local vehicles' evolutions, either directly via its own sensors or remotely via a cooperative perception supporting services such as the CPS (see e.g., ETSI TR 103 562 V2.1.1 (2019 December) ("[TR103562]")). Additionally, road marking (e.g., zebra areas or crosswalks) and vertical signs may be considered to increase the confidence level associated with the VRU detection and mobility since VRUs 616, 610v usually have to respect these marking/signs.

The motion dynamic prediction function 903 and 1003, and the mobile objects trajectory prediction 1103 (at the RSU level), are related to the behavior prediction of the considered moving objects. The motion dynamic prediction function 903 and 1003 predict the trajectory of the vehicle 610 and the VRU 616, respectively. The motion dynamic prediction function 903 may be part of the VRU trajectory and behavioral modeling module and trajectory interception module of the V-ITS-S 610. The motion dynamic prediction function 1003 may be part of the dead reckoning module and/or the movement detection module of the VRU ITS-S 610v. Alternatively, the motion dynamic prediction functions 903 and 1003 may provide motion/movement predictions to the aforementioned modules. Additionally or alternatively, the mobile objects trajectory prediction 1103 predict respective trajectories of corresponding vehicles 610 and VRUs 616, which may be used to assist the VRU ITS-S 610v in performing dead reckoning and/or assist the V-ITS-S 610 with VRU Trajectory and Behavioral Modeling entity.

Motion dynamic prediction includes a moving object trajectory resulting from evolution of the successive mobile positions. A change of the moving object trajectory or of the moving object velocity (acceleration/deceleration) impacts the motion dynamic prediction. In most cases, when VRUs 616, 610v are moving, they still have a large amount of possible motion dynamics in terms of possible trajectories and velocities. This means that motion dynamic prediction 903, 1003, 1103 is used to identify which motion dynamic will be selected by the VRU 616, 610v as quickly as possible, and if this selected motion dynamic is subject to a risk of collision with another VRU or a vehicle. The motion dynamic prediction functions 903, 1003, 1103 analyze the evolution of mobile objects and the potential trajectories that may meet at a given time to determine a risk of collision between them. The motion dynamic prediction works on the output of cooperative perception considering the current trajectories of considered device (e.g., VRU device 610v) for the computation of the path prediction; the current velocities and their past evolutions for the considered mobiles for the computation of the velocity evolution prediction; and the reliability level which can be associated to these variables. The output of this function is provided to a risk analysis function.

In many cases, working only on the output of the cooperative perception is not sufficient to make a reliable prediction because of the uncertainty which exists in terms of VRU trajectory selection and its velocity. However, complementary functions may assist in increasing consistently the reliability of the prediction. For example, the use of the device (e.g., VRU device 610v) navigation system, which provides assistance to the user (e.g., VRU 616) to select the best trajectory for reaching its planned destination. With the development of Mobility as a Service (MaaS), multimodal itinerary computation may also indicate to the VRU 616 dangerous areas and then assist to the motion dynamic prediction at the level of the multimodal itinerary provided by the system. In another example, the knowledge of the user (e.g., VRU 616) habits and behaviors may be additionally or alternatively used to improve the consistency and the reliability of the motion predictions. Some users (e.g., VRUs 616, 610v) follow the same itineraries, using similar motion dynamics, for example when going to the main Point of Interest (POI), which is related to their main activities (e.g., going to school, going to work, doing some shopping, going to the nearest public transport station from their home, going to sport center, and/or the like). The device (e.g., VRU device 610v) or a remote service center may learn and memorize these habits. In another example, the indication by the user (e.g., VRU 616) itself of its selected trajectory in particular when changing it (e.g., using a right turn or left turn signal similar to vehicles when indicating a change of direction).

The vehicle motion control 908 may be included for computer-assisted and/or automated vehicles 610. Both the HMI entity 906 and vehicle motion control entity 908 may be triggered by one or more ITS-S applications. The vehicle motion control entity 908 may be a function under the responsibility of a human driver or of the vehicle if it is able to drive in automated mode.

The Human Machine Interface (HMI) 906, 1006, and 1106, when present, enables the configuration of initial data (parameters) in the management entities (e.g., VRU profile management 761) and in other functions (e.g., VBSSM 801). The HMI 906, 1006, and 1106 enables communication of external events related to the VBS to the device owner (user), including the alerting about an immediate risk of collision (TTC<2 s) detected by at least one element of the system and signaling a risk of collision (e.g., TTC>2 seconds) being detected by at least one element of the system. For a VRU system 610v (e.g., personal computing system 1000), similar to a vehicle driver, the HMI provides the information to the VRU 616, considering its profile (e.g., for a blind person, the information is presented with a clear sound level using accessibility capabilities of the particular platform of the personal computing system 1000). In various implementations, the HMI 906, 1006, and 1106 may be part of the alerting system.

The connected systems 907, 1007, and 1107 refer to components/devices used to connect a system with one or more other systems. As examples, the connected systems 907, 1007, and 1107 may include communication circuitry and/or radio units. The VRU system 1000 may be a connected system made of up to 4 different levels of equipment. The VRU system 1000 may also be an information system which collects, in real time, information resulting from events, processes the collected information and stores them together with processed results. At each level of the VRU system 1000, the information collection, processing and storage is related to the functional and data distribution scenario which is implemented. In various implementations, any of the connected systems 907, 1007, 1107 and/or routers 913, 1114 may operate according to one or more of the power optimization configurations (e.g., POs 615 of FIG. 6), such as any of those discussed herein (see e.g., section 1, supra).

Figure 12:
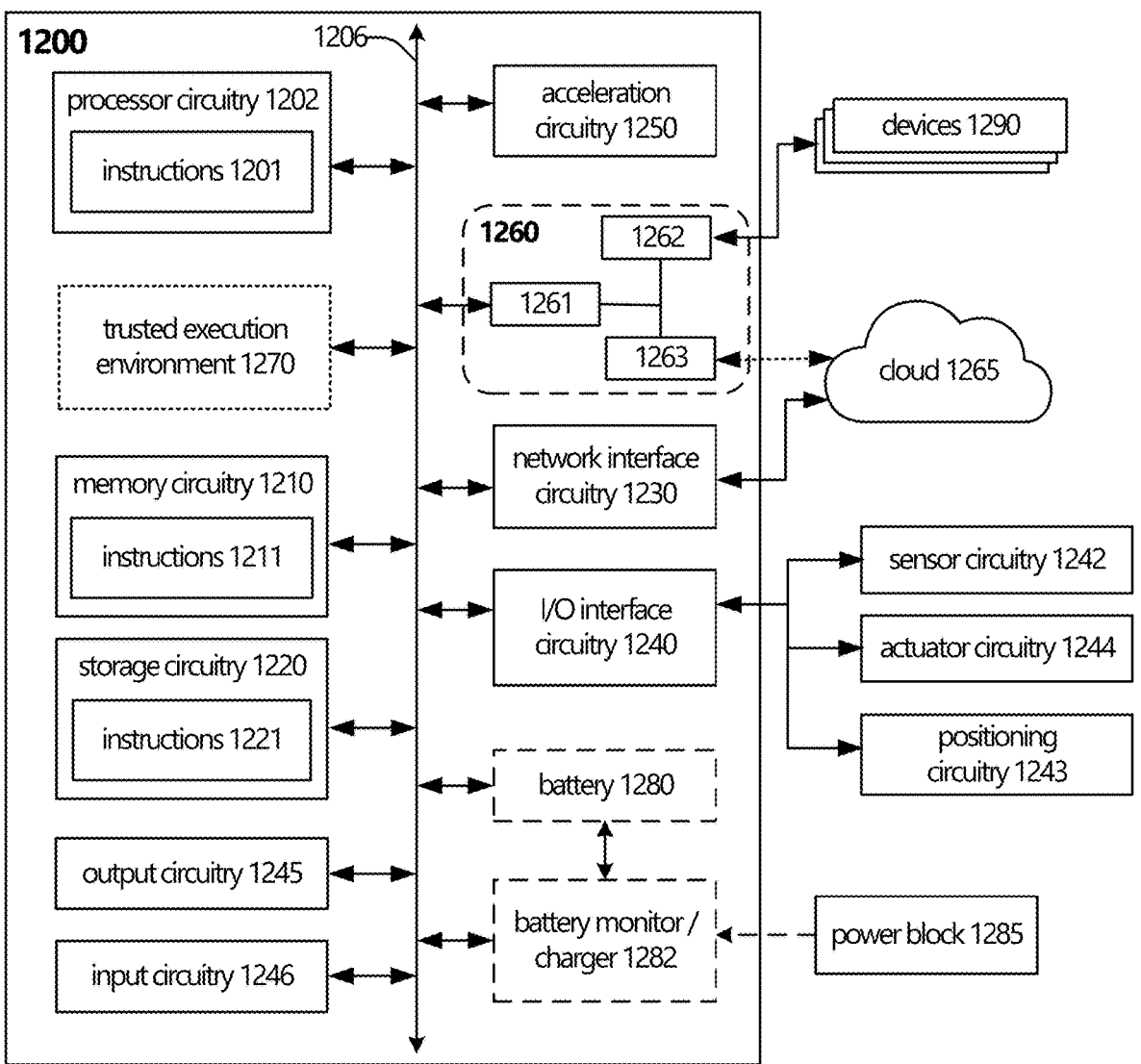
FIG. 12 depicts example components of a compute node, which may be used in edge computing system(s).

FIG. 12 illustrates an example of components that may be present in an compute node 1200 for implementing the techniques (e.g., operations, processes, methods, and methodologies) described herein. This compute node 1200 provides a closer view of the respective components of node 1200 when implemented as or as part of a computing device or system. The compute node 1200 can include any combination of the hardware or logical components referenced herein, and may include or couple with any device usable with a communication network or a combination of such networks. In particular, any combination of the components depicted by FIG. 12 can be implemented as individual ICs, discrete electronic devices, or other modules, instruction sets, programmable logic or algorithms, hardware, hardware accelerators, software, firmware, or a combination thereof adapted in the compute node 1200, or as components otherwise incorporated within a chassis of a larger system. Additionally or alternatively, any combination of the components depicted by FIG. 12 can be implemented as a system-on-chip (SoC), a single-board computer (SBC), a system-in-package (SiP), a multi-chip package (MCP), and/or the like, in which a combination of the hardware elements are formed into a single IC or a single package. Furthermore, the compute node 1200 may be or include a client device, server, appliance, network infrastructure, machine, robot, drone, and/or any other type of computing devices such as any of those discussed herein. For example, the compute node 1200 may correspond to any of the UEs 110 of FIG. 1, UEs 321/322 of FIG. 3, UEs 610, NAN 630, edge compute node 640, NFs in network 665, and/or application functions (AFs)/servers 690 of FIG. 6; ITS 700 of FIG. 7; vehicle computing system 900 of FIG. 9; personal computing system 1000 of FIG. 10; roadside infrastructure 1100 of FIG. 11; and/or any other computing device/system discussed herein.

The compute node 1200 includes one or more processors 1202 (also referred to as "processor circuitry 1202"). The processor circuitry 1202 includes circuitry capable of sequentially and/or automatically carrying out a sequence of arithmetic or logical operations, and recording, storing, and/or transferring digital data. Additionally or alternatively, the processor circuitry 1202 includes any device capable of executing or otherwise operating computer-executable instructions, such as program code, software modules, and/or functional processes. The processor circuitry 1202 includes various hardware elements or components such as, for example, a set of processor cores and one or more of on-chip or on-die memory or registers, cache and/or scratchpad memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. Some of these components, such as the on-chip or on-die memory or registers, cache and/or scratchpad memory, may be implemented using the same or similar devices as the memory circuitry 1210 discussed infra. The processor circuitry 1202 is also coupled with memory circuitry 1210 and storage circuitry 1220, and is configured to execute instructions stored in the memory/storage to enable various apps, OSs, or other software elements to run on the platform 1200. In particular, the processor circuitry 1202 is configured to operate app software (e.g., instructions 1201, 1211, 1221) to provide one or more services to a user of the compute node 1200 and/or user(s) of remote systems/devices.

As examples, the processor circuitry 1202 can be embodied as, or otherwise include one or multiple central processing units (CPUs), application processors, graphics processing units (GPUs), RISC processors, Acorn RISC Machine (ARM) processors, complex instruction set computer (CISC) processors, DSPs, FPGAs, programmable logic devices (PLDs), ASICs, baseband processors, radio-frequency integrated circuits (RFICs), microprocessors or controllers, multi-core processors, multithreaded processors, ultra-low voltage processors, embedded processors, a specialized x-processing units (xPUs) or a data processing unit (DPUs) (e.g., Infrastructure Processing Unit (IPU), network processing unit (NPU), and the like), and/or any other processing devices or elements, or any combination thereof. In some implementations, the processor circuitry 1202 is embodied as one or more special-purpose processor(s)/controller(s) configured (or configurable) to operate according to the various implementations and other aspects discussed herein. Additionally or alternatively, the processor circuitry 1202 includes one or more hardware accelerators (e.g., same or similar to acceleration circuitry 1250), which can include microprocessors, programmable processing devices (e.g., FPGAs, ASICs, PLDs, DSPs. and/or the like), and/or the like.

The system memory 1210 (also referred to as "memory circuitry 1210") includes one or more hardware elements/devices for storing data and/or instructions 1211 (and/or instructions 1201, 1221). Any number of memory devices may be used to provide for a given amount of system memory 1210. As examples, the memory 1210 can be embodied as processor cache or scratchpad memory, volatile memory, non-volatile memory (NVM), and/or any other machine readable media for storing data. Examples of volatile memory include random access memory (RAM), static RAM (SRAM), dynamic RAM (DRAM), synchronous DRAM (SDRAM), thyristor RAM (T-RAM), content-addressable memory (CAM), and/or the like. Examples of NVM can include read-only memory (ROM) (e.g., including programmable ROM (PROM), erasable PROM (EPROM), electrically EPROM (EEPROM), flash memory (e.g., NAND flash memory, NOR flash memory, and the like), solid-state storage (SSS) or solid-state ROM, programmable metallization cell (PMC), and/or the like), non-volatile RAM (NVRAM), phase change memory (PCM) or phase change RAM (PRAM) (e.g., Intel® 3D XPoint™ memory, chalcogenide RAM (CRAM), Interfacial Phase-Change Memory (IPCM), and the like), memistor devices, resistive memory or resistive RAM (ReRAM) (e.g., memristor devices, metal oxide-based ReRAM, quantum dot resistive memory devices, and the like), conductive bridging RAM (or PMC), magnetoresistive RAM (MRAM), electrochemical RAM (ECRAM), ferroelectric RAM (FeRAM), anti-ferroelectric RAM (AFeRAM), ferroelectric field-effect transistor (FeFET) memory, and/or the like. Additionally or alternatively, the memory circuitry 1210 can include spintronic memory devices (e.g., domain wall memory (DWM), spin transfer torque (STT) memory (e.g., STT-RAM or STT-MRAM), magnetic tunneling junction memory devices, spin-orbit transfer memory devices, Spin-Hall memory devices, nanowire memory cells, and/or the like). In some implementations, the individual memory devices 1210 may be formed into any number of different package types, such as single die package (SDP), dual die package (DDP), quad die package (Q17P), memory modules (e.g., dual inline memory modules (DIMMs), microDIMMs, and/or MiniDIMMs), and/or the like. Additionally or alternatively, the memory circuitry 1210 is or includes block addressable memory device(s), such as those based on NAND or NOR flash memory technologies (e.g., single-level cell ("SLC"), multi-level cell ("MLC"), quad-level cell ("QLC"), tri-level cell ("TLC"), or some other NAND or NOR device). Additionally or alternatively, the memory circuitry 1210 can include resistor-based and/or transistor-less memory architectures. In some examples, the memory circuitry 1210 can refer to a die, chip, and/or a packaged memory product. In some implementations, the memory 1210 can be or include the on-die memory or registers associated with the processor circuitry 1202. Additionally or alternatively, the memory 1210 can include any of the devices/components discussed infra w.r.t the storage circuitry 1220.

The storage 1220 (also referred to as "storage circuitry 1220") provides persistent storage of information, such as data, OSs, apps, instructions 1221, and/or other software elements. As examples, the storage 1220 may be embodied as a magnetic disk storage device, hard disk drive (HDD), microHDD, solid-state drive (SSD), optical storage device, flash memory devices, memory card (e.g., secure digital (SD) card, eXtreme Digital (XD) picture card, USB flash drives, SIM cards, and/or the like), and/or any combination thereof. The storage circuitry 1220 can also include specific storage units, such as storage devices and/or storage disks that include optical disks (e.g., DVDs, CDs/CD-ROM, Blu-ray disks, and the like), flash drives, floppy disks, hard drives, and/or any number of other hardware devices in which information is stored for any duration (e.g., for extended time periods, permanently, for brief instances, for temporarily buffering, and/or caching). Additionally or alternatively, the storage circuitry 1220 can include resistor-based and/or transistor-less memory architectures. Further, any number of technologies may be used for the storage 1220 in addition to, or instead of, the previously described technologies, such as, for example, resistance change memories, phase change memories, holographic memories, chemical memories, among many others. Additionally or alternatively, the storage circuitry 1220 can include any of the devices or components discussed previously w.r.t the memory 1210.

Computer program code for carrying out operations of the present disclosure (e.g., computational logic and/or instructions 1201, 1211, 1221) may be written in any combination of one or more programming languages, including object oriented programming languages, procedural programming languages, scripting languages, markup languages, and/or some other suitable programming languages including proprietary programming languages and/or development tools, or any other languages tools. The computer program/code 1201, 1211, 1221 for carrying out operations of the present disclosure may also be written in any combination of programming languages and/or machine language, such as any of those discussed herein. The program code may execute entirely on the system 1200, partly on the system 1200, as a stand-alone software package, partly on the system 1200 and partly on a remote computer or entirely on the remote computer or server. In the latter scenario, the remote computer may be connected to the system 1200 through any type of network, including a LAN or WAN, or the connection may be made to an external computer (e.g., through the Internet, enterprise network, and/or some other network). Additionally or alternatively, the computer program/code 1201, 1211, 1221 can include one or more operating systems (OS) and/or other software to control various aspects of the compute node 1200. The OS can include drivers to control particular devices that are embedded in the compute node 1200, attached to the compute node 1200, and/or otherwise communicatively coupled with the compute node 1200. Example OSs include consumer-based OS, real-time OS (RTOS), hypervisors, and/or the like.

The storage 1220 may include instructions 1221 in the form of software, firmware, or hardware commands to implement the techniques described herein. Although such instructions 1221 are shown as code blocks included in the memory 1210 and/or storage 1220, any of the code blocks may be replaced with hardwired circuits, for example, built into an ASIC, FPGA memory blocks/cells, and/or the like. In an example, the instructions 1201, 1211, 1221 provided via the memory 1210, the storage 1220, and/or the processor 1202 are embodied as a non-transitory or transitory machine-readable medium (also referred to as "computer readable medium" or "CRM") including code (e.g., instructions 1201, 1211, 1221, accessible over the IX 1206, to direct the processor 1202 to perform various operations and/or tasks, such as a specific sequence or flow of actions as described herein and/or depicted in any of the accompanying drawings. The CRM may be embodied as any of the devices/technologies described for the memory 1210 and/or storage 1220.

The various components of the computing node 1200 communicate with one another over an interconnect (IX) 1206. The IX 1206 may include any number of IX (or similar) technologies including, for example, instruction set architecture (ISA), extended ISA (eISA), Inter-Integrated Circuit (I²C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX, RapidIO™ IX, Coherent Accelerator Processor Interface (CAPI), OpenCAPI, Advanced Microcontroller Bus Architecture (AMBA) IX, cache coherent interconnect for accelerators (CCIX), Gen-Z Consortium IXs, a HyperTransport IX, NVLink provided by NVIDIA®, ARM Advanced eXtensible Interface (AXI), a Time-Trigger Protocol (TTP) system, a FlexRay system, PROFIBUS, Ethernet, USB, On-Chip System Fabric (IOSF), Infinity Fabric (IF), and/or any number of other IX technologies. The IX 1206 may be a proprietary bus, for example, used in a SoC based system.

The communication circuitry 1260 comprises a set of hardware elements that enables the compute node 1200 to communicate over one or more networks (e.g., cloud 1265) and/or with other devices 1290. Communication circuitry 1260 includes various hardware elements, such as, for example, switches, filters, amplifiers, antenna elements, and the like to facilitate over-the-air (OTA) communications. Communication circuitry 1260 includes modem circuitry 1261 that interfaces with processor circuitry 1202 for generation and processing of baseband signals and for controlling operations of transceivers (TRx) 1262, 1263. The modem circuitry 1261 handles various radio control functions according to one or more communication protocols and/or RATs, such as any of those discussed herein. The modem circuitry 1261 includes baseband processors or control logic to process baseband signals received from a receive signal path of the TRxs 1262, 1263, and to generate baseband signals to be provided to the TRxs 1262, 1263 via a transmit signal path. In various implementations, the modem circuitry 1261 may operate according to one or more of the power optimization configurations (e.g., POs 615 of FIG. 6) including any of those discussed herein (see e.g., section 1, supra).

The TRxs 1262, 1263 include hardware elements for transmitting and receiving radio waves according to any number of frequencies and/or communication protocols, such as any of those discussed herein. The TRxs 1262, 1263 can include transmitters (Tx) and receivers (Rx) as separate or discrete electronic devices, or single electronic devices with Tx and Rx functionally. In either implementation, the TRxs 1262, 1263 may be configured to communicate over different networks or otherwise be used for different purposes. In one example, the TRx 1262 is configured to communicate using a first RAT (e.g., W-V2X and/or [IEEE802] RATs, such as [IEEE80211], [IEEE802154], [WiMAX], IEEE 802.11bd, ETSI ITS-G5, and/or the like)

and TRx 1263 is configured to communicate using a second RAT (e.g., 3GPP RATs such as 3GPP LTE or NR/5G including C-V2X). In another example, the TRxs 1262, 1263 may be configured to communicate over different frequencies or ranges, such as the TRx 1262 being configured to communicate over a relatively short distance (e.g., devices 1290 within about 10 meters using a local Bluetooth®, devices 1290 within about 50 meters using ZigBee®, and/or the like), and TRx 1262 being configured to communicate over a relatively long distance (e.g., using [IEEE802], [WiMAX], and/or 3GPP RATs). The same or different communications techniques may take place over a single TRx at different power levels or may take place over separate TRxs.

A network interface circuitry 1230 (also referred to as "network interface controller 1230" or "NIC 1230") provides wired communication to nodes of the cloud 1265 and/or to connected devices 1290. The wired communications may be provided according to Ethernet or may be based on other types of networks, such as Controller Area Network (CAN), Local Interconnect Network (LIN), DeviceNet, ControlNet, Data Highway+, or PROFINET, among many others. As examples, the NIC 1230 may be embodied as a SmartNIC and/or one or more intelligent fabric processors (IFPs). One or more additional NICs 1230 may be included to enable connecting to additional networks. For example, a first NIC 1230 can provide communications to the cloud 1265 over an Ethernet network, a second NIC 1230 can provide communications to connected devices 1290 over an optical network (e.g., optical transport network (OTN), Synchronous optical networking (SONET), and synchronous digital hierarchy (SDH)), and so forth.

Given the variety of types of applicable communications from the compute node 1200 to another component, device 1290, and/or network 1265, applicable communications circuitry used by the compute node 1200 may include or be embodied by any combination of components 1230, 1240, 1250, or 1260. Accordingly, applicable means for communicating (e.g., receiving, transmitting, broadcasting, and so forth) may be embodied by such circuitry.

The acceleration circuitry 1250 (also referred to as "accelerator circuitry 1250") includes any suitable hardware device or collection of hardware elements that are designed to perform one or more specific functions more efficiently in comparison to general-purpose processing elements. The acceleration circuitry 1250 can include various hardware elements such as, for example, one or more GPUs, FPGAs, DSPs, SoCs (including programmable SoCs and multi-processor SoCs), ASICs (including programmable ASICs), PLDs (including complex PLDs (CPLDs) and high capacity PLDs (HCPLDs), xPUs (e.g., DPUs, IPUs, and NPUs) and/or other forms of specialized circuitry designed to accomplish specialized tasks. Additionally or alternatively, the acceleration circuitry 1250 may be embodied as, or include, one or more of artificial intelligence (AI) accelerators (e.g., vision processing unit (VPU), neural compute sticks, neuromorphic hardware, deep learning processors (DLPs) or deep learning accelerators, tensor processing units (TPUs), physical neural network hardware, and/or the like), cryptographic accelerators (or secure cryptoprocessors), network processors, I/O accelerator (e.g., DMA engines and the like), and/or any other specialized hardware device/component. The offloaded tasks performed by the acceleration circuitry 1250 can include, for example, AI/ML tasks (e.g., training, feature extraction, model execution for inference/prediction, classification, and so forth), visual data processing, graphics processing, digital and/or analog signal processing, network data processing, infrastructure function management, object detection, rule analysis, and/or the like.

The TEE 1270 operates as a protected area accessible to the processor circuitry 1202 and/or other components to enable secure access to data and secure execution of instructions. In some implementations, the TEE 1270 may be a physical hardware device that is separate from other components of the system 1200 such as a secure-embedded controller, a dedicated SoC, a trusted platform module (TPM), a tamper-resistant chipset or microcontroller with embedded processing devices and memory devices, and/or the like. Additionally or alternatively, the TEE 1270 is implemented as secure enclaves (or "enclaves"), which are isolated regions of code and/or data within the processor and/or memory/storage circuitry of the compute node 1200, where only code executed within a secure enclave may access data within the same secure enclave, and the secure enclave may only be accessible using the secure app (which may be implemented by an app processor or a tamper-resistant microcontroller). In some implementations, the memory circuitry 1204 and/or storage circuitry 1208 may be divided into one or more trusted memory regions for storing apps or software modules of the TEE 1270. Additionally or alternatively, the processor circuitry 1202, acceleration circuitry 1250, memory circuitry 1210, and/or storage circuitry 1220 may be divided into, or otherwise separated into virtualized environments using a suitable virtualization technology, such as, for example, virtual machines (VMs), virtualization containers, and/or the like. These virtualization technologies may be managed and/or controlled by a virtual machine monitor (VMM), hypervisor container engines, orchestrators, and the like. Such virtualization technologies provide execution environments in which one or more apps and/or other software, code, or scripts may execute while being isolated from one or more other apps, software, code, or scripts.

The input/output (I/O) interface circuitry 1240 (also referred to as "interface circuitry 1240") is used to connect additional devices or subsystems. The interface circuitry 1240, is part of, or includes circuitry that enables the exchange of information between two or more components or devices such as, for example, between the compute node 1200 and various additional/external devices (e.g., sensor circuitry 1242, actuator circuitry 1244, and/or positioning circuitry 1243). Access to various such devices/components may be implementation specific, and may vary from implementation to implementation. At least in some examples, the interface circuitry 1240 includes one or more hardware interfaces such as, for example, buses, input/output (I/O) interfaces, peripheral component interfaces, network interface cards, and/or the like. Additionally or alternatively, the interface circuitry 1240 includes a sensor hub or other like elements to obtain and process collected sensor data and/or actuator data before being passed to other components of the compute node 1200.

The sensor circuitry 1242 includes devices, modules, or subsystems whose purpose is to detect events or changes in its environment and send the information (sensor data) about the detected events to some other a device, module, subsystem, and the like. In some implementations, the sensor(s) 1242 are the same or similar as the sensors 612 of FIG. 6. Individual sensors 1242 may be exteroceptive sensors (e.g., sensors that capture and/or measure environmental phenomena and/or external states), proprioceptive sensors (e.g., sensors that capture and/or measure internal states of the compute node 1200 and/or individual components of the compute node 1200), and/or exproprioceptive sensors (e.g., sensors that capture, measure, or correlate internal states and external states). Examples of such sensors 1242 include inertia measurement units (IMU), microelectromechanical systems (MEMS) or nanoelectromechanical systems (NEMS), level sensors, flow sensors, temperature sensors (e.g., thermistors, including sensors for measuring the temperature of internal components and sensors for measuring temperature external to the compute node 1200), pressure sensors, barometric pressure sensors, gravimeters, altimeters, image capture devices (e.g., visible light cameras, thermographic camera and/or thermal imaging camera (TIC) systems, forward-looking infrared (FLIR) camera systems, radiometric thermal camera systems, active infrared (IR) camera systems, ultraviolet (UV) camera systems, and/or the like), light detection and ranging (LiDAR) sensors, proximity sensors (e.g., IR radiation detector and the like), depth sensors, ambient light sensors, optical light sensors, ultrasonic transceivers, microphones, inductive loops, and/or the like. The IMUs, MEMS, and/or NEMS can include, for example, one or more 3-axis accelerometers, one or more 3-axis gyroscopes, one or more magnetometers, one or more compasses, one or more barometers, and/or the like.

Additional or alternative examples of the sensor circuitry 1242 used for various aerial asset and/or vehicle control systems can include one or more of exhaust sensors including exhaust oxygen sensors to obtain oxygen data and manifold absolute pressure (MAP) sensors to obtain manifold pressure data; mass air flow (MAF) sensors to obtain intake air flow data; intake air temperature (IAT) sensors to obtain IAT data; ambient air temperature (AAT) sensors to obtain AAT data; ambient air pressure (AAP) sensors to obtain AAP data; catalytic converter sensors including catalytic converter temperature (CCT) to obtain CCT data and catalytic converter oxygen (CCO) sensors to obtain CCO data; vehicle speed sensors (VSS) to obtain VSS data; exhaust gas recirculation (EGR) sensors including EGR pressure sensors to obtain ERG pressure data and EGR position sensors to obtain position/orientation data of an EGR valve pintle; Throttle Position Sensor (TPS) to obtain throttle position/orientation/angle data; a crank/cam position sensors to obtain crank/cam/piston position/orientation/angle data; coolant temperature sensors; pedal position sensors; accelerometers; altimeters; magnetometers; level sensors; flow/fluid sensors, barometric pressure sensors, vibration sensors (e.g., shock & vibration sensors, motion vibration sensors, main and tail rotor vibration monitoring and balancing (RTB) sensor(s), gearbox and drive shafts vibration monitoring sensor(s), bearings vibration monitoring sensor(s), oil cooler shaft vibration monitoring sensor(s), engine vibration sensor(s) to monitor engine vibrations during steady-state and transient phases, and/or the like), force and/or load sensors, remote charge converters (RCC), rotor speed and position sensor(s), fiber optic gyro (FOG) inertial sensors, Attitude & Heading Reference Unit (AHRU), fibre Bragg grating (FBG) sensors and interrogators, tachometers, engine temperature gauges, pressure gauges, transformer sensors, airspeed-measurement meters, vertical speed indicators, and/or the like.

The actuators 1244 allow compute node 1200 to change its state, position, and/or orientation, or move or control a mechanism or system. The actuators 1244 comprise electrical and/or mechanical devices for moving or controlling a mechanism or system, and converts energy (e.g., electric current or moving air and/or liquid) into some kind of motion. Additionally or alternatively, the actuators 1244 can include electronic controllers linked or otherwise connected to one or more mechanical devices and/or other actuation devices. As examples, the actuators 1244 can be or include any number and combination of the following: soft actuators (e.g., actuators that changes its shape in response to a stimuli such as, for example, mechanical, thermal, magnetic, and/or electrical stimuli), hydraulic actuators, pneumatic actuators, mechanical actuators, electromechanical actuators (EMAs), microelectromechanical actuators, electrohydraulic actuators, linear actuators, linear motors, rotary motors, DC motors, stepper motors, servomechanisms, electromechanical switches, electromechanical relays (EMRs), power switches, valve actuators, piezoelectric actuators and/or biomorphs, thermal biomorphs, solid state actuators, solid state relays (SSRs), shape-memory alloy-based actuators, electroactive polymer-based actuators, relay driver integrated circuits (ICs), solenoids, impactive actuators/mechanisms (e.g., jaws, claws, tweezers, clamps, hooks, mechanical fingers, humaniform dexterous robotic hands, and/or other gripper mechanisms that physically grasp by direct impact upon an object), propulsion actuators/mechanisms (e.g., wheels, axles, thrusters, propellers, engines, motors, servos, clutches, rotors, and the like), projectile actuators/mechanisms (e.g., mechanisms that shoot or propel objects or elements), payload actuators, audible sound generators (e.g., speakers and the like), LEDs and/or visual warning devices, and/or other like electromechanical components. Additionally or alternatively, the actuators 1244 can include virtual instrumentation and/or virtualized actuator devices.

Additionally or alternatively, the interface circuitry 1240 and/or the actuators 1244 can include various individual controllers and/or controllers belonging to one or more components of the compute node 1200 such as, for example, host controllers, cooling element controllers, baseboard management controller (BMC), platform controller hub (PCH), uncore components (e.g., shared last level cache (LLC) cache, caching agent (Cbo), integrated memory controller (IMC), home agent (HA), power control unit (PCU), configuration agent (Ubox), integrated I/O controller (IIO), and interconnect (IX) link interfaces and/or controllers), and/or any other components such as any of those discussed herein. The compute node 1200 may be configured to operate one or more actuators 1244 based on one or more captured events, instructions, control signals, and/or configurations received from a service provider, client device, and/or other components of the compute node 1200. Additionally or alternatively, the actuators 1244 can include mechanisms that are used to change the operational state (e.g., on/off, zoom or focus, and/or the like), position, and/or orientation of one or more sensors 1242.

In some implementations, such as when the compute node 1200 is part of a vehicle system (e.g., V-ITS-S 610 of FIG. 6), the actuators 1244 correspond to the driving control units (DCUs) 614 discussed previously w.r.t FIG. 6. In some implementations, such as when the compute node 1200 is part of roadside equipment (e.g., R-ITS-S 630 of FIG. 6), the actuators 1244 can be used to change the operational state of the roadside equipment or other roadside equipment, such as gates, traffic lights, digital signage or variable message signs (VMS), and/or the like. The actuators 1244 are configured to receive control signals from the R-ITS-S 630 via a roadside network, and convert the signal energy (or some other energy) into an electrical and/or mechanical motion. The control signals may be relatively low energy electric voltage or current.

The positioning circuitry (pos) 1243 includes circuitry to receive and decode signals transmitted/broadcasted by a positioning network of a navigation satellite system (NSS). An NSS provides autonomous geo-spatial positioning with global or regional coverage. Augmentation systems are NSS that provide regional coverage to augment the navigation systems with global coverage. For purposes of the present disclosure, the term "NSS" may encompass or refer to global, regional, and/or augmentation satellite systems. Examples of NSS include global NSS (GNSS) (e.g., Global Positioning System (GPS), the European Union's Galileo system, Russia's Global Navigation System (GLONASS), China's BeiDou NSS (BDS), and/or the like), regional NSS (e.g., Indian Regional Navigation Satellite System (IRNSS) or Navigation with Indian Constellation (NavIC), Japan's Quasi-Zenith Satellite System (QZSS), France's Doppler Orbitography and Radio-positioning Integrated by Satellite (DORIS), and/or the like), Space Based Augmentation System (SBAS) (e.g., Wide Area Augmentation System (WAAS), European Geostationary Navigation Overlay Service (EGNOS), Multi-Functional Satellite Augmentation System (MSAS), GPS Aided Geo Augmented Navigation (GAGAN), or the like. The pos 1243 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the pos 1243 may include a Micro-Technology for Positioning, Navigation, and Timing (Micro-PNT) IC that uses a master timing clock to perform position tracking/estimation without GNSS assistance. The pos 1243 may also be part of, or interact with, the communication circuitry 1260 to communicate with the nodes and components of the positioning network. The pos 1243 may also provide position data and/or time data to the application circuitry (e.g., processor circuitry 1202), which may use the data to synchronize operations with various infrastructure (e.g., radio base stations), for turn-by-turn navigation, or the like. In some implementations, the pos 1243 is, or includes an INS, which is a system or device that uses sensor circuitry 1242 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the platform 1200 without the need for external references.

In some examples, various I/O devices may be present within or connected to, the compute node 1200, which are referred to as input circuitry 1246 and output circuitry 1245. The input circuitry 1246 and output circuitry 1245 include one or more user interfaces designed to enable user interaction with the platform 1200 and/or peripheral component interfaces designed to enable peripheral component interaction with the platform 1200. The input circuitry 1246 and/or output circuitry 1245 may be, or may be part of a Human Machine Interface (HMI), such as HMI 906, 1006, 1106. Input circuitry 1246 includes any physical or virtual means for accepting an input including buttons, switches, dials, sliders, keyboard, keypad, mouse, touchpad, touchscreen, microphone, scanner, headset, and/or the like. The output circuitry 1245 may be included to show information or otherwise convey information, such as sensor readings, actuator position(s), or other like information. Data and/or graphics may be displayed on one or more user interface components of the output circuitry 1245. Output circuitry 1245 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, and the like), with the output of characters, graphics, multimedia objects, and the like being generated or produced from the operation of the compute node 1200. The output circuitry 1245 may also include speakers or other audio emitting devices, printer(s), and/or the like. Additionally or alternatively, the sensor circuitry 1242 may be used as the input circuitry 1245 (e.g., an image capture device, motion capture device, or the like) and one or more actuators 1244 may be used as the output device circuitry 1245 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, and the like. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1280 can be used to power the compute node 1200, although, in examples in which the compute node 1200 is mounted in a fixed location, it may have a power supply coupled to an electrical grid, or the battery 1280 may be used as a backup power source. As examples, the battery 1280 can be a lithium ion battery or a metal-air battery (e.g., zinc-air battery, aluminum-air battery, lithium-air battery, and the like). Other battery technologies may be used in other implementations.

A battery monitor/charger 1282 may be included in the compute node 1200 to track various measurements and/or metrics of the battery 1280 ("battery parameters") such as, for example, voltage (e.g., minimum and/or maximum cell voltage), state of charge (SoCh or SoC) or depth of discharge (DoD) (e.g., the charge level of the battery 1280; state of health (SoH) (e.g., a variously-defined measurement of the remaining capacity of the battery 1280 as % of the original, full, or total capacity); state of function (SoF) (e.g., reflects battery readiness in terms of usable energy by observing state-of-charge in relation to the available capacity), state of power (SoP) (e.g., the amount of power available for a defined time interval given the current power usage, temperature, and other conditions), state of safety (SOS), a charge current limit (CCL) (e.g., maximum charge current), discharge current limit (DCL) (e.g., maximum discharge current), energy [kWh] delivered since last charge or charge cycle, internal impedance of a cell (e.g., to determine open circuit voltage), charge [Ah] delivered or stored (also referred to as a Coulomb counter), total energy delivered since first use, total operating time since first use, total number of cycles, temperature monitoring measurements/metrics, coolant flow for air or liquid cooled batteries, and/or the like. The battery monitor/charger 1282 includes a battery monitoring IC and is capable of communicating the battery parameters to the processor 1202 over the IX 1206. In some implementations, the battery monitor/charger 1282 includes an analog-to-digital (ADC) converter that enables the processor 1202 to directly monitor the voltage of the battery 1280 and/or the current flow from the battery 1280. The battery parameters may be used to determine actions that the compute node 1200 may perform, such as transmission frequency, mesh network operation, sensing frequency, charging time, charging current/voltage draw, battery failure predictions, and the like.

A power block 1285, or other power supply coupled to a grid, may be coupled with the battery monitor/charger 1282 to charge the battery 1280. In some examples, the power block 1285 may be replaced with a wireless power receiver to obtain the power wirelessly, for example, through a loop antenna in the compute node 1200. A wireless battery charging circuit may be included in the battery monitor/charger 1282. The specific charging circuits may be selected based on the size of the battery 1280, and thus, the current required. The charging may be performed according to Airfuel Alliance standards, the Qi wireless charging standard, the Rezence charging standard, among others.

The example of FIG. 12 is intended to depict a high-level view of components of a varying device, subsystem, or arrangement of a computing node 1200. However, in other implementations, some of the components shown may be omitted, additional components may be present, and a different arrangement of the components shown may occur in other implementations. Further, these arrangements are usable in a variety of use cases and environments, including those discussed herein.

3. Example Implementations

Figure 5:
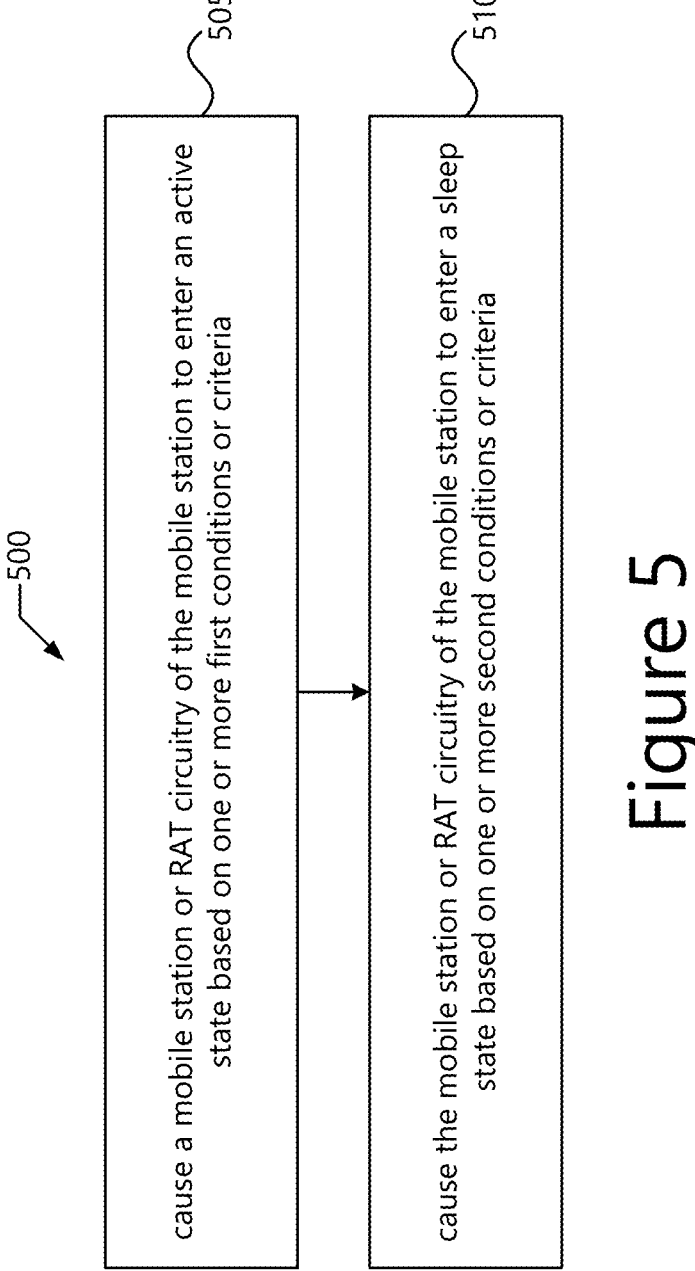
FIG. 5 depicts an example process for operating a VRU.

FIG. 5 shows an example process 500 for operating a mobile station to realize power savings in the mobile station. In some examples, the mobile station is a VRU station that is the same or similar as the VRU 110*v* of FIG. 1, VRUs 321/322*p* of FIG. 3, VRU 610*v* of FIG. 6, and/or any other UE or device/entity discussed herein. At operation 505, the mobile station causes the mobile station or RAT circuitry of the mobile station to enter an active state based on one or more first conditions or criteria. At operation 510, the mobile station causes the mobile station or the RAT circuitry of the mobile station to enter a sleep state based on one or more second conditions or criteria. The first conditions or criteria may be the same or different than the second conditions or criteria. After operation 510, process 500 may end or repeat as necessary.

Additional examples of the presently described methods, devices, systems, and networks discussed herein include the following, non-limiting implementations. Each of the following non-limiting examples may stand on its own or may be combined in any permutation or combination with any one or more of the other examples provided below or throughout the present disclosure.

Example 1 includes a method of operating a mobile station, comprising: causing the mobile station or Radio Access Technology (RAT) circuitry of the mobile station to enter an active state based on a set of first conditions; and causing the mobile station or the RAT circuitry of the mobile station to enter a sleep state based on a set of second conditions. Example 2 includes the method of example 1 and/or some other example(s) herein, wherein the first conditions are same or different than the second conditions. Example 3 includes the method of examples 1-2 and/or some other example(s) herein, wherein entering the active state includes enabling or switching ON the RAT circuitry and/or transmission (Tx) and/or reception (Rx) functionality of the mobile station.

Example 4 includes the method of examples 1-3 and/or some other example(s) herein, wherein entering the sleep state includes disabling or switching OFF the RAT circuitry and/or Tx and/or Rx functionality of the mobile station.

Example 5 includes the method of examples 1-4 and/or some other example(s) herein, wherein the method includes: receiving a discontinuous reception (DRX) configuration based on message traffic, channel conditions, signal strength/quality measurements, and/or other like conditions and/or parameters; and setting a DRX timer according to the DRX configuration. In some examples, the message traffic is ITS/V2X message traffic. As examples, the message traffic can refer to traffic volume, message types (e.g., ratio or different messages in a given environment), and/or any other traffic-related measurements/metrics.

Example 6 includes the method of example 5 and/or some other example(s) herein, wherein the set of first conditions and/or the set of second conditions are based on the DRX configuration. Example 7 includes the method of examples 5-6 and/or some other example(s) herein, wherein the set of second conditions includes expiration of the DRX timer, and the method includes: starting the DRX timer when no messages are obtained within a predefined or configured period of time; and causing the RAT circuitry to enter the sleep state when the DRX timer expires. Example 8 includes the method of examples 5-7 and/or some other example(s) herein, wherein the DRX configuration includes a set of DRX parameters. Example 9 includes the method of example 8 and/or some other example(s) herein, wherein the set of DRX parameters include a DRX-onDuration parameter, wherein the DRX-onDuration parameter includes one or more of a duration of a DRX cycle, a time interval during which periodic V2X/ITS message(s) is/are scheduled and/or transmitted, or a duration at a beginning of an individual DRX cycle. Example 10 includes the method of examples 8-9 and/or some other example(s) herein, wherein the set of DRX parameters include a DRX-ShortCycle parameter, wherein the DRX-ShortCycle parameter includes one or more of: a duration of an individual short DRX cycle, or a time duration corresponding to V2X/ITS message periodicity. Example 11 includes the method of example 10 and/or some other example(s) herein, wherein the set of DRX parameters include a DRX-ShortCycleTimer parameter, wherein the DRX-ShortCycleTimer parameter includes one or more of: a duration following the DRX-ShortCycle, a number of short DRX cycles to follow after a start of a short DRX cycle, or a number of short DRX cycles after which a long DRX cycle is to be applied. Example 12 includes the method of examples 10-11 and/or some other example(s) herein, wherein the set of DRX parameters include a DRX-LongCycle parameter, wherein the DRX-LongCycle parameter includes one or more of: a duration of an individual long DRX cycle, or a number of short DRX cycles making up the DRX-LongCycle. Example 13 includes the method of example 12 and/or some other example(s) herein, wherein the method includes: entering the long DRX cycle when there is no transmission or receipt of V2X/ITS messages) during a period defined by the DRX-ShortCycle and the DRX-ShortCycleTimer. Example 14 includes the method of examples 5-13 and/or some other example(s) herein, wherein the method includes: receiving a Radio Resource Control (RRC) configuration including the DRX configuration.

Example 15 includes the method of examples 1-14 and/or some other example(s) herein, wherein the method includes: receiving a zone configuration, wherein the zone configuration includes one or more locations or geographic areas at which the mobile station is to activate or deactivate the RAT circuitry. Example 16 includes the method of example 15 and/or some other example(s) herein, wherein the method includes: configuring a set of DRX parameters according to zone-based message traffic estimation, channel conditions, signal strength/quality measurements, and/or other like conditions and/or parameters. Example 17 includes the method of example 16 and/or some other example(s) herein, wherein configuring the set of DRX parameters includes: increasing a value of the DRX-ShortCycle parameter and/or a value of a DRX-LongCycle parameter for locations that are not at or near vehicular traffic and/or road infrastructure; and decreasing the value of the DRX-ShortCycle parameter and/or the value of the DRX-LongCycle parameter for locations that are at or near vehicular traffic and/or road infrastructure. Example 18 includes the method of examples 16-17 and/or some other example(s) herein, wherein configuring the set of DRX parameters includes: decreasing a value of a DRX-ShortCycle Timer parameter for locations that are not at or near vehicular traffic and/or road infrastructure; and increasing the value of the DRX-ShortCycle Timer parameter for the locations that are at or near vehicular traffic and/or road infrastructure. Example 19 includes the method of examples 15-18 and/or some other example(s) herein, wherein the method includes: using map data provided by positioning circuitry and/or a navigation application to determine a current location of the mobile station; and activating or deactivating the RAT circuitry based on the current location of the mobile station.

Example 20 includes the method of examples 1-19 and/or some other example(s) herein, wherein the method includes: receiving a wake-up signal (WUS) from a beacon device; and entering the active state in response to receipt of the WUS. Example 21 includes the method of example 20 and/or some other example(s) herein, wherein the WUS is transmitted prior to each scheduled transmission occasion. Example 22 includes the method of examples 20-21 and/or some other example(s) herein, wherein the set of second conditions includes receipt of a Go-To-Sleep (GTS) signal, and the method includes: receiving the GTS signal from the beacon device when there are no messages to be transmitted in a configured transmission occasion; and entering the sleep state in response to receipt of the GTS signal. Example 23 includes the method of examples 1-22 and/or some other example(s) herein, wherein the set of first conditions includes the mobile station being within a predefined or configurable distance to one or more vehicles, roadway infrastructure, and/or a roadside unit (RSU), and the set of second conditions includes the mobile station not being within the predefined or configurable distance to one or more vehicles, roadway infrastructure, and/or an RSU. Example 24 includes the method of example 23 and/or some other example(s) herein, wherein the method includes: determining a current position or location of the mobile station with respect to one or more vehicles, roadway infrastructure, and/or one or more RSUs; entering the active state when the current position indicates that the mobile station is proximate to the one or more vehicles, the roadway infrastructure, and/or the RSU; and entering the sleep state when the current position indicates that the mobile station is not proximate to the one or more vehicles, the roadway infrastructure, and/or the RSU. Example 25 includes the method of examples 1-24 and/or some other example(s) herein, wherein the set of first conditions includes the mobile station being located in a high-risk geographical area, and the set of second conditions includes the mobile station not being located in a high-risk geographical area. Example 26 includes the method of example 25 and/or some other example(s) herein, the method includes: entering the active state when a current position of the mobile station indicates that the mobile station is in a high-risk geographical area;

and entering the sleep state when the current position indicates that the mobile station is in in a low-risk geographical area or otherwise not in a high-risk geographical area. Example 27 includes the method of example 26 and/or some other example(s) herein, wherein the method includes: entering a partial-active state or a partial sleep state when the current position indicates that the mobile station is in a mid-risk geographical area, wherein the mid-risk geographical area is a geographic area or region between at least one high-risk geographical area and at least one low-risk geographical area. Example 28 includes the method of example 27 and/or some other example(s) herein, wherein the active state is an operational mode in which services are consumed and/or the RAT circuitry is powered on, the sleep state is an operational mode in which services are not consumed and/or the RAT circuitry is powered off for a first cycle time, and the partial-active state or the partial sleep state is an operational mode in which services are not consumed and/or the RAT circuitry is powered off for a second cycle time that is shorter than the first cycle time. In some examples, the services to be consumed are VRU and/or other ITS services. Example 29 includes the method of example 28 and/or some other example(s) herein, wherein the first cycle time is based on first signal strength and/or signal quality measurements and the second cycle time is based on second signal strength and/or signal quality measurements that are greater or better than the first signal strength and/or signal quality measurements. Example 30 includes the method of example 29 and/or some other example(s) herein, wherein the first cycle time is based on a first observed position of the mobile station by a network element and the second cycle time is based on a second observed position of the mobile station by the network element, wherein the first observed position is greater than the second observed position. Example 31 includes the method of examples 1-30 and/or some other example(s) herein, wherein the mobile station is a VRU station, and the method includes: entering the active state during time slots reserved for VRU communications; and during the time slots and while in the active state: monitoring one or more channels for receiving data; and/or transmitting data to one or more nodes in one or more channels. Example 32 includes the method of examples 1-31 and/or some other example(s) herein, wherein the method includes, while in the active state: monitoring one or more resource blocks allocated to the mobile station for downlink data; and transmitting or broadcasting uplink data to one or more other devices in the one or more resource blocks allocated to the mobile station.

Example 33 includes the method of examples 5-32 and/or some other example(s) herein, wherein the messages and/or the message traffic includes V2X/ITS messages. Example 34 includes the method of example 33 and/or some other example(s) herein, wherein the V2X/ITS messages include one or more of CAMs, CPMs, DENMs, VAMs, MAPEMs, SPATEMs, IVIMs, SREMs, SSEMs, and/or the like. Example 35 includes the method of examples 1-34 and/or some other example(s) herein, wherein the method is performed by a Medium Access Control (MAC) entity/layer of the mobile station. Example 36 includes the method of examples 1-34 and/or some other example(s) herein, wherein the mobile station is a vulnerable road user (VRU) station, and the method is performed by a facilities layer service implemented by the mobile station. Example 37 includes the method of examples 35-36 and/or some other example(s) herein, wherein the mobile station is a VRU station, a smartphone, a tablet, a wearable device, an autonomous sensor, an Internet of Things (IoT) device, a single board computer, a performance monitoring device, a micro-mobility vehicle (e.g., powered two wheelers (PTW) (e.g., mopeds, motorcycles, and/or the like), bicycles and/or powered/electric bicycles, standing or seated scooters and/or powered/electric scooters, powered/electric self-balancing boards, skates and/or powered/electric skates, powered/electric wheelchairs and/or personal transporters, and/or the like), a four-wheeled all-terrain vehicle, a global positioning system (GPS) module or tag, an RFID tag, a small form factor computing device, and/or any other computing device, such as any of those discussed herein. In some examples, the GPS module or tag is embedded or otherwise included in an animal tag or collar. In some examples, the RFID tag is an implanted RFID tag.

Example Z01 includes one or more computer readable media comprising instructions, wherein execution of the instructions by processor circuitry is to cause the processor circuitry to perform the method of any one of examples 1-37. Example Z02 includes a computer program comprising the instructions of example Z01. Example Z03 includes an Application Programming Interface defining functions, methods, variables, data structures, and/or protocols for the computer program of example Z02. Example Z04 includes an API or specification defining functions, methods, variables, data structures, protocols, and the like, defining or involving use of any of examples 1-37 or portions thereof, or otherwise related to any of examples 1-37 or portions thereof. Example Z05 includes an apparatus comprising circuitry loaded with the instructions of example Z01. Example Z06 includes an apparatus comprising circuitry operable to run the instructions of example Z01. Example Z07 includes an integrated circuit comprising one or more of the processor circuitry of example Z01 and the one or more computer readable media of example Z01. Example Z08 includes a computing system comprising the one or more computer readable media and the processor circuitry of example Z01. Example Z09 includes an apparatus comprising means for executing the instructions of example Z01. Example Z10 includes a signal generated as a result of executing the instructions of example Z01. Example Z11 includes a data unit generated as a result of executing the instructions of example Z01. Example Z12 includes the data unit of example Z10 and/or some other example(s) herein, wherein the data unit is a datagram, network packet, data frame, data segment, a Protocol Data Unit (PDU), a Service Data Unit (SDU), a message, a database object, and/or any other data structure, such as any of those discussed herein. Example Z13 includes a signal encoded with the data unit of examples Z11 and/or Z12. Example Z14 includes an electromagnetic signal carrying the instructions of example Z01. Example Z15 includes an apparatus comprising means for performing the method of any one of examples 1-37 and/or some other example(s) herein. Example Z16 includes an edge compute node executing a service as part of one or more edge applications instantiated on virtualization infrastructure, the service being related to any of examples 1-37, portions thereof, and/or some other example(s) herein.

4. Terminology

For the purposes of the present document, the following terms and definitions are applicable to the examples and embodiments discussed herein. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The phrase "X(s)" means one or more X or a set of X. The description may use the phrases "in an embodiment," "In some embodiments," "in one implementation," "In some implementations," "in some examples", and the like, each of which may refer to one or more of the same or different embodiments, implementations, and/or examples. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "establish" or "establishment" at least in some examples refers to (partial or in full) acts, tasks, operations, and the like, related to bringing or the readying the bringing of something into existence either actively or passively (e.g., exposing a device identity or entity identity). Additionally or alternatively, the term "establish" or "establishment" at least in some examples refers to (partial or in full) acts, tasks, operations, and the like, related to initiating, starting, or warming communication or initiating, starting, or warming a relationship between two entities or elements (e.g., establish a session, establish a session, and the like). Additionally or alternatively, the term "establish" or "establishment" at least in some examples refers to initiating something to a state of working readiness. The term "established" at least in some examples refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions. The term "obtain" at least in some examples refers to (partial or in full) acts, tasks, operations, and the like, of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive a stream of packets (or the following parameters and templates or template values). The term "receipt" at least in some examples refers to any action (or set of actions) involved with receiving or obtaining an object, data, data unit, and the like, and/or the fact of the object, data, data unit, and the like being received. The term "receipt" at least in some examples refers to an object, data, data unit, and the like, being pushed to a device, system, element, and the like (e.g., often referred to as a push model), pulled by a device, system, element, and the like (e.g., often referred to as a pull model), and/or the like. The term "signal" at least in some examples refers to an observable change in a quality and/or quantity. Additionally or alternatively, the term "signal" at least in some examples refers to a function that conveys information about of an object, event, or phenomenon. Additionally or alternatively, the term "signal" at least in some examples refers to any time varying voltage, current, or electromagnetic wave that may or may not carry information. The term "digital signal" at least in some examples refers to a signal that is constructed from a discrete set of waveforms of a physical quantity so as to represent a sequence of discrete values.

The term "element" at least in some examples refers to a unit that is indivisible at a given level of abstraction and has a clearly defined boundary, wherein an element may be any type of entity including, for example, one or more devices, systems, controllers, network elements, modules, engines, components, and so forth, or combinations thereof. The term "entity" at least in some examples refers to a distinct element of a component, architecture, platform, device, and/or system. Additionally or alternatively, the term "entity" at least in some examples refers to information transferred as a payload.

The term "measurement" at least in some examples refers to the observation and/or quantification of attributes of an object, event, or phenomenon. Additionally or alternatively, the term "measurement" at least in some examples refers to a set of operations having the object of determining a measured value or measurement result, and/or the actual instance or execution of operations leading to a measured value. Additionally or alternatively, the term "measurement" at least in some examples refers to data recorded during testing. The term "metric" at least in some examples refers to a quantity produced in an assessment of a measured value. Additionally or alternatively, the term "metric" at least in some examples refers to data derived from a set of measurements. Additionally or alternatively, the term "metric" at least in some examples refers to set of events combined or otherwise grouped into one or more values. Additionally or alternatively, the term "metric" at least in some examples refers to a combination of measures or set of collected data points. Additionally or alternatively, the term "metric" at least in some examples refers to a standard definition of a quantity, produced in an assessment of performance and/or reliability of the network, which has an intended utility and is carefully specified to convey the exact meaning of a measured value.

The terms "ego" (as in, e.g., "ego device") and "subject" (as in, e.g., "data subject") at least in some examples refers to an entity, element, device, system, and the like, that is under consideration or being considered. The terms "neighbor" and "proximate" (as in, e.g., "proximate device") at least in some examples refers to an entity, element, device, system, and the like, other than an ego device or subject device.

The term "circuitry" at least in some examples refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), single-board computer (SBC), system on chip (SoC), system in package (SiP), multi-chip package (MCP), digital signal processor (DSP), and the like, that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry. The term "processor circuitry" at least in some examples refers to, is part of, or includes circuitry capable of sequentially and automatically carrying out a sequence of arithmetic or logical operations, or recording, storing, and/or transferring digital data. The term "processor circuitry" at least in some examples refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry." The term "memory" and/or "memory circuitry" at least in some examples refers to one or more hardware devices for storing data, including random access memory (RAM), static RAM (SRAM), dynamic RAM (DRAM), synchronous DRAM (SDRAM), magnetoresistive RAM (MRAM), conductive bridge Random Access Memory (CB-RAM), spin transfer torque (STT)-MRAM, phase change RAM (PRAM), core memory, read-only memory (ROM), programmable ROM (PROM), erasable PROM (EPROM), electrically EPROM (EEPROM), flash memory, non-volatile RAM (NVRAM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data. The term "interface circuitry" at least in some examples refers to, is part of, or includes circuitry that enables the exchange of information between two or more components or devices. The term "interface circuitry" at least in some examples refers to one or more hardware interfaces, for example, buses, I/O interfaces, peripheral component interfaces, network interface cards, and/or the like.

The term "device" at least in some examples refers to a physical entity embedded inside, or attached to, another physical entity in its vicinity, with capabilities to convey digital information from or to that physical entity. The term "controller" at least in some examples refers to an element or entity that has the capability to affect a physical entity, such as by changing its state or causing the physical entity to move. The term "form factor" at least in some examples refers to various aspects of hardware/platform design that defines and/or prescribes the size, shape, and/or other physical specifications or parameters of components, devices, housing, and/or other aspects of a device or equipment.

The term "compute node" or "compute device" at least in some examples refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like. For purposes of the present disclosure, the term "node" at least in some examples refers to and/or is interchangeable with the terms "device", "component", "sub-system", and/or the like. The term "computer system" at least in some examples refers to any type interconnected electronic devices, computer devices, or components thereof. Additionally, the terms "computer system" and/or "system" at least in some examples refer to various components of a computer that are communicatively coupled with one another. Furthermore, the term "computer system" and/or "system" at least in some examples refer to multiple computer devices and/or multiple computing systems that are communicatively coupled with one another and configured to share computing and/or networking resources. The term "user equipment" or "UE" at least in some examples refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, and the like. Furthermore, the term "user equipment" or "UE" may include any type of wireless/wired device or any computing device including a wireless communications interface. Examples of UEs, client devices, and the like, include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmut-mounted display devices, augmented reality (AR) devices, virtual reality (VR) devices, mixed reality (MR) devices, and/or other like systems or devices. The term "station" or "STA" at least in some examples refers to a logical entity that is a singly addressable instance of a medium access control (MAC) and physical layer (PHY) interface to the wireless medium (WM). The term "wireless medium" or WM" at least in some examples refers to the medium used to implement the transfer of protocol data units (PDUs) between peer physical layer (PHY) entities of a wireless local area network (LAN). The term "platform" at least in some examples refers to an environment in which instructions, program code, software elements, and the like can be executed or otherwise operate, and examples of such an environment include an architecture (e.g., a motherboard, a computing system, and/or the like), one or more hardware elements (e.g., embedded systems, and the like), a cluster of compute nodes, a set of distributed compute nodes or network, an operating system, a virtual machine (VM), a virtualization container, a software framework, a client application (e.g., web browser or the like) and associated application programming interfaces, a cloud computing service (e.g., platform as a service (PaaS)), or other underlying software executed with instructions, program code, software elements, and the like.

The term "network element" at least in some examples refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like. The term "network controller" at least in some examples refers to a functional block that centralizes some or all of the control and management functionality of a network domain and may provide an abstract view of the network domain to other functional blocks via an interface. The term "network access node" or "NAN" at least in some examples refers to a network element in a radio access network (RAN) responsible for the transmission and reception of radio signals in one or more cells or coverage areas to or from a UE or station. A "network access node" or "NAN" can have an integrated antenna or may be connected to an antenna array by feeder cables. Additionally or alternatively, a "network access node" or "NAN" may include specialized digital signal processing, network function hardware, and/or compute hardware to operate as a compute node. In some examples, a "network access node" or "NAN" may be split into multiple functional blocks operating in software for flexibility, cost, and performance. In some examples, a "network access node" or "NAN" may be a base station (e.g., an evolved Node B (eNB) or a next generation Node B (gNB)), an access point and/or wireless network access point, router, switch, hub, radio unit or remote radio head, Transmission Reception Point (TRxP), a gateway device (e.g., Residential Gateway, Wireline 5G Access Network, Wireline 5G Cable Access Network, Wireline BBF Access Network, and the like), network appliance, and/or some other network access hardware. The term "access point" or "AP" at least in some examples refers to an entity that contains one station (STA) and provides access to the distribution services, via the wireless medium (WM) for associated STAs. An AP comprises a STA and a distribution system access function (DSAF).

The term "edge compute node" or "edge compute device" at least in some examples refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some examples refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. however, references to an "edge computing system" generally refer to a distributed architecture, organization, or collection of multiple nodes and devices, and which is organized to accomplish or offer some aspect of services or resources in an edge computing setting. The term "edge computing platform" or "edge platform" at least in some examples refers to a collection of functionality that is used to instantiate, execute, or run edge applications on a specific edge compute node (e.g., virtualization infrastructure and/or the like), enable such edge applications to provide and/or consume edge services, and/ or otherwise provide one or more edge services. The term "edge application" or "edge app" at least in some examples refers to an application that can be instantiated on, or executed by, an edge compute node within an edge computing network, system, or framework, and can potentially provide and/or consume edge computing services. The term "edge service" at least in some examples refers to a service provided via an edge compute node and/or edge platform, either by the edge platform itself and/or by an edge application.

The term "compute resource" or simply "resource" at least in some examples refers to an object with a type, associated data, a set of methods that operate on it, and, if applicable, relationships to other resources. Additionally or alternatively, the term "compute resource" or "resource" at least in some examples refers to any physical or virtual component, or usage of such components, of limited availability within a computer system or network. Examples of computing resources include usage/access to, for a period of time, servers, processor(s), storage equipment, memory devices, memory areas, networks, electrical power, input/ output (peripheral) devices, mechanical devices, network connections (e.g., channels/links, ports, network sockets, and the like), operating systems, virtual machines (VMs), software/applications, computer files, and/or the like.

The term "virtualization container", "execution container", or "container" at least in some examples refers to a partition of a compute node that provides an isolated virtualized computation environment. The term "OS container" at least in some examples refers to a virtualization container utilizing a shared Operating System (OS) kernel of its host, where the host providing the shared OS kernel can be a physical compute node or another virtualization container. Additionally or alternatively, the term "container" at least in some examples refers to a standard unit of software (or a package) including code and its relevant dependencies, and/or an abstraction at the application layer that packages code and dependencies together. Additionally or alternatively, the term "container" or "container image" at least in some examples refers to a lightweight, standalone, executable software package that includes everything needed to run an application such as, for example, code, runtime environment, system tools, system libraries, and settings. The term "virtual machine" or "VM" at least in some examples refers to a virtualized computation environment that behaves in a same or similar manner as a physical computer and/or a server. The term "hypervisor" at least in some examples refers to a software element that partitions the underlying physical resources of a compute node, creates VMs, manages resources for VMs, and isolates individual VMs from each other.

The term "Internet of Things" or "IoT" at least in some examples refers to a system of interrelated computing devices, mechanical and digital machines capable of transferring data with little or no human interaction, and may involve technologies such as real-time analytics, AI and/or machine learning (ML), embedded systems, wireless sensor networks, control systems, automation (e.g., smarthome, smart building and/or smart city technologies), and the like.

The term "protocol" at least in some examples refers to a predefined procedure or method of performing one or more operations. Additionally or alternatively, the term "protocol" at least in some examples refers to a common means for unrelated objects to communicate with each other (sometimes also called interfaces). The term "communication protocol" at least in some examples refers to a set of standardized rules or instructions implemented by a communication device and/or system to communicate with other devices and/or systems, including instructions for packetizing/depacketizing data, modulating/demodulating signals, implementation of protocols stacks, and/or the like.

The term "application layer" at least in some examples refers to an abstraction layer that specifies shared communications protocols and interfaces used by hosts in a communications network. Additionally or alternatively, the term "application layer" at least in some examples refers to an abstraction layer that interacts with software applications that implement a communicating component, and may include identifying communication partners, determining resource availability, and synchronizing communication. Examples of application layer protocols include HTTP, HTTPs, File Transfer Protocol (FTP), Dynamic Host Configuration Protocol (DHCP), Internet Message Access Protocol (IMAP), Lightweight Directory Access Protocol (LDAP), MQTT (MQ Telemetry Transport), Remote Authentication Dial-In User Service (RADIUS), Diameter protocol, Extensible Authentication Protocol (EAP), RDMA over Converged Ethernet version 2 (RoCEv2), Real-time Transport Protocol (RTP), RTP Control Protocol (RTCP), Real Time Streaming Protocol (RTSP), SBMV Protocol, Skinny Client Control Protocol (SCCP), Session Initiation Protocol (SIP), Session Description Protocol (SDP), Simple Mail Transfer Protocol (SMTP), Simple Network Management Protocol (SNMP), Simple Service Discovery Protocol (SSDP), Small Computer System Interface (SCSI), Internet SCSI (iSCSI), iSCSI Extensions for RDMA (iSER), Transport Layer Security (TLS), voice over IP (VoIP), Virtual Private Network (VPN), Extensible Messaging and Presence Protocol (XMPP), and/or the like. The term "session layer" at least in some examples refers to an abstraction layer that controls dialogues and/or connections between entities or elements, and may include establishing, managing and terminating the connections between the entities or elements. The term "transport layer" at least in some examples refers to a protocol layer that provides end-to-end (e2e) communication services such as, for example, connection-oriented communication, reliability, flow control, and multiplexing. Examples of transport layer protocols include datagram congestion control protocol (DCCP), fibre channel protocol (FBC), Generic Routing Encapsulation (GRE), GPRS Tunneling (GTP), Micro Transport Protocol (µTP), Multipath TCP (MPTCP), MultiPath QUIC (MPQUIC), Multipath UDP (MPUDP), Quick UDP Internet Connections (QUIC), Remote Direct Memory Access (RDMA), Resource Reservation Protocol (RSVP), Stream Control Transmission Protocol (SCTP), transmission control protocol (TCP), user datagram protocol (UDP), and/or the like. The term "network layer" at least in some examples refers to a protocol layer that includes means for transferring network packets from a source to a destination via one or more networks. Additionally or alternatively, the term "network layer" at least in some examples refers to a protocol layer that is responsible for packet forwarding and/or routing through intermediary nodes. Additionally or alternatively, the term "network layer" or "internet layer" at least in some examples refers to a protocol layer that includes interworking methods, protocols, and specifications that are used to transport network packets across a network. As examples, the network layer protocols include internet protocol (IP), IP security (IPsec), Internet Control Message Protocol (ICMP), Internet Group Management Protocol (IGMP), Open Shortest Path First protocol (OSPF), Routing Information Protocol (RIP), RDMA over Converged Ethernet version 2 (RoCEv2), Subnetwork Access Protocol (SNAP), and/or some other internet or network protocol layer. The term "link layer" or "data link layer" at least in some examples refers to a protocol layer that transfers data between nodes on a network segment across a physical layer. Examples of link layer protocols include logical link control (LLC), medium access control (MAC), Ethernet, RDMA over Converged Ethernet version 1 (RoCEv1), and/or the like.

The term "radio resource control", "RRC layer", or "RRC" at least in some examples refers to a protocol layer or sublayer that performs system information handling; paging; establishment, maintenance, and release of RRC connections; security functions; establishment, configuration, maintenance and release of Signalling Radio Bearers (SRBs) and Data Radio Bearers (DRBs); mobility functions/services; QoS management; and some sidelink specific services and functions over the Uu interface (see e.g., 3GPP TS 36.331 v17.4.0 (2023 Mar. 30) ("[TS36331]") and/or 3GPP TS 38.331 v17.4.0 (2023 Mar. 30) ("[TS38331]")). The term "Service Data Adaptation Protocol", "SDAP layer", or "SDAP" at least in some examples refers to a protocol layer or sublayer that performs mapping between QoS flows and a data radio bearers (DRBs) and marking QoS flow IDs (QFI) in both DL and UL packets (see e.g., 3GPP TS 37.324 v17.0.0 (2022 Apr. 13)). The term "Packet Data Convergence Protocol", "PDCP layer", or "PDCP" at least in some examples refers to a protocol layer or sublayer that performs transfer user plane or control plane data; maintains PDCP sequence numbers (SNs); header compression and decompression using the Robust Header Compression (ROHC) and/or Ethernet Header Compression (EHC) protocols; ciphering and deciphering; integrity protection and integrity verification; provides timer based SDU discard; routing for split bearers; duplication and duplicate discarding; reordering and in-order delivery; and/or out-of-order delivery (see e.g., 3GPP TS 36.323 v17.2.0 (2023 Jan. 13) and/or 3GPP TS 38.323 v17.4.0 (2023 Mar. 28) (collectively referred to as "[PDCP]")). The term "radio link control layer", "RLC layer", or "RLC" at least in some examples refers to a protocol layer or sublayer that performs transfer of upper layer PDUs; sequence numbering independent of the one in PDCP; error Correction through ARQ; segmentation and/or re-segmentation of RLC SDUs; reassembly of SDUs; duplicate detection; RLC SDU discarding; RLC re-establishment; and/or protocol error detection (see e.g., 3GPP TS 36.322 v17.0.0 (2022 Apr. 15) and 3GPP TS 38.322 v17.2.0 (2023 Jan. 13) (collectively referred to as "[RLC]")). The term "medium access control protocol", "MAC protocol", or "MAC" at least in some examples refers to a protocol that governs access to the transmission medium in a network, to enable the exchange of data between stations in a network. Additionally or alternatively, the term "medium access control layer", "MAC layer", or "MAC" at least in some examples refers to a protocol layer or sublayer that performs functions to provide frame-based, connectionless-mode (e.g., datagram style) data transfer between stations or devices. Additionally or alternatively, the term "medium access control layer", "MAC layer", or "MAC" at least in some examples refers to a protocol layer or sublayer that performs mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per cell in case of CA); priority handling between UEs by means of dynamic scheduling; priority handling between logical channels of one UE by means of logical channel prioritization; priority handling between overlapping resources of one UE; and/or padding (see e.g., [IEEE802], 3GPP TS 36.321 v17.3.0 (2023 Jan. 13), and 3GPP TS 38.321 v17.4.0 (2023 Mar. 29) ("[TS38321]")). The term "physical layer", "PHY layer", or "PHY" at least in some examples refers to a protocol layer or sublayer that includes capabilities to transmit and receive modulated signals for communicating in a communications network (see e.g., [IEEE802], 3GPP TS 36.201 v17.0.0 (2022 Mar. 31), and 3GPP TS 38.201 v17.0.0 (2022 Jan. 5) (collectively referred to as "[PHY]")).

The term "access technology" at least in some examples refers to the technology used for the underlying physical connection to a communication network. The term "radio technology" at least in some examples refers to technology for wireless transmission and/or reception of electromagnetic radiation for information transfer. The term "radio access technology" or "RAT" at least in some examples refers to the technology used for the underlying physical connection to a radio based communication network. The term "RAT type" at least in some examples may identify a transmission technology and/or communication protocol used in an access network, for example, new radio (NR), Long Term Evolution (LTE), narrowband IoT (NB-IOT), untrusted non-3GPP, trusted non-3GPP, trusted Institute of Electrical and Electronics Engineers (IEEE) 802 (e.g., [IEEE80211]; see also *IEEE Standard for Local and Metropolitan Area Networks: Overview and Architecture*, IEEE Std 802-2014, pp. 1-74 (30 Jun. 2014) ("[IEEE802]", the contents of which is hereby incorporated by reference in its entirety), non-3GPP access, MuLTEfire, WiMAX, wireline, wireline-cable, wireline broadband forum (wireline-BBF), and the like. Examples of RATs and/or wireless communications protocols include Advanced Mobile Phone System (AMPS) technologies such as Digital AMPS (D-AMPS), Total Access Communication System (TACS) (and variants thereof such as Extended TACS (ETACS), and/or the like); Global System for Mobile Communications (GSM) technologies such as Circuit Switched Data (CSD), High-Speed CSD (HSCSD), General Packet Radio Service (GPRS), and Enhanced Data Rates for GSM Evolution (EDGE); Third Generation Partnership Project (3GPP) technologies including, for example, Universal Mobile Telecommunications System (UMTS) (and variants thereof such as UMTS Terrestrial Radio Access (UTRA), Wideband Code Division Multiple Access (W-CDMA), Freedom of Multimedia Access (FOMA), Time Division-Code Division Multiple Access (TD-CDMA), Time Division-Synchronous Code Division Multiple Access (TD-SCDMA), and/or the like), Generic Access Network (GAN)/Unlicensed Mobile Access (UMA), High Speed Packet Access (HSPA) (and variants thereof such as HSPA Plus (HSPA+), and/or the like), Long Term Evolution (LTE) (and variants thereof such as LTE-Advanced (LTE-A), Evolved UTRA (E-UTRA), LTE Extra, LTE-A Pro, LTE LAA, MuLTEfire, and/or the like), Fifth Generation (5G) or New Radio (NR), and/or the like; ETSI technologies such as High Performance Radio Metropolitan Area Network (HiperMAN) and the like; IEEE technologies such as [IEEE802] and/or WiFi (e.g., [IEEE80211] and variants thereof), Worldwide Interoperability for Microwave Access (WiMAX) (e.g., [WiMAX] and variants thereof), Mobile Broadband Wireless Access (MBWA)/iBurst (e.g., IEEE 802.20 and variants thereof), and/or the like; Integrated Digital Enhanced Network (iDEN) (and variants thereof such as Wideband Integrated Digital Enhanced Network (WiDEN); millimeter wave (mmWave) technologies/standards (e.g., wireless systems operating at 10-300 GHz and above such as 3GPP 5G, Wireless Gigabit Alliance (WiGig) standards (e.g., IEEE 802.11ad, IEEE 802.11ay, and the like); short-range and/or wireless personal area network (WPAN) technologies/standards such as Bluetooth (and variants thereof such as Bluetooth 5.3, Bluetooth Low Energy (BLE), and/or the like), IEEE 802.15 technologies/standards (e.g., IEEE Standard for Low-Rate Wireless Networks, IEEE Std 802.15.4-2020, pp. 1-800 (23 Jul. 2020) ("[IEEE802154]"), ZigBee, Thread, IPv6 over Low power WPAN (6LoWPAN), WirelessHART, MiWi, ISA100.11a, IEEE Standard for Local and metropolitan area networks—Part 15.6: Wireless Body Area Networks, IEEE Std 802.15.6-2012, pp. 1-271 (29 Feb. 2012), WiFi-direct, ANT/ANT+, Z-Wave, 3GPP Proximity Services (ProSe), Universal Plug and Play (UPnP), low power Wide Area Networks (LPWANs), Long Range Wide Area Network (LoRA or LoRaWAN™), and the like; optical and/or visible light communication (VLC) technologies/standards such as IEEE Standard for Local and metropolitan area networks—Part 15.7: Short-Range Optical Wireless Communications, IEEE Std 802.15.7-2018, pp. 1-407 (23 Apr. 2019), and the like; V2X communication including 3GPP cellular V2X (C-V2X), Wireless Access in Vehicular Environments (WAVE) (IEEE Standard for Information technology—Local and metropolitan area networks—Specific requirements—Part 11: Wireless LAN Medium Access Control (MAC) and Physical Layer (PHY) Specifications Amendment 6: Wireless Access in Vehicular Environments, IEEE Std 802.11p-2010, pp. 1-51 (15 Jul. 2010) ("[IEEE80211p]"), which is now part of [IEEE80211]), IEEE 802.11bd (e.g., for vehicular ad-hoc environments), Dedicated Short Range Communications (DSRC), Intelligent-Transport-Systems (ITS) (including the European ITS-G5, ITS-G5B, ITS-G5C, and/or the like); Sigfox; Mobitex; 3GPP2 technologies such as cdmaOne (2G), Code Division Multiple Access 2000 (CDMA 2000), and Evolution-Data Optimized or Evolution-Data Only (EV-DO); Push-to-talk (PTT), Mobile Telephone System (MTS) (and variants thereof such as Improved MTS (IMTS), Advanced MTS (AMTS), and/or the like); Personal Digital Cellular (PDC); Personal Handy-phone System (PHS), Cellular Digital Packet Data (CDPD); Cellular Digital Packet Data (CDPD); DataTAC; Digital Enhanced Cordless Telecommunications (DECT) (and variants thereof such as DECT Ultra Low Energy (DECT ULE), DECT-2020, DECT-5G, and/or the like); Ultra High Frequency (UHF) communication; Very High Frequency (VHF) communication; and/or any other suitable RAT or protocol. In addition to the aforementioned RATs/standards, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" at least in some examples refers to any transmission medium, either tangible or intangible, which is used to communicate data or a data stream. In some examples, the term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some examples refers to a connection between two devices through a RAT for the purpose of transmitting and receiving information.

The term "flow" at least in some examples refers to a sequence of data and/or data units (e.g., datagrams, packets, or the like) from a source entity/element to a destination entity/element. Additionally or alternatively, the terms "flow" or "traffic flow" at least in some examples refer to an artificial and/or logical equivalent to a call, connection, or link. Additionally or alternatively, the terms "flow" or "traffic flow" at least in some examples refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. Additionally or alternatively, the terms "flow" or "traffic flow" at least in some examples refer to a set of data and/or data units (e.g., datagrams, packets, or the like) passing an observation point in a network during a certain time interval. Additionally or alternatively, the term "flow" at least in some examples refers to a user plane data link that is attached to an association. For purposes of the present disclosure, the terms "traffic flow", "data flow", "dataflow", "packet flow", "network flow", and/or "flow" may be used interchangeably even though these terms at least in some examples refers to to different concepts. The term "dataflow" or "data flow" at least in some examples refers to the movement of data through a system including software elements, hardware elements, or a combination of both software and hardware elements. Additionally or alternatively, the term "dataflow" or "data flow" at least in some examples refers to a path taken by a set of data from an origination or source to destination that includes all nodes through which the set of data travels. The term "stream" or "data stream" at least in some examples refers to a sequence of data elements made available over time. Additionally or alternatively, the term "stream", "data stream", or "streaming" refers to a unidirectional flow of data. Additionally or alternatively, the term "stream", "data stream", or "streaming" refers to a manner of processing in which an object is not represented by a complete data structure of nodes occupying memory proportional to a size of that object, but are processed "on the fly" as a sequence of events. At least in some examples, functions that operate on a stream, which may produce another stream, are referred to as "filters," and can be connected in pipelines, analogously to function composition; filters may operate on one item of a stream at a time, or may base an item of output on multiple input items, such as a moving average or the like.

The term "session" at least in some examples refers to a temporary and interactive information interchange between two or more communicating devices, two or more application instances, between a computer and user, and/or between any two or more entities or elements. Additionally or alternatively, the term "session" at least in some examples refers to a connectivity service or other service that provides or enables the exchange of data between two entities or elements.

The term "identifier" at least in some examples refers to a value, or a set of values, that uniquely identify an identity in a certain scope. Additionally or alternatively, the term "identifier" at least in some examples refers to a sequence of characters that identifies or otherwise indicates the identity of a unique object, element, or entity, or a unique class of objects, elements, or entities. Additionally or alternatively, the term "identifier" at least in some examples refers to a sequence of characters used to identify or refer to an application, program, session, object, element, entity, variable, set of data, and/or the like. The "sequence of characters" mentioned previously at least in some examples refers to one or more names, labels, words, numbers, letters, symbols, and/or any combination thereof. Additionally or alternatively, the term "identifier" at least in some examples refers to a name, address, label, distinguishing index, and/or attribute. Additionally or alternatively, the term "identifier" at least in some examples refers to an instance of identification. The term "persistent identifier" at least in some examples refers to an identifier that is reused by a device or by another device associated with the same person or group of persons for an indefinite period. The term "identification" at least in some examples refers to a process of recognizing an identity as distinct from other identities in a particular scope or context, which may involve processing identifiers to reference an identity in an identity database. The term "application identifier", "application ID", or "app ID" at least in some examples refers to an identifier that can be mapped to a specific application, application instance, or application instance. In the context of 3GPP 5G/NR, an "application identifier" at least in some examples refers to to an identifier that can be mapped to a specific application traffic detection rule. The term "network address" at least in some examples refers to an identifier for a node or host in a computer network, and may be a unique identifier across a network and/or may be unique to a locally administered portion of the network. Examples of identifiers and/or network addresses can include am application identifier, Bluetooth hardware device address (BD_ADDR), a cellular network address (e.g., Absolute Radio-Frequency Channel Number (ARFCN), Access Point Name (APN), AMF name and/or AMF identifier (ID), AF-Service-Identifier, Cell Global Identifier (CGI) (e.g., NR CGI (NCGI), CGI NG-RAN, CGI EUTRA, and/or the like), Closed Access Group Identifier (CAG-ID), Edge Application Server (EAS) ID, Data Network Access Identifier (DNAI), Data Network Name (DNN), Evolved Cell Global Identifier (ECGI), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, gNB Identifier (gNB ID), Global gNB ID, International Mobile Equipment Identity (IMEI), IMEI Type Allocation Code (IMEA/TAC), International Mobile Subscriber Identity (IMSI), IMSI software version (IMSISV), permanent equipment identifier (PEI), Local Area Data Network (LADN) DNN, Local NG-RAN Node Identifier, Mobile Subscriber Identification Number (MSIN), Mobile Subscriber/Station ISDN Number (MSISDN), Network identifier (NID), Network Slice Instance (NSI) ID, Network Slice AS Group (NSAG), Permanent Equipment Identifier (PEI), Public Land Mobile Network (PLMN) identity (ID), Physical Cell Identifier (PCI), QoS Flow ID (QFI) and/or 5G QoS Identifier (5QI), RAN ID, Routing Indicator, Radio Network Temporary Identifier (RNTI) and variants thereof (e.g., any of those discussed in clause 8 of 3GPP TS 38.300 v17.4.0 (2023 Mar. 28) ("[TS38300]")), SMS Function (SMSF) ID, Stand-alone Non-Public Network (SNPN) ID, Single Network Slice Selection Assistance information (S-NSSAI), sidelink identities (e.g., Source Layer-2 ID, Destination Layer-2 ID, PC5 Link Identifier, and the like), Subscription Concealed Identifier (SUCI), Subscription Permanent Identifier (SUPI), Temporary Mobile Subscriber Identity (TMSI) and variants thereof, Tracking Area identity (TAI), UE Access Category and Identity, and/or other cellular network related identifiers), CAG-ID, drivers license number, Global Trade Item Number (GTIN) (e.g., Australian Product Number (APN), EPC, European Article Number (EAN), Universal Product Code (UPC), and the like), email address, Enterprise Application Server (EAS) ID, an endpoint address, an Electronic Product Code (EPC) as defined by the EPCglobal Tag Data Standard, Fully Qualified Domain Name (FQDN), flow ID and/or flow hash, hash value, index, internet protocol (IP) address in an IP network (e.g., IP version 4 (IPv4), IP version 6 (IPv6), and the like), an internet packet exchange (IPX) address, LAN ID, a MAC address, personal area network (PAN) ID, port number (e.g., TCP port number, UDP port number, and the like), price lookup code (PLC), product key, QUIC connection ID, RFID tag, sequence number, service set identifier (SSID) and variants thereof, screen name, serial number, stock keeping unit (SKU), socket address, social security number (SSN), telephone number (e.g., in a public switched telephone network (PTSN)), unique identifier (UID) (e.g., including globally UID, universally unique identifier (UUID) (e.g., as specified in ISO/IEC 11578:1996), and the like), a Universal Resource Locator (URL) and/or Universal Resource Identifier (URI), user name (e.g., ID for logging into a service provider platform, such as a social network and/or some other service), vehicle identification number (VIN), Virtual LAN (VLAN) ID, X.21 address, an X.25 address, Zigbee® ID, Zigbee® Device Network ID, and/or any other suitable network address and components thereof.

The term "reference" at least in some examples refers to data useable to locate other data and may be implemented a variety of ways (e.g., a pointer, an index, a handle, a key, an identifier, a hyperlink, and/or the like).

The term "application" at least in some examples refers to a computer program designed to carry out a specific task other than one relating to the operation of the computer itself. Additionally or alternatively, term "application" at least in some examples refers to a complete and deployable package, environment to achieve a certain function in an operational environment. The term "application programming interface" or "API" at least in some examples refers to a set of subroutine definitions, communication protocols, and tools for building software. Additionally or alternatively, the term "application programming interface" or "API" at least in some examples refers to a set of clearly defined methods of communication among various components. In some examples, an API may be defined or otherwise used for a web-based system, operating system, database system, computer hardware, software library, and/or the like. The term "process" at least in some examples refers to an instance of a computer program that is being executed by one or more threads. In some implementations, a process may be made up of multiple threads of execution that execute instructions concurrently. The term "algorithm" at least in some examples refers to an unambiguous specification of how to solve a problem or a class of problems by performing calculations, input/output operations, data processing, automated reasoning tasks, and/or the like. The terms "instantiate," "instantiation," and the like at least in some examples refers to the creation of an instance. An "instance" also at least in some examples refers to a concrete occurrence of an object, which may occur, for example, during execution of program code.

The term "use case" at least in some examples refers to a description of a system from a user's perspective. In some examples, use cases sometimes treat a system as a black box, and the interactions with the system, including system responses, are perceived as from outside the system. Use cases typically avoid technical jargon, preferring instead the language of the end user or domain expert. The term "user"

at least in some examples refers to an abstract representation of any entity issuing commands, requests, and/or data to a compute node or system, and/or otherwise consumes or uses services. The term "user profile" or "consumer profile" at least in some examples refer to a collection of settings and information associated with a user, consumer, or data subject, which contains information that can be used to identify the user, consumer, or data subject such as demographic information, audio or visual media/content, and individual characteristics such as knowledge or expertise. Inferences drawn from collected data/information can also be used to create a profile about a consumer reflecting the consumer's preferences, characteristics, psychological trends, predispositions, behavior, attitudes, intelligence, abilities, and aptitudes.

The term "data unit" at least in some examples at least in some examples refers to a basic transfer unit associated with a packet-switched network; a datagram may be structured to have header and payload sections. The term "data unit" at least in some examples may be synonymous with any of the following terms, even though they may refer to different aspects: "datagram", a "protocol data unit" or "PDU", a "service data unit" or "SDU", "frame", "packet", "network packet", "segment", "block", "cell", "chunk", "message", "information element" or "IE", "Type Length Value" or "TLV", "data frame", "data field" or "field", "data element", and/or the like. Examples of datagrams, network packets, and the like, include internet protocol (IP) packet, Internet Control Message Protocol (ICMP) packet, UDP packet, TCP packet, SCTP packet, ICMP packet, Ethernet frame, RRC messages/packets, SDAP PDU, SDAP SDU, PDCP PDU, PDCP SDU, MAC PDU, MAC SDU, BAP PDU. BAP SDU, RLC PDU, RLC SDU, WiFi frames as discussed in a [IEEE802] protocol/standard (e.g., [IEEE80211] or the like), Type Length Value (TLV), and/or other like data structures.

The term "data element" or "DE" at least in some examples refers to a data type that contains one single data. Additionally or alternatively, the term "data element" at least in some examples refers to an atomic state of a particular object with at least one specific property at a certain point in time, and may include one or more of a data element name or identifier, a data element definition, one or more representation terms, enumerated values or codes (e.g., metadata), and/or a list of synonyms to data elements in other metadata registries. Additionally or alternatively, a "data element" at least in some examples refers to a data type that contains one single data. In some examples, the data stored in a data element may be referred to as the data element's content, "content item", or "item". The term "information element" or "IE" at least in some examples refers to a structural element containing one or more fields. Additionally or alternatively, the term "information element" or "IE" at least in some examples refers to a field or set of fields defined in a standard or specification that is used to convey data and/or protocol information. The term "field" at least in some examples refers to individual contents of an information element, or a data element that contains content. The term "data frame" or "DF" at least in some examples refers to a data type that contains more than one data element in a predefined order.

The term "data structure" at least in some examples refers to a data organization, management, and/or storage format. Additionally or alternatively, the term "data structure" at least in some examples refers to a collection of data values, the relationships among those data values, and/or the functions, operations, tasks, and the like, that can be applied to the data. Examples of data structures include primitives (e.g., Boolean, character, floating-point numbers, fixed-point numbers, integers, reference or pointers, enumerated type, and/or the like), composites (e.g., arrays, records, strings, union, tagged union, and/or the like), abstract data types (e.g., data container, list, tuple, associative array, map, dictionary, set (or dataset), multiset or bag, stack, queue, graph (e.g., tree, heap, and the like), and/or the like), routing table, symbol table, quad-edge, blockchain, purely-functional data structures (e.g., stack, queue, (multi)set, random access list, hash consing, zipper data structure, and/or the like).

The term "VRU awareness message" or "VAM" at least in some examples refers to a message transmitted and/or received by a VRU. The term "cluster VAM" at least in some examples refers to a VAM including information about a cluster of VRUs. The term "individual VAM" at least in some examples refers to a VAM including information about an individual VRU. In some examples, the term "VAM" without any adjective or other qualification can refer to a cluster VAM and/or an individual VAM. The term "map extended message" or "MAPEM" at least in some examples refers to a road/lane topology and traffic maneuver message. The term "minimum dissemination area" at least in some examples refers to a minimum area where information is disseminated by an ITS-S based on application require-ments. The term "relevance zone" at least in some examples refers to an area where information is applicable.

The term "facilities" at least in some examples refers to functionalities, services, and/or data provided by the facili-ties layer and/or by individual facilities layer entities/ele-ments. The term "application support" at least in some examples refers to a sub set of facilities, providing support elements for applications.

The term "collective perception" or "CP" at least in some examples refers to the concept of sharing the perceived environment of an ITS-S based on perception sensors, wherein an ITS-S broadcasts information about its current (driving) environment. CP at least in some examples refers to the concept of actively exchanging locally perceived objects between different ITS-Ss by means of a V2X RAT. CP decreases the ambient uncertainty of ITS-Ss by contrib-uting information to their mutual FoVs. The term "Collec-tive Perception basic service", "CP service", or CPS" at least in some examples refers to a facility at the ITS-S facilities layer to receive and process CPMs, and generate and trans-mit CPMs. The term "Collective Perception Message" or "CPM" at least in some examples refers to a CP basic service PDU. The term "Collective Perception data" or "CPM data" at least in some examples refers to a partial or complete CPM payload. The term "Collective Perception protocol" or "CPM protocol" at least in some examples refers to an ITS facilities layer protocol for the operation of the CPM gen-eration, transmission, and reception. The term "CP object" or "CPM object" at least in some examples refers to aggre-gated and interpreted abstract information gathered by per-ception sensors about other traffic participants and obstacles. CP/CPM Objects can be represented mathematically by a set of variables describing, amongst other, their dynamic state and geometric dimension. The state variables associated to an object are interpreted as an observation for a certain point in time and are therefore always accompanied by a time reference. The term "environment model" at least in some examples refers to a current representation of the immediate environment of an ITS-S, including all perceived objects perceived by either local perception sensors or received by V2X. The term "object" at least in some examples refers to the state space representation of a physically detected object within a sensor's perception range. The term "object list" refers to a collection of objects temporally aligned to the same timestamp.

The term "confidence level" at least in some examples refers to a probability with which an estimation of the location of a statistical parameter (e.g., an arithmetic mean) in a sample survey is also true for a population (e.g., a sample survey that is also true for an entire population from which the samples were taken). The term "confidence value" at least in some examples refers to an estimated absolute accuracy of a statistical parameter (e.g., an arithmetic mean) for a given confidence level (e.g., 95%). Additionally or alternatively, the term "confidence value" or "confidence interval" at least in some examples refers to an estimated interval associated with the estimate of a statistical param-eter of a population using sample statistics (e.g., an arith-metic mean) within which the true value of the parameter is expected to lie with a specified probability, equivalently at a given confidence level (e.g., 95%). In some examples, confidence intervals are neither to be confused with nor used as estimated uncertainties (covariances) associated with either the output of stochastic estimation algorithms used for tasks such as kinematic and attitude state estimation and the associated estimate error covariance, or the measurement noise variance associated with a sensor's measurement of a physical quantity (e.g., variance of the output of an accel-erometer or specific force meter). The term "detection confidence" at least in some examples refers to a measure related to the certainty, generally a probability. In some examples, the "detection confidence" refers to a sensor or sensor system associates with its output or outputs involving detection of an object or objects from a set of possibilities (e.g., with X % probability the object is a chair, with Y % probability the object is a couch, and with (1−X−Y) % probability it is something else). The term "free space existence confidence" or "perceived region confidence" at least in some examples refers to a quantification of the estimated likelihood that free spaces or unoccupied areas may be detected within a perceived region.

The term "ITS data dictionary" at least in some examples refers to a repository of DEs and DFs used in the ITS applications and ITS facilities layer. The term "ITS mes-sage" at least in some examples refers to messages exchanged at ITS facilities layer among ITS stations or messages exchanged at ITS applications layer among ITS stations. The term "ITS station" or "ITS-S" at least in some examples refers to functional entity specified by the ITS station (ITS-S) reference architecture. The term "personal ITS-S" or "P-ITS-S" refers to an ITS-S in a nomadic ITS sub-system in the context of a portable device (e.g., a mobile device of a pedestrian). The term "Roadside ITS-S" or "R-ITS-S" at least in some examples refers to an ITS-S operating in the context of roadside ITS equipment. The term "Vehicle ITS-S" or "V-ITS-S" at least in some examples refers to an ITS-S operating in the context of vehicular ITS equipment. The term "ITS central system" or "Central ITS-S" refers to an ITS system in the backend, for example, traffic control center, traffic management center, or cloud system from road authorities, ITS application suppli-ers or automotive OEMs.

The term "maneuvers" or "manoeuvres" refer to specific and recognized movements bringing an actor, e.g., pedes-trian, vehicle or any other form of transport, from one position to another within some momentum (velocity, veloc-ity variations and vehicle mass). The term "Maneuver Coor-dination" or "MC" refers to the concept of sharing, by means of a V2X RAT, an intended movement or series of intended movements of an ITS-S based on perception sensors, planned trajectories, and the like, wherein an ITS-S broadcasts information about its current intended maneuvers.

The term "geographical area", "geographic area", or "geo-area" at least in some examples refers to a defined two-dimensional (2D) or three-dimensional (3D) area, region, plot of land, or other demarcated terrestrial space that can be considered as a unit. In some examples, a "geographical area", "geographic area", or "geo-area" is represented by a bounding-box or one or more geometric shapes, such as circles, spheres, rectangles, cubes, cuboids, ellipses, ellipsoids, and/or any other 2D or 3D shape. The term "high-risk geographical area" at least in some examples refers to an area and/or part of road infrastructure where the safety related traffic context is heightened or increased for VRUs. The term "low-risk geographical area" at least in some examples refers to an area and/or part of road infrastructure where the safety related traffic context is relaxed for VRUs. The term "zero-risk geographical area" at least in some examples refers to an area and/or part of road infrastructure where users are not considered to be VRUs. In some examples, VRUs may learn about low-risk geographical areas, zero-risk geographical areas, and/or other geographical areas through a navigation application and/or when receiving a corresponding MAPEM (see e.g., ETSI TS 103 301). Low-risk geographical areas are expected to be signalled as low risk by a relevant authority. In the case when motor vehicles are allowed to enter such an area, it is generally under their own responsibility to enforce special restrictions such a low speed limitation. The term "destination area" at least in some examples refers to a geographic area in which a message is disseminated. The term "awareness zone" at least in some examples refers to an area in which a driver or vehicle operator will be informed about upcoming situations.

The term "geo-fence" or "geofence" at least in some examples refers to a virtual perimeter or boundary that corresponds to a real-world geographic area (or a geo-area). In some examples, a "geo-fence" or "geofence" can correspond to a predefined boundary or border (e.g., property/plot boundaries; school zones; neighborhood boundaries; national or provincial boundaries; a configured or user-selectable boundary; a cell provided by a network access node; a service area, registration area, tracking area, 5G enhanced positioning area, and/or 5G positioning service area, as defined by relevant 3GPP standards, and/or the like) and/or can be dynamically generated (e.g., radius around a point/location of an entity/element, or some other shape of a dynamic of predefined size surrounding a point/location of an entity/element). The term "geofencing" at least in some examples refers to the use of a geofence, for example, by using a location-aware device and/or location services to determine when a user enters and/or exits a geofence.

The term "object" at least in some examples refers to a material thing that can be detected and with which parameters can be associated that can be measured and/or estimated. The term "object existence confidence" at least in some examples refers to a quantification of the estimated likelihood that a detected object exists, i.e., has been detected previously and has continuously been detected by a sensor. The term "object list" at least in some examples refers to a collection of objects and/or a data structure including a collection of detected objects. The term "dynamic state" at least in some examples refers to a collection of properties of a moving object including position, velocity, acceleration, mass, and forces acting on the object, that allow path prediction.

The term "sensor measurement" at least in some examples refers to abstract object descriptions generated or provided by feature extraction algorithm(s), which may be based on the measurement principle of a local perception sensor mounted to a station/UE, wherein a feature extraction algorithm processes a sensor's raw data (e.g., reflection images, camera images, and the like) to generate an object description. The term "state space representation" at least om some examples refers to a mathematical description of a detected object (or perceived object), which includes a set of state variables, such as distance, position, velocity or speed, attitude, angular rate, object dimensions, and/or the like. In some examples, state variables associated with/to an object are interpreted as an observation for a certain point in time, and are accompanied by a time reference.

The term "vehicle" at least in some examples refers to a road vehicle designed to carry people or cargo on public roads and highways such as CA/AD vehicles, busses, cars, trucks, vans, motor homes, and motorcycles; by water such as boats, ships, and the like; or in the air such as airplanes, helicopters, UAVs, satellites, and the like. The term "Vehicle-to-Everything" or "V2X" at least in some examples refers to vehicle to vehicle (V2V), vehicle to infrastructure (V2I), infrastructure to vehicle (I2V), vehicle to network (V2N), and/or network to vehicle (N2V) communications and associated RATs.

The term "lateral distance" or "LaD" at least in some examples refers to an estimated distance between the VRU and the vehicle perpendicular to the direction of the vehicle heading. The term "longitudinal distance" or "LoD" at least in some examples refers to an estimated distance between the VRU and the vehicle along the direction of the vehicle heading. The term "vertical distance" or "VD" at least in some examples refers to a estimated distance in vertical direction (height) between the VRU and the vehicle. The term "velocity" at least in some examples refers to a vector indicating speed in a particular direction (see e.g., ETSI EN 302 890-2). The term "minimum safe lateral distance" or "MSLaD" at least in some examples refers to a minimum lateral separation between the VRU and vehicle for safety. The term "minimum safe longitudinal distance" or "MSLoD" at least in some examples refers to a minimum longitudinal separation between the VRU and the vehicle for safety. The term "minimum safe vertical distance" or "MSVD" at least in some examples refers to a minimum vertical separation between the VRU and the vehicle for safety.

The term "manoeuvre identifier", "maneuver identifier", or "MI" at least in some examples refers to an identifier of a manoeuvre used in a Manoeuvre Coordination Service (MCS). In some examples, the choice of manoeuvre generated locally based on the available sensor data at the VRU ITS-S and may be shared with neighbouring ITS-S (e.g., VRUs and/or non-VRUs) in the vicinity to initiate a joint manoeuvre coordination among VRUs. The term "Time To Collision" or "TTC" at least in some examples refers to a calculated data element enabling the selection of the nature and urgency of the collision avoidance action to be undertaken. In some examples, the TTC variable is related to other variables such as the road state, the weather conditions, the vehicle/VRU action capabilities. In the present document, TTC is used as a trigger for certain activities, such as starting to transmit VAMs or taking some avoidance/mitigation action. Research has been carried out on alternative metrics such as Post-Encroachment Time (PET) and Permutation Entropy (PE). In some examples, the use of TTC in the present document is not meant to preclude the use of other metrics such as the triple of {Longitudinal Distance (LoD), Lateral Distance (LaD), Vertical Distance (VD)}, as elaborated in clause 6.5.10.5 that may be used to fulfil the safety goals of the applications, and in particular the present document does not prescribe a specific means for calculating TTC, specifically in order to support improvements in this algorithm in the future. The term "Trajectory Interception Indication" or "TII" at least in some examples refers to a indication of the likelihood that the VRU and one or more other VRUs, non-VRUs, or even objects on the road are going to collide.

The term "vulnerable road user" or "VRU" at least in some examples refers to a non-motorized road users and/or users of VRU vehicles. In some examples, a VRU is a living being, and this living being is only considered to be a VRU when it is in the context of a road safety related traffic environment. The term "combined VRU" at least in some examples refers to a combination of a VRU and a VRU vehicle (e.g., bicycle, wheelchair, and/or the like). The term "VRU application" at least in some examples refers to an application extending the awareness of and/or about Vulnerable Road Users such as motorcycles, bicycles, pedestrians and impaired traffic participants in the neighbourhood of other traffic participants. The term "VRU cluster" at least in some examples refers to a set of VRUs moving in a coherent manner (e.g., with coherent velocity or direction). In some examples, a cluster of VRUs can be homogeneous (e.g., a set of pedestrians or bicycles) or heterogeneous (e.g., pedestrians with e-scooters, bicycles, and/or the like). Additionally, in some examples, a combined VRU is not a heterogeneous cluster. The term "heterogeneous VRU cluster" at least in some examples refers to a VRU cluster composed of VRU belonging to different VRU profiles. The term "homogeneous VRU cluster" at least in some examples refers to a VRU cluster composed of VRU belonging to the same VRU profile. The term "VRU device" at least in some examples refers to a portable device used by a VRU integrating a standard ITS-S. Additionally or alternatively, the term "VRU device" at least in some examples refers to a VRU device that integrates one or more applications interfacing an ITS-S (e.g., an application can improve the VRU trajectory prediction by learning continuously from its behaviour when sharing the space with other road users). The term "VRU device type" at least in some examples refers to a class of VRU device transceiver capability. In some examples, a VRU device type includes VRU-Tx, VRU-Rx, and VRU-St (see e.g., [TS103300-2]). The term "VRU ITS-S" at least in some examples refers to an ITS-S operated by a VRU. Additionally or alternatively, the term "VRU ITS-S" at least in some examples refers to a P-ITS-S and/or a V-ITS-S capable of handling VRU related ITS applications. The term "VRU system" at least in some examples refers to a ensemble of ITS stations interacting with each other to support VRU use cases (e.g., personal ITS-S, vehicle ITS-S, roadside ITS-S, and/or central ITS-S). The term "VRU vehicle" at least in some examples refers to an L class of vehicles (for example mopeds or motorcycles, and/or the like), as defined in Annex I of EU Regulation 168/2013 (e.g., two and three-wheel vehicles and quadricycles) and light unpowered vehicles (e.g., bicycles, skates, wheelchairs, prams, and/or the like).

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, and/or the like). Furthermore, various standards (e.g., 3GPP, ETSI, and/or the like) may define various message formats, PDUs, containers, frames, and/or the like, as comprising a sequence of optional or mandatory data elements (DEs), data frames (DFs), information elements (IEs), and/or the like. However, it should be understood that the requirements of any particular standard should not limit the examples discussed herein, and as such, any combination of containers, frames, DFs, DEs, IEs, values, actions, and/or features are possible in various examples, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. A mobile station, comprising:

communication circuitry, wherein the communication circuitry is to:

receive a zone configuration, wherein the zone configuration includes a set of geographic areas at which the mobile station is to activate or deactivate the communication circuitry, wherein to activate the communication circuitry includes to enter an active state, and wherein to deactivate the communication circuitry includes to enter a sleep state; and adjust a subset of DRX parameters of the set of DRX parameters based on the geographic areas included in the zone configuration; and processor circuitry connected to the communication circuitry, wherein the processor circuitry is to:

cause the communication circuitry to enter the active state when a set of first conditions are met; and cause the communication circuitry to enter the sleep state when a set of second conditions are met, wherein the set of first conditions are different than the set of second conditions.

2. The mobile station of claim 1, wherein the processor circuitry is to:

cause the communication circuitry to enter the active state by enabling or switching on the communication circuitry; and cause the communication circuitry to enter the sleep state by disabling or switching off the communication circuitry.

3. The mobile station of claim 1, wherein the communication circuitry is to:

receive a discontinuous reception (DRX) configuration, wherein the DRX configuration is based on one or more of a type of messages being communicated in a geographical area, a message traffic volume in the geographical area, channel conditions in the geographical area, signal strength measurements, or signal quality measurements.

4. The mobile station of claim 3, wherein the set of second conditions includes expiration of a DRX timer, and the processor circuitry is to:

start the DRX timer when no messages are obtained within a predefined or configured period of time; and cause the communication circuitry to enter the sleep state when the DRX timer expires.

5. The mobile station of claim 3, wherein the DRX configuration includes a set of DRX parameters, and the set of DRX parameters include one or more of:

a DRX-onDuration parameter, wherein the DRX-onDuration parameter includes one or more of a duration of a DRX cycle or a time interval during which periodic messages are scheduled or transmitted;

a DRX-ShortCycle parameter, wherein the DRX-ShortCycle parameter includes a duration of a short DRX cycle or a time duration corresponding to a message periodicity;

a DRX-ShortCycle Timer parameter, wherein the DRX-ShortCycle Timer parameter includes one or more of: a duration following the short DRX cycle, a number of short DRX cycles to follow after a start of an individual short DRX cycle, or a number of short DRX cycles after which a long DRX cycle is to be applied; and a DRX-LongCycle parameter, wherein the DRX-LongCycle parameter includes a duration of a long DRX cycle or a number of short DRX cycles making up the long DRX cycle.

6. The mobile station of claim 5, wherein the processor circuitry is to:

cause the communication circuitry to enter the long DRX cycle when there is no transmission or receipt of messages during a period defined by the DRX-ShortCycle or the DRX-ShortCycle Timer.

7. The mobile station of claim 5, wherein, to adjust the set of DRX parameters, the processor circuitry is to:

determine a current location of the mobile station based on map data provided by positioning circuitry or a navigation application; and adjust the set of DRX parameters based on the current location.

8. The mobile station of claim 5, wherein, to adjust the set of DRX parameters, the processor circuitry is to:

increase a value of the DRX-ShortCycle parameter or a value of the DRX-LongCycle parameter for zones that are not within a predefined distance of road infrastructure; and decrease the value of the DRX-ShortCycle parameter or the value of the DRX-LongCycle parameter for zones that are within the predefined distance of road infrastructure.

9. The mobile station of claim 5, wherein, to adjust the set of DRX parameters, the processor circuitry is to:

decrease a value of the DRX-ShortCycle Timer parameter for zones that are not within a predefined distance of road infrastructure; and increase the value of the DRX-ShortCycle Timer parameter for zones that are within a predefined distance of road infrastructure.

10. The mobile station of claim 1, wherein the processor circuitry is to:

receiving a wake-up signal (WUS) from a beacon device, wherein the WUS is transmitted prior to each scheduled transmission occasion;

entering the active state in response to receipt of the WUS;

receiving a Go-To-Sleep (GTS) signal from the beacon device when there are no messages to be transmitted in a configured transmission occasion; and entering the sleep state in response to receipt of the GTS signal.

11. The mobile station of claim 1, wherein the mobile station is a vulnerable road user (VRU) device, a smartphone, a tablet, a wearable device, an autonomous sensor, an Internet of Things (IOT) device, a single-board computer, a micro-mobility vehicle, a four-wheeled all-terrain vehicle, a Global Positioning System (GPS) module, a radiofrequency identifier (RFID) tag, a head-up display (HUD) device, or a small form factor computing device.

12. A non-transitory computer readable media (NTCRM) comprising instructions for operating a mobile station, wherein execution of the instructions is to cause the mobile station to:

receive a zone configuration, wherein the zone configuration includes a set of geographic areas at which the mobile station is to activate or deactivate communication circuitry of the mobile station, wherein to activate the communication circuitry includes to enter an active state, and wherein to deactivate the communication circuitry includes to enter a sleep state;

adjust a subset of DRX parameters of the set of DRX parameters based on the geographic areas included in the zone configuration;

determine a current position of the mobile station;

cause the communication circuitry of the mobile station to enter the active state when a set of first conditions are met; and cause the communication circuitry to enter the sleep state when a set of second conditions are met, wherein the set of first conditions and the set of second conditions are evaluated based on a comparison of the current position of the mobile station to the set of geographic areas at which the mobile station is to activate or deactivate the communication circuitry.

13. The NTCRM of claim 12, wherein the set of first conditions include the mobile station being within a predefined distance of one or more vehicles, roadway infrastructure, or a roadside unit (RSU), and execution of the instructions is to cause the mobile station to:

determine the current position of the mobile station with respect to one or more vehicles, roadway infrastructure, or an RSU;

cause the communication circuitry to enter the active state when the current position of the mobile station indicates that the mobile station is within the predefined distance of the one or more vehicles, the roadway infrastructure, or the RSU; and cause the communication circuitry to enter the sleep state when the current position of the mobile station indicates that the mobile station is not within the predefined distance of the one or more vehicles, the roadway infrastructure, or the RSU.

14. The NTCRM of claim 12, wherein the set of first conditions include the mobile station being within a high-risk geographical area, the set of second conditions include the mobile station not being in a high-risk geographical area, and execution of the instructions is to cause the mobile station to:

cause the communication circuitry to enter the active state when the current position of the mobile station indicates that the mobile station is in a high-risk geographical area; and cause the communication circuitry to enter the sleep state when the current position of the mobile station indicates that the mobile station is not in a high-risk geographical area or is in a low-risk geographical area.

15. The NTCRM of claim 14, wherein execution of the instructions is to cause the mobile station to:

cause the communication circuitry to enter a partial-active state when the current position of the mobile station indicates that the mobile station is in a mid-risk geographical area, wherein the mid-risk geographical area is a geographic area or region between at least one high-risk geographical area and at least one low-risk geographical area, and the communication circuitry is to consume less power in the partial-active state than when the communication circuitry is to consume less power in the active state.

16. The NTCRM of claim 15, wherein the active state is an operational mode in which the communication circuitry is powered on, the sleep state is an operational mode in which the communication circuitry is powered off for a first cycle time, and the partial-active state is an operational mode in which the communication circuitry is powered off for a second cycle time that is shorter than the first cycle time.

17. The NTCRM of claim 16, wherein:

the first cycle time is based on first signal strength or quality measurements and the second cycle time is based on second signal strength or quality measurements that are greater or better than the first signal strength and/or signal quality measurements; or the first cycle time is based on a first observed position of the mobile station by a network access node and the second cycle time is based on a second observed position of the mobile station by the network access node, wherein the first observed position is greater than the second observed position.

18. The NTCRM of claim 12, wherein the mobile station is a vulnerable road user (VRU) station, and execution of the instructions is to cause the VRU station to:

cause the communication circuitry to enter the active state during time slots reserved for VRU communications; and during the time slots reserved for VRU communications and while in the active state:

monitor one or more channels for receiving data, and transmit data in the one or more channels or in one or more other channels.

19. The NTCRM of claim 12, wherein the mobile station is a VRU station, and execution of the instructions is to cause the VRU station to:

monitor one or more resource blocks (RBs) allocated to the VRU station for downlink data or one or more RBs allocated to the VRU station for receiving sidelink (SL) data from one or more other stations; and cause transmission or broadcast of uplink data or other SL data to the one or more other stations in one or more RBs allocated to the VRU station for transmitting or broadcasting the uplink data or the other SL data.

\* \* \* \* \*